Figure 1:
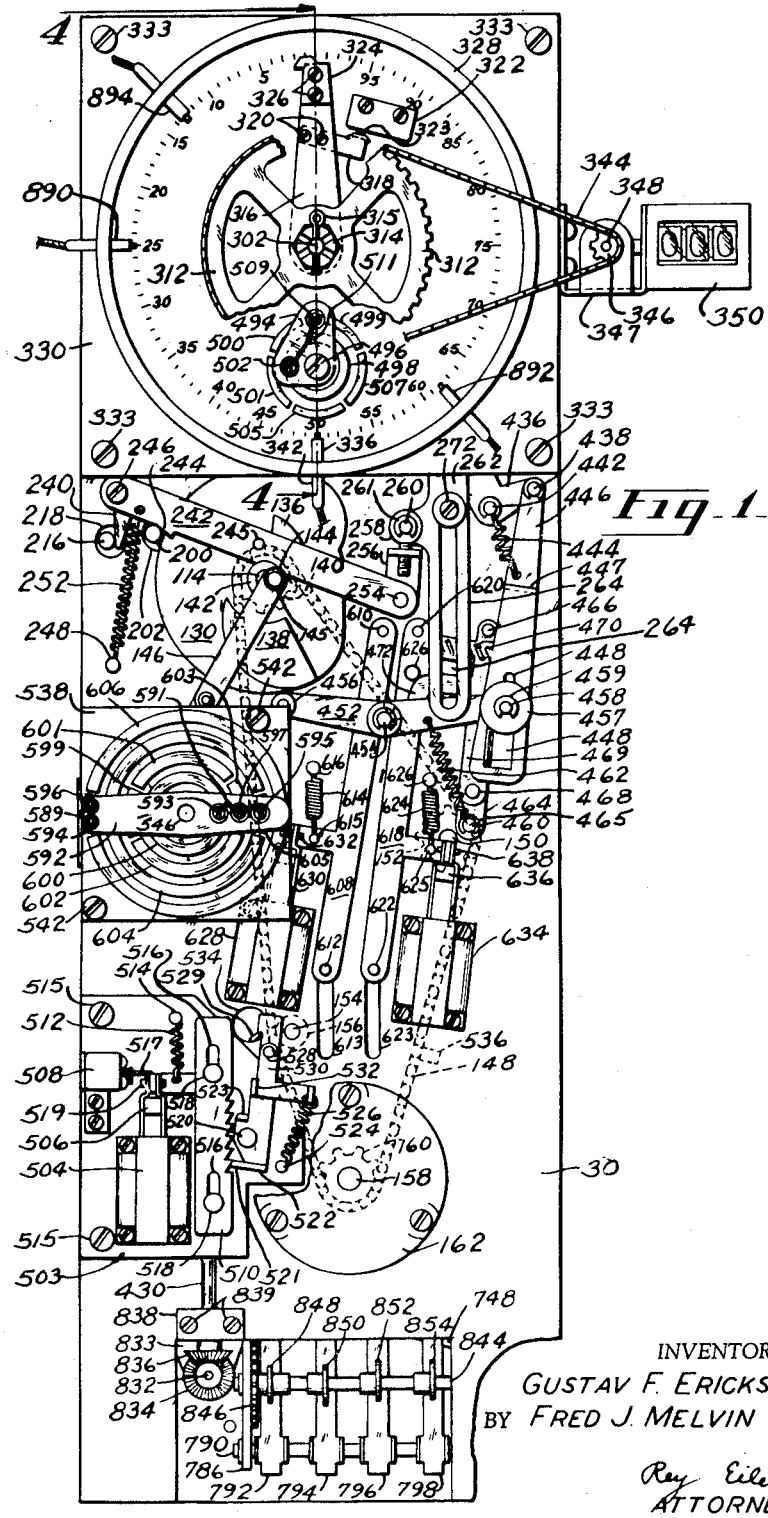

March 9, 1965 G. F. ERICKSON ETAL 3,172,522
COIN SEPARATORS
Original Filed Aug. 10, 1954 9 Sheets-Sheet 1

INVENTORS
GUSTAV F. ERICKSON
BY FRED J. MELVIN

Rey Eilers
ATTORNEY.

March 9, 1965  G. F. ERICKSON ET AL  3,172,522
COIN SEPARATORS
Original Filed Aug. 10, 1954  9 Sheets-Sheet 2

INVENTORS
GUSTAV F. ERICKSON
FRED J. MELVIN
BY
Rey Filers
ATTORNEY

March 9, 1965
G. F. ERICKSON ET AL
3,172,522
COIN SEPARATORS
Original Filed Aug. 10, 1954
9 Sheets-Sheet 3
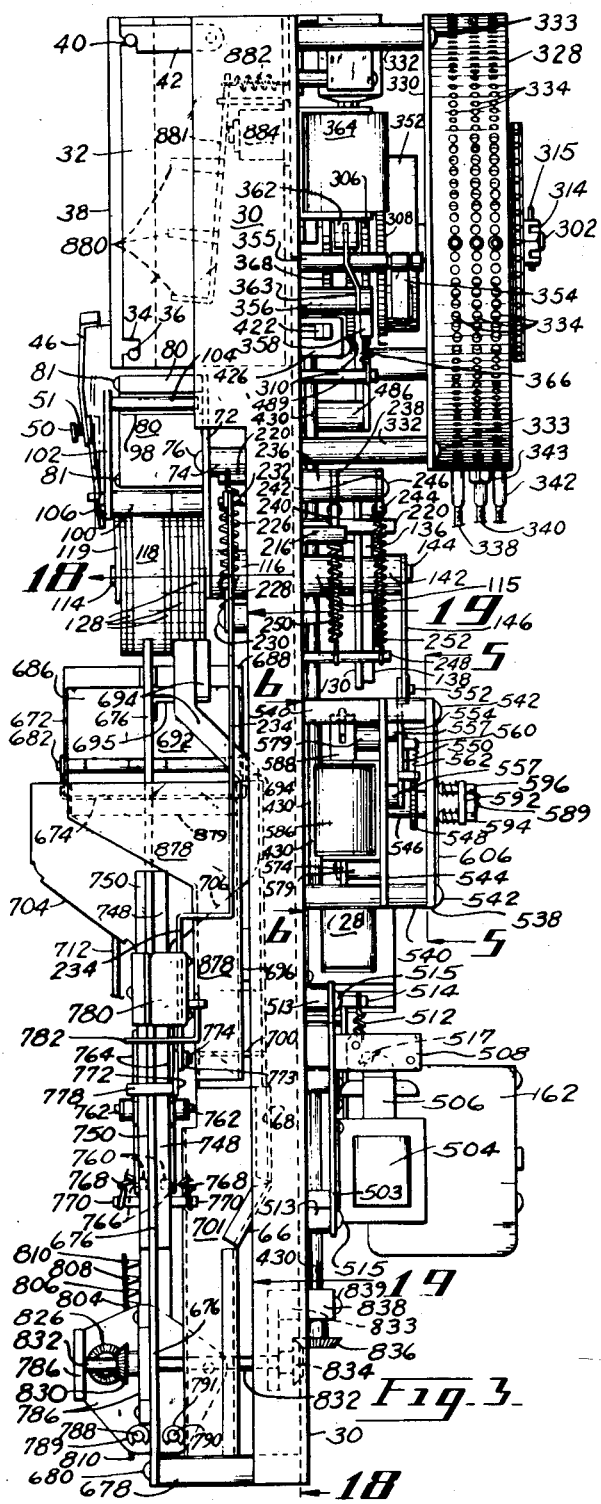
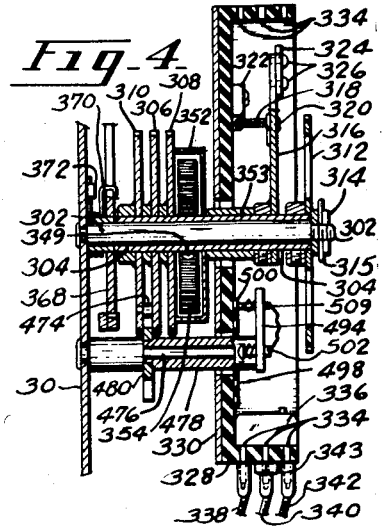
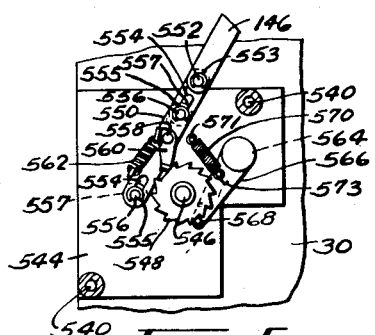
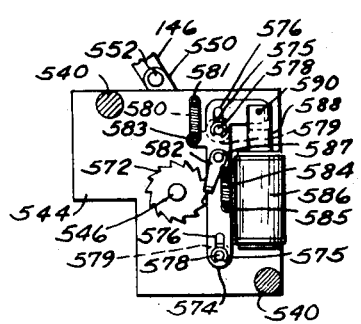
INVENTOR.
GUSTAV F. ERICKSON
BY FRED J. MELVIN
ATTORNEY.

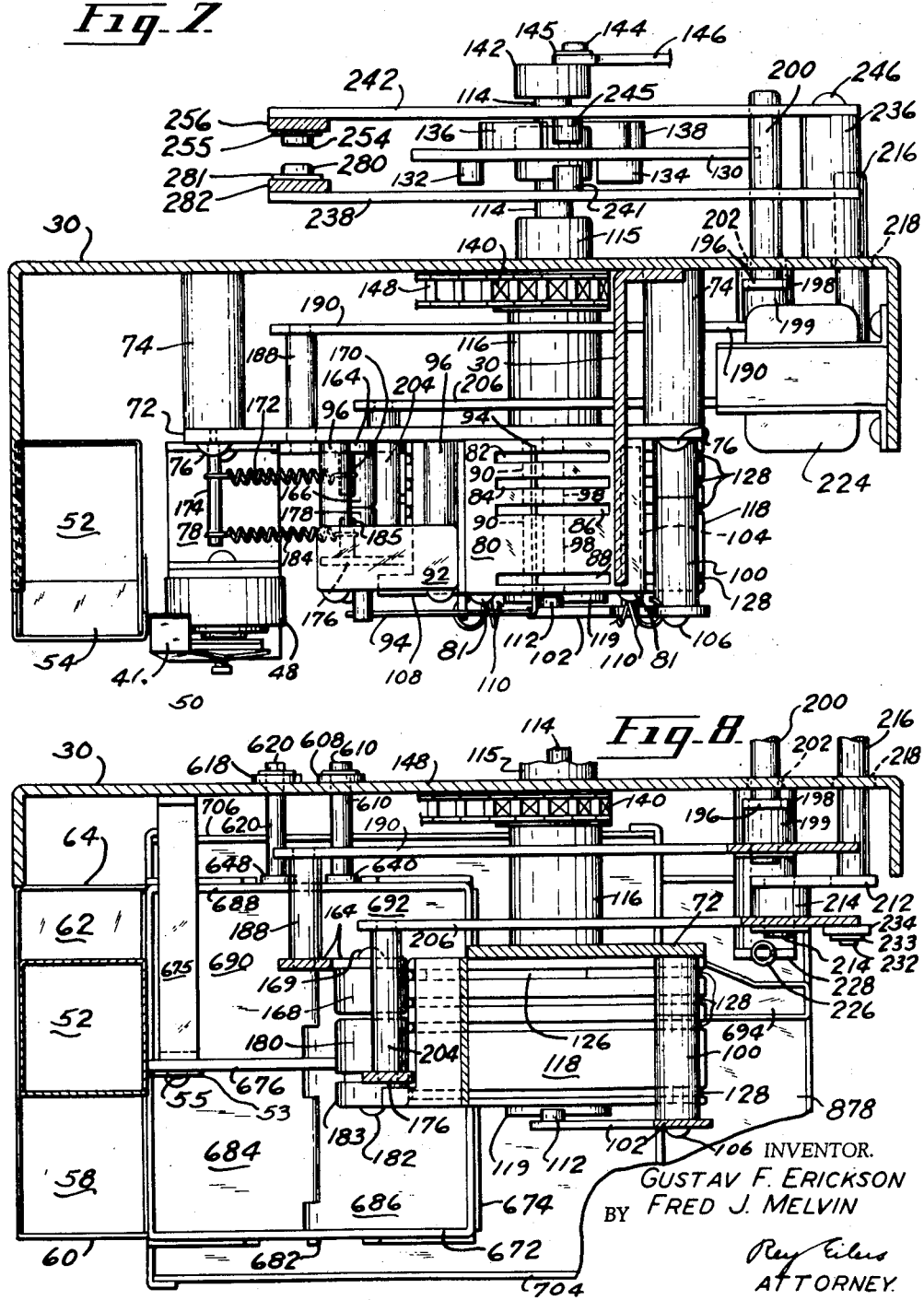

March 9, 1965 G. F. ERICKSON ETAL 3,172,522
COIN SEPARATORS
Original Filed Aug. 10, 1954 9 Sheets-Sheet 5
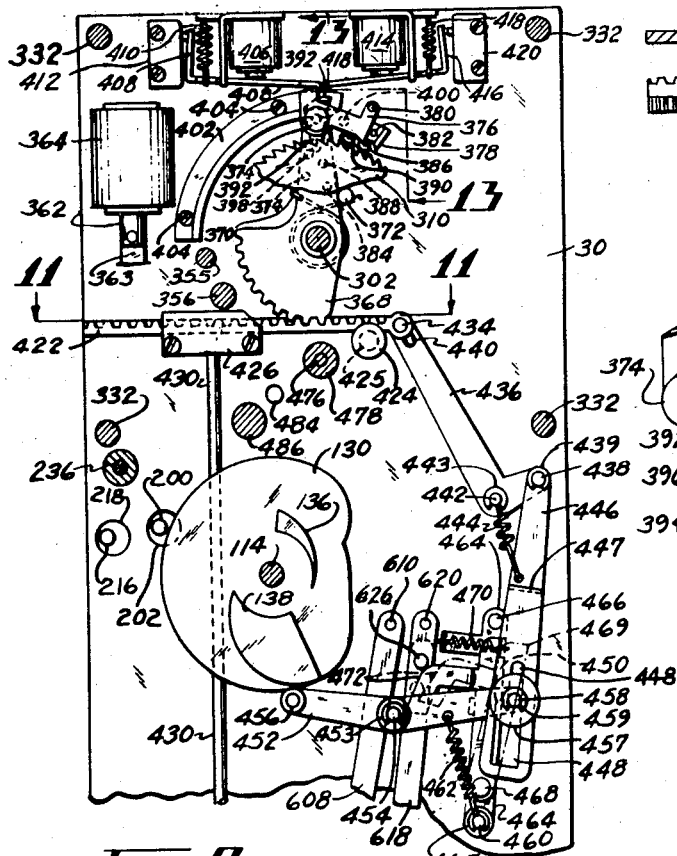
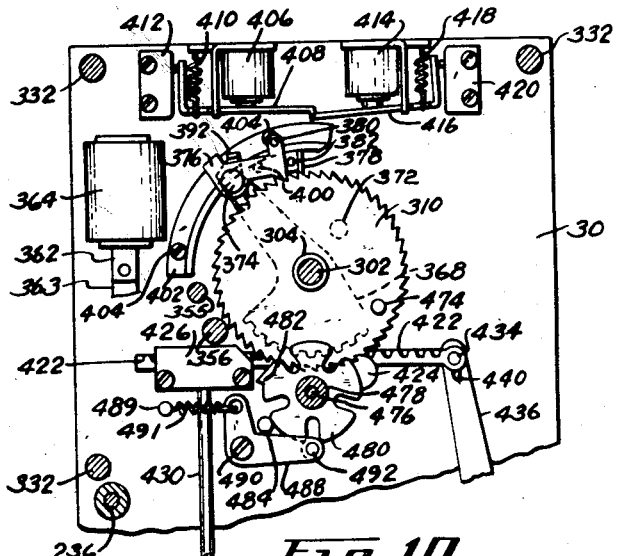
INVENTORS
GUSTAV F. ERICKSON
FRED J. MELVIN
BY
Ray Eilers
ATTORNEY March 9, 1965 G. F. ERICKSON ETAL 3,172,522
COIN SEPARATORS
Original Filed Aug. 10, 1954 9 Sheets-Sheet 6

INVENTOR.
GUSTAV F. ERICKSON
BY FRED J. MELVIN

ATTORNEY.

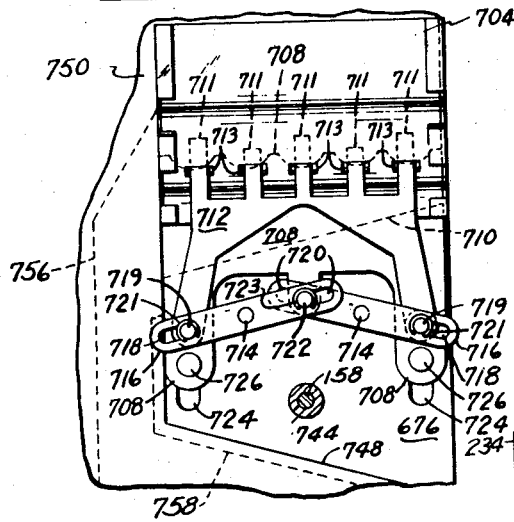

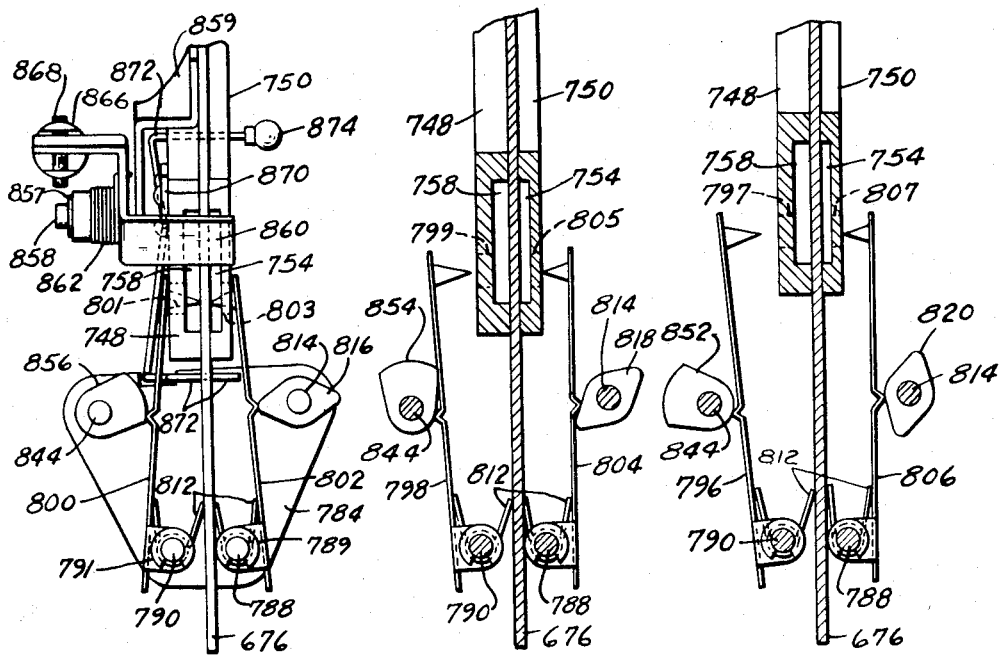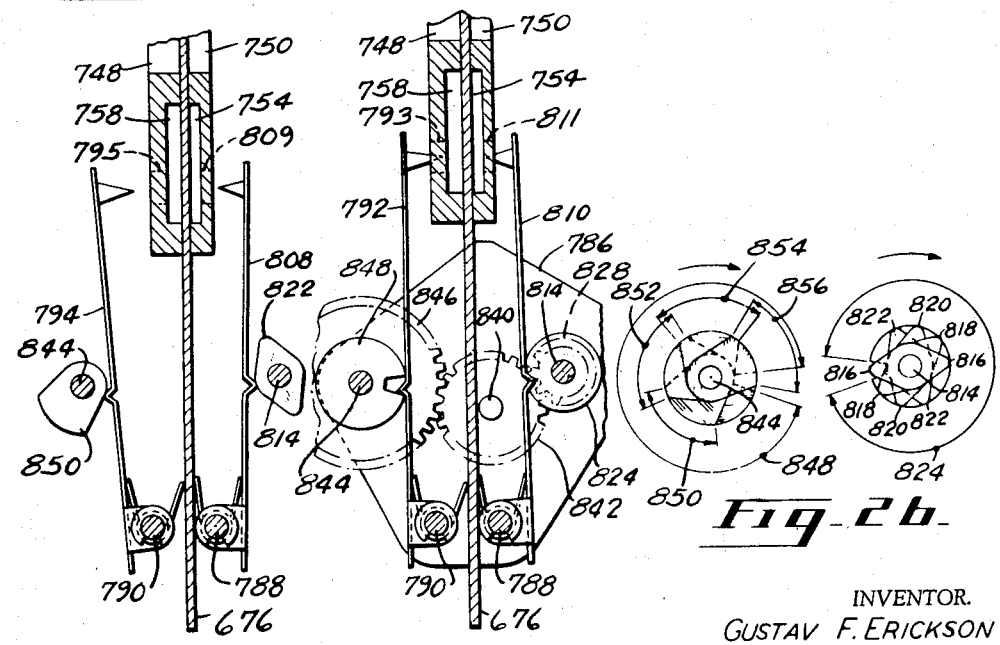

March 9, 1965   G. F. ERICKSON ETAL   3,172,522
COIN SEPARATORS
Original Filed Aug. 10, 1954    9 Sheets-Sheet 9

INVENTOR.
GUSTAV F. ERICKSON
FRED J. MELVIN
BY

Rey Eilers
ATTORNEY

United States Patent Office 3,172,522
Patented Mar. 9, 1965

3,172,522
COIN SEPARATORS
Gustav F. Erickson, Kirkwood, and Fred J. Melvin, Bellefontaine Neighbors, Mo., assignors to National Rejectors, Inc., St. Louis, Mo., a corporation of Missouri
Original application Aug. 10, 1954, Ser. No. 451,266, now Patent No. 3,004,541, dated Oct. 17, 1961. Divided and this application June 6, 1960, Ser. No. 34,251
7 Claims. (Cl. 194—83)

This invention relates to improvements in coin separators. More particularly this invention relates to improvements in coin-handling devices which can respond to the insertion of coinage to store credits, to actuate a secondary device, and to pay out change.

It is therefore an object of the present invention to provide an improved coin-handling device that can receive coinage, can store credits, can actuate a secondary device, and can pay out change.

This is a division of our co-pending application Serial No. 451,266 for Coin Separators which was filed on August 10, 1954, now Patent No. 3,004,541.

The merchandising of goods and services by coin-operated vending machines is a growing and increasingly important business. To meet the present and future needs of such a business, the coin-handling devices for such vending machines should be made so they can respond to coins of different denominations, can be set to receive those coins in random sequence, can be set to establish different sales prices, and can pay out change in the event the customers deposit coinage having values in excess of the sales prices. Such coin-handling devices avoid lost sales that would otherwise occur if the customers had coins of just one denomination and the coin-handling devices responded only to coins of a different denomination; and they obviate the resistance which customers naturally have to vending machines that require the customers to deposit coins in a prescribed order. In addition, such coin-handling devices make it possible for the operators thereof to vary the sales prices from time to time, and they permit different articles with different sales prices to be handled simultaneously in the same vending machine. Furthermore, such coin-handling devices do not require the customers to have exact change; instead they permit the customers to deposit coinage exceeding the sales prices, and then they pay out the exact amount of change that is needed. Such coin-handling devices are needed to increase the number and kind of goods and services that can be provided by coin-operated vending machines. The present invention provides such a coin-handling device; and one embodiment of that coin-handling device can respond to United States pennies, nickels, dimes and quarters, it can receive those coins in random and disconnected order, it can be set to establish sales prices ranging from less than a nickel to as much as four dollars and ninety nine cents, and it can pay out as much as twenty-four cents worth of change. It is therefore an object of the present invention to provide a coin-handling device which can respond to coins of different denominations, can be set to receive those coins in random sequence, can be set to establish different sales prices, and can pay out change.

To be commercially acceptable, coin-handling devices must occupy as little space as possible. The present invention provides a coin-handling device that is compact and that can fit within a small space; and the credit-storing device of that coin-handling device accounts, in part, for the compactness of that coin-handling device. That credit-storing device has two sections; one section storing credits that are within a particular range, and the other section storing credits that are integral multiples of that range. Thus, in the said one embodiment of the coin-handling device of the present invention, one section stores credits in the range from zero through ninety nine cents, while the other section stores credits—each of which credits corresponds to the full zero through ninety nine cent range of the said one section. Hence, instead of having a credit arm that passes through five hundred separate and distinct positions, the credit-storing device of the said one embodiment of the present invention has a credit arm that need only pass through one hundred positions; and each time it does so in the course of a single credit-storing operation it will cause the credit arm of the second section to advance one step. The great saving in size that this two-section credit-storing device affords should thus be clearly apparent. It is therefore an object of the present invention to provide a credit-storing device, for coin-handling devices that has a section which stores credits that are within a particular range, and that has a second section which stores credits that are integral multiples of that range.

The use of a two-section credit-storing device makes the overall size of each section very much smaller than the size of a one-section credit-storing device of comparable capacity. As a result the said one section, of the said one embodiment of the present invention, can be made relatively large while still being materially smaller than a one-section credit-storing device with a capacity equal to that of the two-section credit-storing device. The relatively larger size of that one section of the two-section credit-storing device is very desirable because it enables the operators of the vending machines to set the sales prices quickly and with absolute accuracy. It is therefore an object of the present invention to provide a two-section credit-storing device for coin-handling devices wherein one of the sections is made relatively large to facilitate rapid and precise setting of the sales prices.

The compactness of the said one embodiment of the present invention is also due, in part, to the novel combination of escrow chamber and coin-aligning hopper therein. The escrow chamber receives and holds coins in random and unoriented arrangements, and those coins can move relative to each other until they occupy an area of low height. In so moving, the coins can spread out; and thus the escrow chamber of the present invention can be shorter than escrow chambers, of equal capacity, wherein the coins are oriented in face-to-face or edge-to-edge relation. The coins in the escrow chamber can be selectively returned to the customer or can be directed to the coin-aligning hopper. That hopper will receive those coins in random and unoriented arrangements, and it will commingle those coins with other coins already in that hopper. In doing so, that hopper will enable all of the coins therein to move relative to each other and occupy the lowest possible height. In the hopper, as in the escrow chamber, the random and unoriented arrangements of the coins minimize the total overall height required. Hence the escrow chamber and coin-aligning hopper of the present invention provide large coin-holding capacity within a limited overall vertical distance; and the coin-aligning action of the hopper restores the required oriented arrangement of the coins supplied to the change pay-out system. It is therefore an object of the present invention to provide an escrow chamber for coin-handling devices that holds coins in random and unoriented arrangements and to provide a coin-aligning hopper that can receive coins from said escrow chamber in random and unoriented arrangements but can thereafter orient those coins.

The coin-aligning hopper, of the said one embodiment of the present invention, has a plate that is movable in a vertical plane and that has an inclined runway on it. That hopper also has a second vertically movable plate; and the two plates are spaced apart a short distance in the horizontal direction, and they rise and fall at different times.

The first said plate has the upper edge thereof scalloped away to define coin-agitating projections thereon, and the second said plate has fingers of varying length extending upwardly from it; and those projections and fingers engage and agitate the coins in the hopper. The actions of those projections and fingers combine with the alternating rise and fall of the two plates to assure full and prompt movement of the coins onto the runway of the first said plate; such movement providing the desired alignment of the coins. It is therefore an object of the present invention to provide a coin-aligning hopper with horizontally spaced vertically directed plates that rise and fall alternately; and to scallop the upper edge of one of those plates and to provide fingers on the other of those plates.

The coin-handling device of the present invention can pay out change when the coinage inserted by the customer exceeds the sales price of the goods or services desired by the customer. That change must be replenished during the operation of the coin-handling device or the change-making capabilities of that coin-handling device will be limited. The said one embodiment of the present invention avoids any such limitation by using two coin-aligning hoppers and by directing the coins from those hoppers into the change payout system. One of the coin-aligning hoppers will receive and align pennies, while the other coin-aligning hopper will receive and align nickels. As a result, an ample supply of pennies and nickels, for change-making purposes, can be maintained in the coin-handling device of the present invention. It is therefore an object of the present invention to provide coin-handling devices with coin-aligning hoppers that align and direct coins to change payout systems, thereby replenishing the supply of change for those systems.

The change payout system, of the coin-handling device provided by the present invention, is normally disconnected from the credit-storing device of that coin-handling device; but it is connected to that credit-storing device when the sales price has been reached. The connection of the change payout system to the credit-storing device is positive and immediate; and once that connection has been set up, the credit-storing device and the change payout system will respond to the establishment of additional credits to act in unison and synchrony. As a result, there is no opportunity for errors in the paying out of change. It is therefore an object of the present invention to provide a change payout system that is normally disconnected from the credit-storing device of a coin-handling device, but that is positively and immediately connected to that credit-storing device when the sales price is reached.

In the operation of coin-operated vending machines, the customers sometimes insert one or more coins and then change their minds and want to get their money back. The coin-handling device provided by the present invention utilizes a number of escrow chambers to receive and hold the deposited coins; and those coins will not be directed toward the coin box or change payout system of the coin-handling device until the credit arm reaches the sales price. Consequently, the customer can change his mind at any time prior to the instant the credit arm reaches the sales price. It is therefore an object of the present invention to provide a coin-handling device wherein the customer can change his mind and recover his money at any time prior to the moment the credit arm reaches the sales price.

Other and further objects and advantages of the present invention should become apparent from an examination of the drawing and accompanying description.

In the drawing and accompanying description several preferred embodiments of the present invention are shown or described but it is to be understood that the drawing and accompanying description are for the purpose of illustration only and do not limit the invention and that the invention will be defined by the appended claims.

Figure 2:
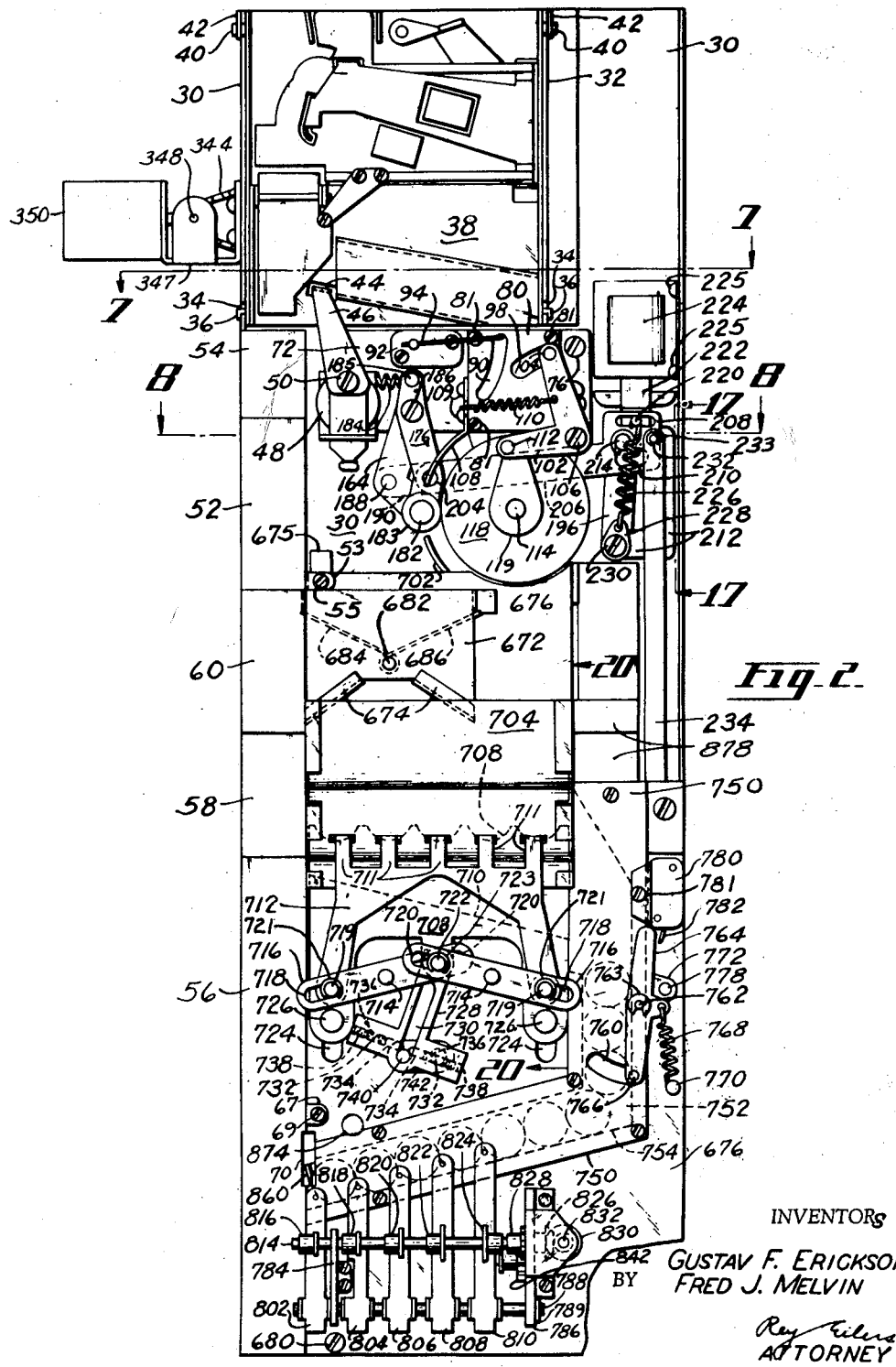
Figure 16:
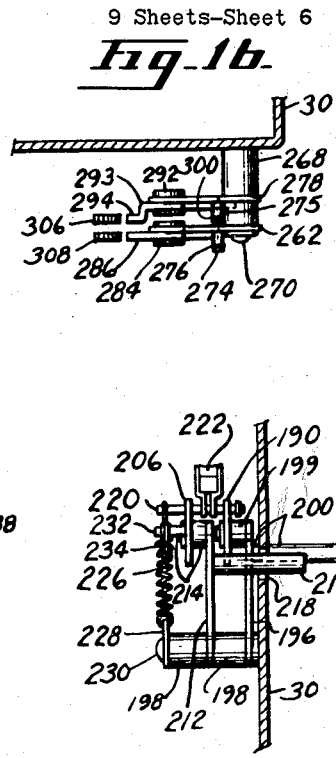
Figure 14:
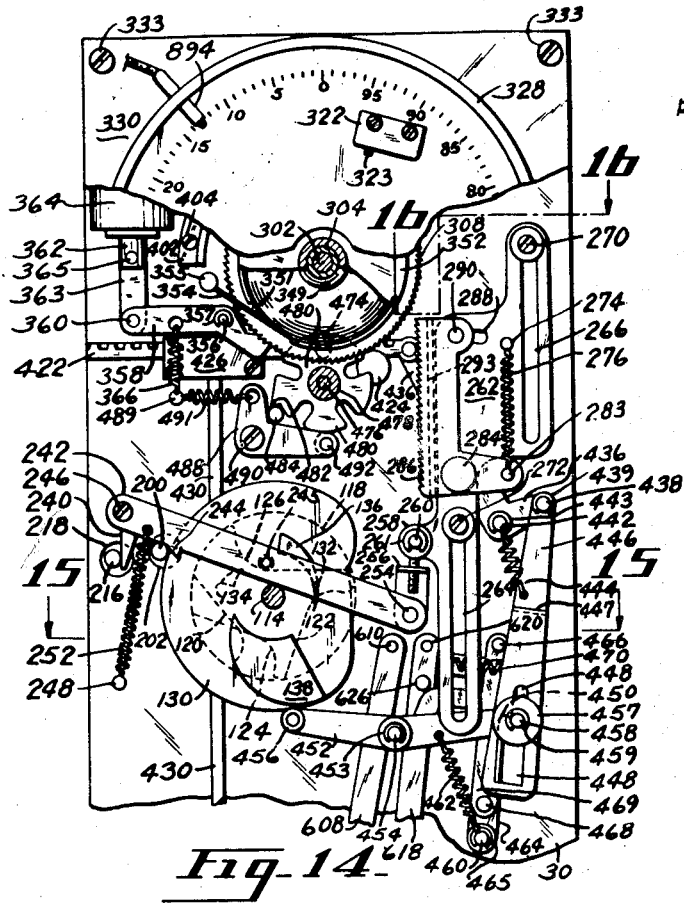
Figure 17:
Figure 15:
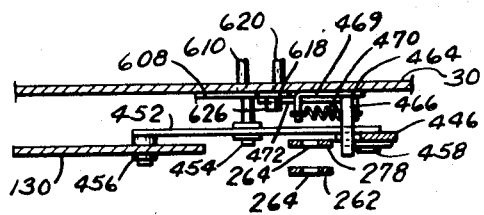
Figure 22:
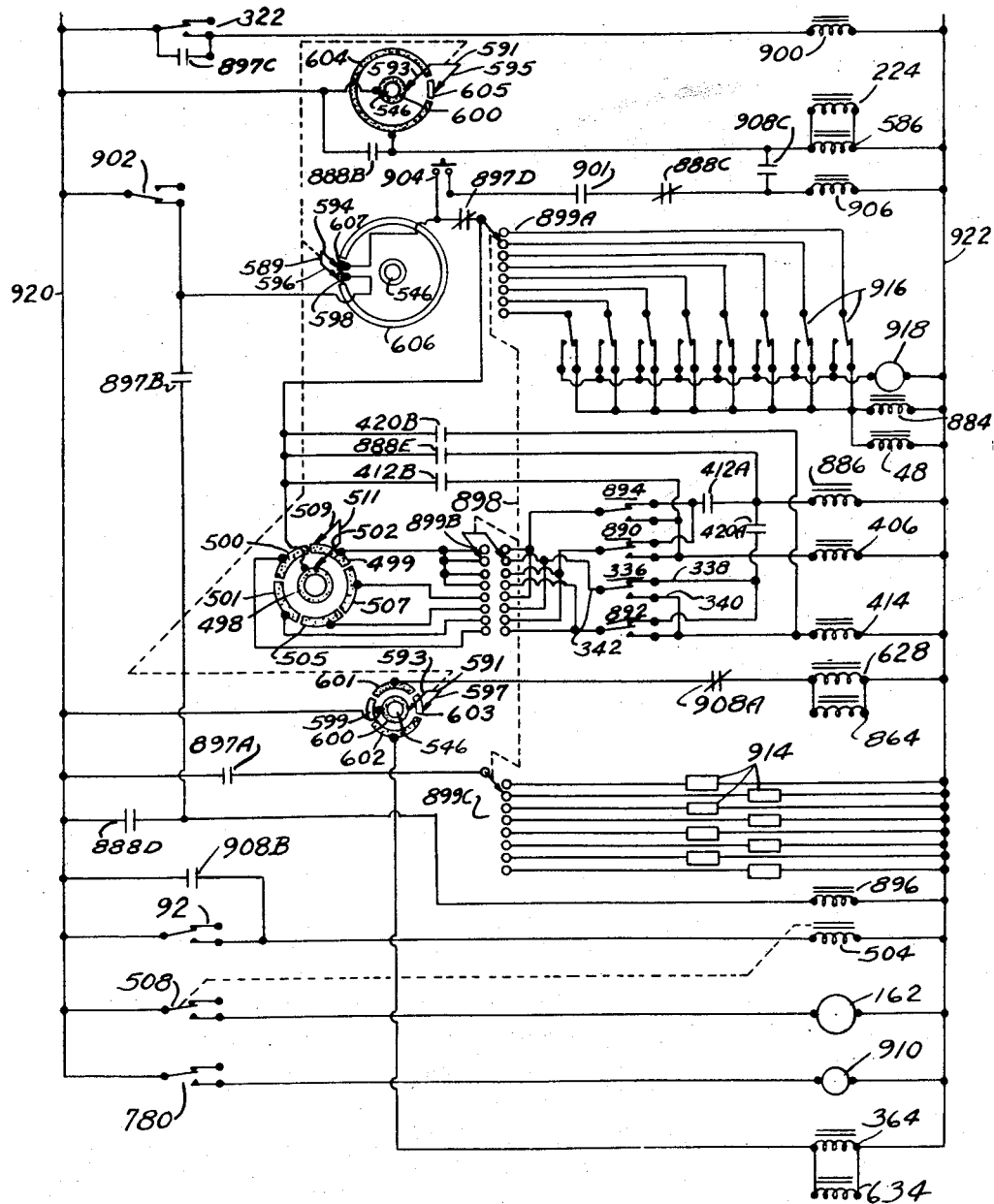

In the drawing, FIG. 1 is a partially broken-away front elevational view of a preferred embodiment of the coin-handling device provided by the present invention, FIG. 2 is a partially broken-away rear elevational view of the coin-handling device of FIG. 1, FIG. 3 is an end elevational view of the coin-handling device of FIGS. 1 and 2, and it shows the left hand end of that device as that device is viewed in FIG. 1, FIG. 4 is a sectional end view of a portion of the coin-handling device of FIGS. 1–3, and it is taken along the plane indicated by the line 4—4 in FIG. 1, FIG. 5 is a front sectional view of a portion of the coin-handling device of FIGS. 1–3, and it is taken along the plane indicated by the line 5—5 in FIG. 3, FIG. 6 is a rear sectional view of the coin-handling device of FIGS. 1–3, and it is taken along the plane indicated by the line 6—6 in FIG. 3, FIG. 7 is a sectional view in plan of the coin-handling device of FIGS. 1–3, and it is taken along the plane indicated by the line 7—7 in FIG. 2, FIG. 8 is a partially broken-away sectional view in plan of the coin-handling device of FIGS. 1–3, and it is taken along the plane indicated by the line 8—8 in FIG. 2, FIG. 9 is a front sectional view of a portion of the coin-handling device of FIGS. 1–3; some of the parts have been removed and broken away for clarity of illustration, FIG. 10 is another front sectional view similar to that of FIG. 9; some of the parts that were removed and broken away in FIG. 9 being shown in full in FIG. 10, FIG. 11 is a sectional view in plan of a portion of the coin-handling device of FIGS. 1–3, and it is taken along the plane indicated by the line 11—11 in FIG. 9, FIG. 12 is a perspective view of a portion of the upper end of a gear segment and of the two pawls and lever carried thereby, FIG. 13 is a partially broken-away sectional end view of a portion of the coin-handling device of FIGS. 1–3, and it is taken along the broken plane indicated by the line 13—13 in FIG. 9, FIG. 14 is a partially broken-away front sectional view of the upper portion of the coin-handling device of FIGS. 1–3, FIG. 15 is a sectional view in plan of a portion of the coin-handling device of FIGS. 1–3, and it is taken along the plane indicated by the line 15—15 in FIG. 14, FIG. 16 is a sectional view in plan of a portion of the coin-handling device of FIGS. 1–3, and it is taken along the broken plane indicated by the line 16—16 in FIG. 14, FIG. 17 is a sectional end view of a portion of the coin-handling device of FIGS. 1–3, and it is taken along the plane indicated by the line 17—17 in FIG. 2, FIG. 18 is a front sectional view of the lower part of the coin-handling device of FIGS. 1–3, and it is taken along the plane indicated by the line 18—18 in FIG. 3, FIG. 19 is a front sectional view of the central portion of the coin-handling device of FIGS. 1–3 and it is taken along the plane indicated by the line 19—19 in FIG. 3, FIG. 20 is a sectional end view of a portion of the coin-handling device of FIGS. 1–3, and it is taken along the plane indicated by the line 20—20 in FIG. 2, FIG. 21 is a sectional end view of a portion of the coin-handling device of FIGS. 1–3, and it is taken along the plane indicated by the line 21—21 in FIG. 18, FIG. 22 is a sectional end view similar to FIG. 21, but it is taken along a plane that is spaced to the left of the plane indicated by the line 21—21 in FIG. 18, FIG. 23 is a sectional end view similar to FIGS. 21 and 22, but it is taken along a plane spaced to the left of the plane of FIG. 22, FIG. 24 is a sectional view similar to FIGS. 21–23, but it is taken along a plane spaced to the left of the plane of FIG. 23, FIG. 25 is a sectional end view similar to FIGS. 21–24, but it is taken along a plane spaced to the left of the plane of FIG. 24, FIG. 26 is a diagrammatic view of the two cam shafts and cams of the change payout system of the coin-handling device provided by the present invention, and FIG. 27 is a schematic view of one form of electrical circuit that can be used in a vending machine that embodies the coin-handling device of the present invention.

Referring to the drawing in detail, the numeral 30 generally denotes a frame for the said preferred embodiment of coin-handling device provided by the present invention. That frame consists of a center wall which has flanges at the opposite side edges thereof. Those flanges are vertically disposed, and they stiffen the center wall of the frame 30. That frame will be suitably secured within a vending machine or other secondary device by bolts, screws, or clamps.

The coin-handling device of the present invention can be used with many different kinds of secondary devices. For example, that coin-handling device can be used with machines that vend products, and it can be used with machines that dispense services. In fact, the coin-handling device provided by the present invention can be used with almost any secondary device that is intended to respond to the insertion of coins to provide a desired response.

The frame 30 is substantial, and it will provide the principal support for the coin-handling device of the present invention. The numeral 32 denotes a plate that is vertically directed and that has a foot secured to the center wall of the frame 30; and that plate is shown in FIGS. 2 and 3. That foot can be suitably secured to the center wall of frame 30 by bolts, rivets, welds or the like. The plate 32 will be spaced from but will confront the inner face of the left hand flange of the frame 30, as that frame is viewed in FIG. 2. The plate 32 will coact with that flange of frame 30 to define a space which can receive a slug rejector 38. That slug rejector can be of the type shown in Merral P. Haverstick application Serial Number 370,456 which was filed July 29, 1953, now Patent No. 2,827,996 for "Coin Separators." While other slug rejectors could be used, the said slug rejector separates coins and slugs with a high degree of accuracy. That slug rejector is able to receive coins of four different denominations and to test and separate those coins before directing those coins to four spaced outlets of the slug rejector. In one embodiment of that slug rejector, pennies, nickels, dimes and quarters can be received, tested, separated and directed to four separate and distinct coin outlets. Furthermore that slug rejector accepts those four coins in random sequence.

A slot 34 is formed in the plate 32, and a similar slot 34 is formed in the flange at the left hand side of the frame 30; and those slots receive pins 36 which are carried by the slug rejector 38 adjacent the bottom thereof. The slots 34 have horizontally directed portions and have notches at the bottoms thereof; those notches being contiguous with the horizontal portions of those slots. The pins 36 can pass freely through the horizontal portions of the slots 34 and will then rest in the notches. The slug rejector 38 also has pins 40 at the top thereof, and those pins are releasably held by pivoted levers 42. One of those levers is pivoted to the plate 32, and the other of those levers is pivoted to the left hand flange of the frame 30, as that frame is viewed in FIG. 2. The levers 42 have notches at their free ends, and those notches releasably fit down over the pins 40 and hold the upper end of the slug rejector against inward or outward movement. Hence, the levers 42 coact with the notches of slots 34 to releasably hold the slug rejector 38 in fixed position relative to the frame 30 of the coin-handling device.

The slug rejector 38 has an opening 44 in one wall thereof, and that opening selectively receives a movable arm 46 that is connected to the armature of an electro-magnet 48. The arm 46 is secured to the armature of the electro-magnet 48 by a pivot 50 which has a spring 51 surrounding it; the spring 51 biasing the movable arm 46 toward the armature of the electro-magnet 48 to enable that arm and that armature to move as a unit during the normal operation of the coin-handling device. However, the spring 51 can yield and permit the arm 46 to be rotated relative to the armature of the electro-magnet 48; and this will be done whenever the slug rejector 38 is to be assembled with or separated from the frame 30. The provision of the opening 44 and the use of the arm 46 and electro-magnet 48 is in accordance with the teachings of Merral P. Haverstick application Serial Number 375,621 which was filed August 21, 1953, now Patent No. 2,885,050 for "Coin Separators."

The numeral 52 denotes a vertically directed chute for coins or slugs that are rejected by the slug rejector 38. The upper end of the chute 52 is denoted by the numeral 54, and it is immediately below the left hand end of the slug rejector 38, as that slug rejector is viewed in FIG. 2; and it will receive coins or slugs that are rejected by the slug rejector 38. The upper end 54 of the chute 52 is inclined rearwardly from the center wall of the frame 30; and the inclination of that upper end 54 facilitates the receipt, by the chute 52, of all coins and slugs released by the slug rejector 38. The lower end of the chute 52 has an ear 53 thereon, and that ear has an opening that receives a screw 55. That screw extends into the upper portion of a supporting wall 676 which is spaced rearwardly of the center wall of the frame 30. The wall 676 is mounted on a bracket 675 which is at the upper end of that wall, and on studs 678 which are at the lower end of that wall. The bracket 675 and the studs 678 extend between the center wall of the frame 30 and the wall 676. Screws 680 extend through the wall 676 and seat in the studs 678.

The numeral 56 denotes a returned coin chute, and that chute is vertically directed. The upper end of the returned coin chute 56 has an inclined portion 58 and a vertical portion 60 at the rear thereof, and it has an inclined portion 62 and a vertical portion 64 at the front thereof. The inclined portions 58 and 62 diverge and coact with the vertical portions 60 and 64 to provide a wide entrance for the returned coil chute 56. The upper end of the returned coin chute 56 is directly below, and is contiguous with, the outlet of the rejected coin chute 52. Hence, the two chutes coact to provide a substantially continuous coin chute which has additional entrances intermediate its top and bottom. These additional entrances are defined by the inclined portions 58 and 62 and by the vertical portions 60 and 64 of the returned coin chute 56. Another additional entrance to the returned coin chute 56 is provided at the front of that chute. That additional entrance is shown in FIG. 18, and it includes an inclined wall portion 66 and a vertical wall portion 68. The wall portion 66 inclines forwardly from the plane of the front wall of the chute 56, and it displaces the vertical wall 68 from that front wall. The combination coin chute formed from chutes 52 and 56 thus has four places where coins can be introduced: first, at the upper end 54 of the rejected coin chute 52, second, at the opening defined by the inclined wall 58 and the vertical wall 60, third, at the opening defined by the inclined wall 62 and the vertical wall 64, and fourth, at the opening defined by the inclined wall 66 and the vertical wall 68. All coins entering the combination chute will be directed to the outet at the bottom of the returned coin chute 56; and will thereafter be directed to an opening at the exterior of the secondary device where they can be recovered by the customer.

The returned coin chute 56 has an ear 67 thereon intermediate the upper and lower ends thereof, and that ear overlies the left hand edge of the plate 676. A screw 69 extends through an opening in the ear 67 and seats in the wall 676, thereby securing the chute 56 to the wall 676. The screws 55 and 69 coact with the ears 53 and 67 to secure the combination chute rigidly to the plate 676. An opening 70 is formed at the right hand of the chute 56, as the chute is viewed in FIG. 2; and that opening perimts additional coins to be introduced into the chute 56 for delivery to the customer.

The numeral 72 denotes a vertical wall or plate which is mounted on studs 74 that are secured to and extend rearwardly from the center wall of the frame 30. Screws 76 extend through the plate 72 and seat in those studs, thereby preventing accidental separation of plate 72 and studs 74. The plate 72 supports one end of a horizontal bracket 78 which extends rearwardly from that plate. That bracket has an upwardly bent end that receives and supports the electro-magnet 48, as best shown in FIG. 7.

A block 80 is mounted on the rear face of the plate 72; and that block is secured to that plate by elongated screws 81 which extend through that block and seat in that plate. The block 80 can be fabricated from a series of plates which are assembled in face-to-face relation, or it can be cast as a unit. In either case, the block 80 will have a plurality of coin passages through it; and in the preferred embodiment shown, that block has four such passages. Those passages are denoted by the numerals 82, 84, 86 and 88; and those passages will register with the accepted coin outlets of the slug rejector 38. In the said preferred embodiment, the passage 82 is in register with the quarter outlet of the slug rejector, the passage 84 is in register with the dime outlet of the slug rejector, the passage 86 is in register with the nickel outlet of the slug rejector, and the passage 88 is in register with the penny outlet of the slug rejector. However, it should be understood that where coins of other and different denominations are to be handled by the slug rejector 38, the block 80 will have the passages thereof modified to accommodate the coins that issue from the accepted coin outlets of that slug ejector.

An arcuate slot 90 is formed at the left hand side of the block 80, and that slot communicates with each of the coin passages 82, 84, 86 and 88. An electric switch 92 is mounted adjacent the block 80, and it has an actuator 94 that extends into the arcuate slot 90 of the block 80. The switch 92 is mounted on studs 96 that in turn are mounted on the plate or wall 72. The actuator 94 will rotate about a pivot of the switch 92, and the free end of that actuator will describe an arc which is similar to the arcuate configuration of the slot 90 in the block 80. The actuator 94 will extend all the way into the arcuate slot 90 so that coins passing through the passages 82, 84, 86 or 88 can engage and force that actuator downwardly.

A second arcuate slot 98 is provided at the right hand side of the block 80, and that arcuate slot communicates with each of the coin passages 82, 84, 86 and 88. A lever 102, that is generally L-shaped, has a pin 104 that extends all the way into the arcuate slot 98. That pin can block all of the coin passages 82, 84, 86 or 88 when it is at the left hand end of the arcuate slot 98, as that slot is viewed in FIG. 2. However, that pin will permit coins to pass freely from the coin passages 82, 84, 86 and 88 when it is at the right hand end of the arcuate slot 98, as that slot is viewed in FIG. 2.

The lever 102 is pivoted to a stud 100 by a screw 106; and that stud is secured to and extends rearwardly from the plate 72. The screw 106 confines the lever 102 for rotation in such a way that the path of the pin 104 is similar to the arcuate configuration of the slot 98. A pin 112 is also provided on the lever 102, and that pin extends forwardly a short distance toward the plate 72.

A plate 108 has a vertically directed portion which is secured to the left hand face of the block 80 by screws 109. The lower portion of that plate is arcuate, and it extends below the level of the bottom of the block 80. A spring 110 is secured to an ear on the plate 108 and to an opening in the lever 102. That spring biases the lever 102 for rotation in a counter clockwise direction, as that lever is viewed in FIG. 2. Hence, the spring 110 biases the pin 104 on lever 102 toward the left hand end of the slot 98.

The numeral 114 denotes a rotatable shaft which extends through and is supported by a bushing 115 on the center wall of the frame 30, and by a bushing 116 on the plate 72. That shaft supports a cylindrical coin wheel or drum 118; and that coin wheel is disposed rearwardly of the center wall of the frame 30 and of the plate 72. The coin wheel 118 has a cam 119 at its rear face, and that cam engages and drives the pin 112 on lever 102. The cam 119 has a high point which forces lever 102 to rotate, in a clockwise direction, to the position shown in FIG. 2; but the rest of the periphery of that cam will permit the lever 102 to rotate under the action of spring 110 and hold the pin 104 adjacent the left hand end of the slot 98, as that slot is viewed in FIG. 2. In such position, the pin locks the coin passages 82, 84, 86 and 88.

The coin wheel 118 has a plurality of pockets to receive coins, and those pockets are spaced axially and circumferentially of that coin wheel. Those pockets are denoted by the numerals 120, 122, 124 and 126; and they move into registration with the coin passages of the block 80. For example, in the said preferred embodiment, the coin pocket 120 is registerable with the coin passage 88, the coin pocket 122 is registerable with the coin passage 86, the coin pocket 124 is registerable with the coin passage 84, and the coin pocket 126 is registerable with the coin passage 82. Thus, the coin pocket 120 will receive pennies, the coin pocket 122 will receive nickels, the coin pocket 124 will receive dimes, and the coin pocket 126 will receive quarters. Each of the coin pockets has a shallow end and a deep end, and in each case the shallow end is the leading end. The coin wheel 118 will receive coins from the passages in the block 80, and it will carry those coins past any given point in a certain sequence; namely, a quarter, a penny, a dime, and a nickel.

The coin wheel 118 has a plurality of circumferentially extending grooves 128 in the periphery thereof. These grooves are in register with the coin pockets 120, 122, 124 and 126, and they are wide enough to accommodate the bottom edges of coins which are introduced into the coin passages 82, 84, 86 and 88 of the block 80. The side edges of the peripheral grooves 128 will coact with the side walls of the passages 82, 84, 86 and 88 of the block 80 to provide lateral support for the coins which are preparing to enter, but have not yet entered, the coin pockets 126, 120, 124 and 122.

A cam disc 130 is secured to the shaft 114 at a point which is spaced forwardly of the center wall of the frame 30. That cam disc is rigidly secured to the shaft 114 in such a way that there is a positive relationship between the angular position of the coin wheel 118 and the angular position of the cam disc 130. That relationship is indicated in FIG. 14.

The cam disc 130 provides two angularly spaced camming surfaces on each of its opposite faces. The rear face of the cam disc 130 has a camming surface 132 in the form of a pin, and has a second camming surface 134 of generally triangular configuration. The front face of cam disc 130 has two camming surfaces; one of those surfaces being denoted by the numeral 136 and the other of those surfaces being denoted by the numeral 138. Each of the camming surfaces has its leading edge as part of a circle that is concentric with the shaft 114 but is spaced outwardly of that shaft. Each of the camming surfaces provides an outwardly directed radial thrust; the thrust of the surface 132 being the smallest of all, the thrust of the surface 134 being about five times as great as that of the surface 132, the thrust of the surface 136 being about ten times as great as that of the surface 132, and the thrust of the surface 138 being about twenty-five times as great as the thrust of the surface 132. The camming surface 132 corresponds to the coins in the pocket 120, the camming surface 134 corresponds to the coins in the pocket 122, the camming surface 136 corresponds to the coins in the pocket 124, and the camming surface 138 corresponds to the coins in the pocket 126.

A sprocket pinion 140 is secured to the rotatable shaft 114 intermediate the coin wheel 118 and the cam disc 130. That sprocket pinion is disposed between the bushing 116 and the center wall of the frame 30, as shown particularly in FIGS. 7 and 8. Rotation of the sprocket pinion 140 will cause simultaneous rotation of the coin wheel 118 and the cam disc 130.

A cylindrical disc 142 is fixedly secured on the front end of the shaft 114. That disc has an eccentric pin 144 projecting from it, and a connecting rod 146 is secured to that eccentric pin. A C-washer 145 is used to maintain the connecting rod 146 in assembled relation with the eccentric pin 144. Rotation of the shaft 114 will cause the eccentric pin 144 to follow a circular path that is disposed radially outwardly of the axis of the shaft 114; and this will cause the connecting rod 146 to follow a generally reciprocatory path.

A sprocket chain 148 extends around and meshes with the sprocket pinion 140. That chain also extends to and meshes with a sprocket pinion 152 which rotates on a pivot 150. The pivot 150 is fixedly secured to and supported by the center wall of the frame 30. A pivot 154 is secured to the center wall of the frame 30 at a point which is below and spaced to the left of the pivot 150 as those pivots are viewed in FIG. 1. The pivot 154 rotatably supports a roller 156; and the sprocket chain 148 extends around that roller.

An electric motor 162 is spaced from the center wall of the frame 30 by studs 161, but it is held fixedly in relation to that center wall by those studs. The shaft 158 of that motor extends through an opening in the center wall of the frame 30, and that shaft has a sprocket pinion 160 mounted on it. That sprocket pinion meshes with the sprocket chain 148 and drives it. Hence, rotation of the motor shaft 158 will cause rotation of the sprocket pinion 140; and this in turn will cause the shaft 114 to rotate and drive the coin wheel 118, the cam disc 130, and the eccentric pin 144.

A generally L-shaped lever 164 is mounted behind the center wall of the frame 30; and that lever has a bushing 166 which telescopes over a pivot, not shown, which is secured to the plate 72 and which has a screw 186 seated in its outer end. The bushing 166 is located intermediate the center and the upper end of the lever 164. A pin 169 is carried by the lower end of the lever 164, and that pin carries a roller 168. The lever 164 holds the roller 168 in register with the pockets 124 and 126 of the coin wheel 118. A pin 170 is mounted on the lever 164 adjacent the top thereof, and that pin receives one end of a helical extension spring 172. The other end of that spring is held by a pin 174 which is mounted on the plate 72, and which extends rearwardly from the plate. A lever 176 is disposed adjacent the lever 164, and it has a bushing 178 on it. This bushing telescopes over the pivot, not shown, which supports the bushing 166 and which has the screw 186 seated in its outer end. That pivot coacts with the bushings 166 and 178 to permit the levers 164 and 176 to rotate relative to each other and relative to the coin wheel 118. A pin 182 is mounted on the lower end of lever 176, and that pin rotatably supports the roller 180. That pin also secures a disc-like washer 183 to the lower end of the lever 176; the roller 180 and the washer 183 being oppositely disposed of the lever 176. The pins 169 and 182 are preferably inserted through the rollers 168 and 180 and the levers 164 and 176 and then riveted over to provide two separate but permanent assemblies. The disc-like washer 183 is, in effect, an extension of roller 180 and it is telescoped over pin 182 before the riveting operation.

A pin 185 is secured to the upper end of the lever 176, and a helical extension spring 184 extends from the pin 185 to the pin 174. This spring tends to rotate the lever 176 about its pivot in a counter clockwise direction, as that lever is viewed in FIG. 2. The extension spring 172 similarly tends to rotate the lever 164 about its pivot in a counter clockwise direction. The action of these springs thus causes the roller 168 and the roller 180 and its extension 183 to be disposed adjacent, and to roll along, the periphery of the coin wheel 118.

A pin 188 is carried by the lever 164, and that pin extends into an opening in one end of a connecting rod 190. The pin 188 will serve to connect the lever 164 to the connecting rod 190, and it will also serve as a pivot for the connecting rod. The connecting rod 190 extends to the right, as that rod is viewed in FIG. 2, and extends slightly upwardly above the horizontal. However, only a small part of that rod is visible because it lies behind other parts of the coin-handling device. The right hand end of the connecting rod 190, as that rod is viewed in FIG. 2, has a horizontal slot 192. That slot, and that end of the connecting rod 190 are best shown in FIG. 2. The slot 192 is elongated, and it is close to that end of the connecting rod 190. An L-shaped slot 194 is provided in that same end of the connecting rod 190, and that slot has a vertically directed arm and a horizontally directed arm. The horizontally directed arm of the L-shaped slot 194 is closer to the end of the rod 190 than is the vertically directed arm of that slot.

A pivot 198, of the pin and sleeve type, is secured to the center wall of the frame 30, and that pivot extends rearwardly from that wall. A generally vertical lever 196 has the lower end thereof mounted on the pivot 198, and that lever can oscillate about the pivot 198. A pin and sleeve combination 199 connects the upper end of the lever 196 with the adjacent end of the connecting rod 190. The pin of that combination extends into the L-shaped slot 194 of the connecting rod 190; and it will normally lodge in the upper portion of the vertical arm of that slot. However, that end of the connecting rod 190 can be lifted upwardly to place the horizontal arm of the slot 194 in register with the pin of the combination 199. A pin 200 is fixedly secured to the upper end of the lever 196, and that pin extends forwardly through an opening 202 in the center wall of the frame 30.

A pin 204 is carried by the lever 176, and that pin is comparable to the pin 188 carried by the lever 164. A connecting rod 206, which is similar to the connecting rod 190, has one end thereof telescoping over the pin 204. The connecting rod 206 can rotate relative to the pin 204 but it will be held in permanent assembly with that pin. The principal difference between the connecting rods 190 and 206 is that the connecting rod 190 is longer than the connecting rod 206. The right hand end of the connecting rod 206 as that rod is viewed in FIG. 2, has an elongated horizontal slot 208 similar to the horizontal slot 192 in the connecting rod 190. Furthermore, the connecting rod 206 has an L-shaped slot 210 which is similar to the L-shaped slot 194 of the connecting rod 190.

A C-shaped lever 212 is mounted on the pivot 198; and that lever carries a pin and sleeve combination 214 that is comparable to the pin and sleeve combination 199. The pin of the combination 214 extends into the L-shaped slot 210 of the connecting rod 206. Normally the pin 214 will lodge in the vertical arm of the L-shaped slot 210, but when the right hand end of the connecting rod 206 is raised, that pin will lodge in the horizontal arm of that L-shaped slot. A pin 216 is secured to the C-shaped lever adjacent the upper end thereof, and that pin extends forwardly through an opening 218 in the center wall of the frame 30.

An elongated pin 220 extends through the horizontal slots 192 and 208 of the connecting rods 190 and 206 respectively. That pin also extends through an opening in the lower end of the armature 222 of a solenoid 224. This solenoid is referred to as the credit disconnect solenoid; and it is secured to the right hand flange of the frame 30, as that frame is viewed in FIG. 2. A helical extension spring 226 engages the pin 220 and also engages an eyeplate 228 which is secured to the outer end of the pin of the combination 198 by a screw 230. The spring 226 applies a downward force to the pin 220; and that force is transmitted to the connecting rods 206 and 190 and tends to force the upper ends of the L-shaped slots 210 and 194 downwardly to place the pins 214 and 199 within the vertical arms of those slots. However, the credit disconnect solenoid 224 can be energized to lift the armature 222 upwardly and pull the ends of the connecting rods up until the pins 214 and 199 lodge in the horizontal arms of the L-shaped slots 210 and 194.

The connecting rod 206 has a pin 232 at the free end thereof, and that pin extends rearwardly from that connecting rod. A generally vertically directed connecting rod 234 has an opening in the upper end thereof, and that opening telescopes over the pin 232. A C-washer 233 telescopes over the pin 232 and releasably secures the connecting rod 234 to that pin.

A pin and sleeve combination 236 is secured to the center wall of the frame 30, and that combination extends forwardly from that center wall. A lever 238 has an opening at one end thereof, and the opening telescopes over the pin of the combination 236. An inclined face 240 is formed on the lower edge of the lever 238, adjacent the pin and sleeve combination 236, and that inclined face is in register with the pin 216 that is secured to the C-shaped lever 212. As indicated in FIGS. 1, 9 and 14, the opening 218 in the center wall of the frame 30 is large enough to permit horizontal movement of the pin 216; and such movement enables the pin 216 to act upon the inclined face 240 of the lever 238 and cause that lever to rotate about the combination 236. A cam follower 241, shown in the form of a pin, is mounted on the lever 238 intermediate the ends of that lever. This cam follower can respond to movement of the lever 238 to move into register with the camming surfaces 132 and 134 on the cam disc 130.

A second lever 242, that is generally similar to the lever 238, is also pivoted about the combination 236. The lever 242 has an inclined face 244 that extends downwardly from the lower edge of that lever; and that face is in register with the pin 200 that is secured to the vertical lever 196. As indicated in FIGS. 1, 9 and 14, the opening 202 in the center wall of the frame 30 is large enough to permit horizontal movement of the pin 200; and such movement enables the pin 200 to engage the inclined face 244 on lever 242 and rotate that lever about the combination 236. The sleeves of the combination 236 maintain the desired spacing between the levers 238 and 242 while permitting ready rotation of those levers relative to each other and relative to the frame 30. A screw 246 extends into the end of the combination 236 and prevents undesired separation of the levers 238 and 242 from that combination.

A cam follower 245, shown in the form of a pin, is mounted on the lever 242. This cam follower is intermediate the ends of the lever 242, and it can respond to movement of that lever to move into register with the camming surfaces 136 and 138 on the cam disc 130. When the cam follower 245 is engaged by the camming surfaces 136 or 138, it will be forced to move in an arcuate path with the combination 236 as its center. Similarly, when the cam follower 241 is engaged by the camming surfaces 132 or 134, it will be forced to follow an arcuate path with the combination 236 as its center.

A pin 248 is secured to the center wall of the frame 30, and that pin extends forwardly from that wall. A helical extension spring 250 is secured to the pin 248 and is also secured to the lever 238. A similar helical extension spring 252 is secured to the pin 248 and to the lever 242. The springs 250 and 252 bias the levers 238 and 242 for rotation in a clockwise direction, as those levers are viewed in FIG. 1. Hence, the springs 250 and 252 normally maintain the levers 238 and 242 in the position shown in FIG. 1, where the cam followers 241 and 245 are closely adjacent the center of the cam disc 130.

A pin 254 is carried by the free end of the lever 242, and a C-washer 255 secures an L-shaped plate 256 to that pin. This L-shaped plate 256 has an eye-bolt 258 threaded into it; and the eye of that eye-bolt telescopes over a pivot 260 on an elongated bar 262. A C-washer 261 maintains the eye-bolt 258 in assembled relation with the pin 260 on the elongated bar 262. The elongated bar 262 has an elongated slot 264 adjacent the lower end thereof, and has a second elongated slot 266 adjacent the upper end thereof. The elongated slots 264 and 266 are spaced apart vertically and horizontally, as indicated particularly in FIG. 14.

A pin and sleeve combination 268 is secured to the center wall of the frame 30, and that combination extends forwardly from that center wall. The pin of the combination 268 extends through the slot 266 of the elongated bar 262. The end of the combination 268 has a screw 270 seated therein, and that screw prevents accidental separation of the elongated bar 262 from that combination. A similar pin and sleeve combination, not shown, is secured to the center wall of the frame 30 below and to the left of the combination 268. The pin of this second combination extends through the slot 264 of the elongated bar 262, and it has a screw 272 seated in its projecting end. The two pin and sleeve combinations coact with the elongated slots 264 and 266 to guide the reciprocable movement of the elongated bar 262.

A pin 274 is mounted on the elongated bar 262, and that pin extends forwardly from that bar 262. A helical extension spring 276 has the upper end thereof secured to the pin 274 and has the lower end thereof secured to a pin 283 on a rack 286. The rack 286 is secured to the elongated bar 262 by a pivot 284 and that pivot permits rotation of the rack 286 relative to the elongated bar 262. An arcuate slot 288 is provided in the upper portion of the elongated bar 262, and that slot receives a pin 290 in the upper end of the rack 286. The arcuate slot 288 permits limited rotation of the rack 286 about the pivot 284. A second elongated bar 278 is disposed rearwardly of the elongated bar 262, and the two elongated bars are identical.

A pin 280 is carried by the free end of the lever 238; and that pin extends through the lower end of an L-shaped plate 282. A C-shaped washer 281 maintains the L-shaped plate 282 and the pin 280 in assembled relation. The L-shaped plate 282 is connected to the elongated bar 278 by an eye-bolt 258 and by a pivot and C-washer, not shown, which are identical to the pivot 260 and the C-washer 261.

A rack 294, that is identical to the rack 286 with the exception that the rack 294 has a vertical offset 293 adjacent the teeth thereof, is secured to the elongated bar 278 by a pivot 292. The elongated bar 278 will have an arcuate slot comparable to the arcuate slot 288 of the elongated bar 262; and the rack 294 will have a pin which is comparable to the pin 290 carried by the rack 286. Hence, the rack 294 will be capable of limited rotation about the pivot 292 carried by the elongated bar 278. A spring 300, comparable to the spring 276, will be secured to a pin 275 carried by the elongated bar 278; and the lower end of that spring will be secured to a pin, comparable to the pin 283, which will be carried on the rack 294. The springs 276 and 300 bias the racks 286 and 294 for rotation in the counter clockwise direction, as the rack 286 is viewed in FIG. 14. However, the springs 276 and 300 will yield to permit limited rotation of those racks in the clockwise direction.

The numeral 302 denotes an elongated pivot 302 which is fixedly secured to the center wall of the frame 30, and which extends forwardly from that center wall. An elongated sleeve 304 is telescoped over the pivot 302, and it is rotatable relative to that pivot. A ratchet wheel 306 is fixedly secured to the sleeve 304, and that ratchet wheel will rotate with that sleeve. The ratchet wheel 306 is in register with the rack 294 that is pivoted to the elongated bar 278. A second ratchet wheel 308 is also fixedly mounted on the sleeve 304, and that second ratchet wheel is spaced a short distance from the ratchet wheel 306. The ratchet wheel 308 is in register with the rack 286 that is pivoted to the elongated bar 262.

The teeth on the ratchet wheels 306 and 308 are complementary to the teeth on the racks 294 and 286; and upward movement of the racks 294 and 286 will bring the teeth of those racks into engagement with the teeth of those ratchet wheels, and continued upward movement of those racks will cause rotation of those ratchet wheels. The springs 276 and 300, which are secured to the pins 274 and 275 of the elongated bars 262 and 278, will normally hold the racks 286 and 294 in register with the teeth on the ratchet wheels 308 and 306; but those springs will yield to permit the racks 286 and 294 to rotate away from the ratchet wheels 306 and 308 during downward movement of the elongated bars 262 and 278. Hence, during upward movement of the elongated bars 262 and 278 the ratchet wheels 308 and 306 must rotate, but during the downward re-setting movement of those bars the ratchet wheels 308 and 306 will remain stationary.

A ratchet wheel 310 with coarse teeth is also fixedly mounted on the sleeve 304; and that ratchet wheel is adjacent the ratchet wheel 306. The ratchet wheel 310 carries a pin 474 at its front face, and that pin is closely adjacent the periphery of that ratchet wheel. The pin 474 extends toward the ratchet wheel 306. The ratchet wheels 306, 308 and 310 are all fixedly secured to the sleeve 304 and will rotate as a unit whenever the sleeve 304 rotates about the pivot 302.

A sprocket wheel 312 is fixedly mounted on the sleeve 304 adjacent the forward end of that sleeve. An arm 316 is fixedly mounted on the sleeve 304 adjacent the sprocket wheel 312. Hence, the ratchet wheels 306, 308 and 310, the sprocket wheel 312, and the arm 316 will rotate as a unit whenever the sleeve 304 rotates.

An L-shaped plate 318 is mounted on the arm 316, and that plate extends rearwardly from the arm 316. Set screws 320 are provided which secure the plate 318 to the arm 316. These set screws can be loosened to permit adjustment of the position of the L-shaped plate 318 relative to the arm 316; the openings in the plate 318, which receive the screws 320, being larger than the shanks of those screws. The rearwardly extending portion of the L-shaped plate 318 is in register with the projecting button-like actuator 323 of a switch 322. This switch is a single pole double throw switch; but only two of its three terminals are connected, as indicated particularly in FIG. 27. Because the detailed showing of electrical conductors can sometimes obscure the showing of structural parts, the leads to the various switches of the coin-handling device of the present invention are omitted in many of the figures and are abbreviated in others. However, those leads are shown in full in FIG. 27.

An L-shaped pressure foot 324 is adjustably secured to the outer end of the arm 316 by set screws 326. That pressure foot has a radially-extending portion and a tangentially-extending portion; and the tangentially-extending portion serves as the leading edge. That edge is suitably rounded at the front to enable it to engage the button-like actuators of switches and gently ease those actuators into switch-actuating position. Both the radial and circumferential positions of the pressure foot 324 relative to the arm 316 can be adjusted by releasing the set screws 326; the openings in the pressure foot, that receive the set screws 326, being larger than the shanks of those set screws.

A supporting plate 330 is mounted on studs 332, and those studs space that plate forwardly of the center wall of the frame 30. Screws 333 extend through openings in the plate 330 and seat in the ends of the studs 332, thereby rigidly securing that plate to those studs.

A cylindrical support of cup-like configuration is denoted by the numeral 328, and that support is mounted on the front face of the plate 330. That support is concentric with the sleeve 304, and thus the arm 316 can describe an arcuate path which is concentric with the support 328. The support 328 has a number of radially directed, axially aligned, and circumferentially spaced openings 334 through it. Those openings are grouped in sets of three, and the groups of openings are spaced around the entire circumference of the support 328; each group of openings being in radial alignment with an indicia representing a unit of credit. Those indicia are on the front face of support 328, as shown by FIGS. 1 and 14; and they are one hundred in number, ranging from zero through ninety nine. In the said preferred embodiment of the present invention, each of the indicia represents one cent; and for convenience every fifth indicia is denoted by a numeral.

The openings 334 receive the projecting terminals of single pole double throw switches such as the switches 336, 890, 892 and 894 that are shown in FIG. 1. Those projecting terminals are in the form of pins; and the center pin of each switch is threaded to receive a nut 343. The engagement between the openings 334 and the projecting terminals of the switches coacts with the nuts 343 to releasably hold the switches precisely in alignment with the said indicia. Hence the operators can attain simple, quick and precise mounting of the switches on the support 328.

The projecting terminals of the switches extend beyond the outer periphery of the support 328, and they receive sleeve-type terminals on leads, such as the leads 338, 340 and 342 for the switch 336. Those sleeve-type terminals will provide a good electrical connection between the various leads and the various projecting terminals of the switches. The sleeve-type terminals are readily separable from the projecting terminals of the switches, and those projecting terminals can easily be inserted into and removed from the openings 334 in the support 328. This makes it simple and easy to adjust the positions of the switches relative to the support 328. It is possible to set a switch at any of one hundred desired positions on the support 328, and therefore it is possible to have switches set at positions corresponding to any integral price between zero and ninety nine cents.

A sprocket chain 344 engages the teeth of the sprocket wheel 312, and that sprocket chain will be driven by that sprocket wheel. A sprocket pinion 346 is mounted on a rotatable shaft 348, and that shaft is rotatably mounted on a supporting platform 347 at the right hand side of the frame 30, as that frame is viewed in FIG. 1. The shaft 348 is suitably geared to a unit counter 350 of standard design and construction. The gear ratio of the sprocket pinion 346 and the sprocket wheel 312 is such that the rotation of the arm 316 between any two indicia will cause the counter 350 to reflect a one unit change. This relationship holds whether credits are being stored or removed.

A spring housing 352 and a bushing 353 are loosely telescoped over the sleeve 304. That spring housing is disposed rearwardly of the plate 330, and its open face is closely adjacent the ratchet wheel 308. The bushing 353 extends through central openings in the plate 330 and in support 328. One end of that bushing is adjacent the spring housing 352 while the other end of that bushing is adjacent the arm 316. A spiral spring 354 is disposed within the spring housing 352, and one end of that spring is connected by pin 349 to the sleeve 304. The other end of the spring 354 extends outwardly through an opening in the periphery of the housing 352 and is held by a pin 355, as indicated in FIG. 14. Hence, one end of the spring is held in fixed position by the pin 355 while the other end of that spring will move with the sleeve 304. Whenever the sleeve 304 rotates in a counter clockwise direction, as that sleeve is viewed in FIG. 14, the spring 354 will be "tightened"; and it will tend to restore the sleeve 304 to its normal position. However, that spring can permit several revolutions of the sleeve 304 to be effected.

A castellated nut 314 is threaded onto the threaded forward end of the pivot 302, and it bears against a shoulder at the forward end of the pivot 302. The nut 314 overlies the forward end of the sleeve 304 and also overlies part of the sprocket wheel 312. Hence, that nut will prevent accidental separation of the sleeve 304 from the pivot 302. A cotter key 315 extends through the spaces between confronting castellations of the nut 314 and through an opening in the threaded end of the pivot 302 to prevent accidental separation of the nut 314 from the pivot 302.

A pivot 356 is mounted below and to the left of the pivot 302; and that pivot is a pin and sleeve combination. The pin of that combination extends to and is supported by the center wall of the frame 30. A pawl 358 is mounted on the pivot 356, and a C-washer 357 prevents accidental separation of the pawl 358 from the pivot 356. The pawl 358 has teeth which mesh with the teeth of the ratchet wheel 306. A spring 366 is connected to the pawl 358, by having its upper end extending through an opening in that pawl, and it is also connected to a pin 489 that extends rearwardly to and is supported by the center wall of the frame 30. The spring 366 is a helical extension spring, and it biases the pawl 358 for rotation in a counter-clockwise direction about the pivot 356 to the position shown in FIG. 14. When that pawl is in that position, the teeth therein engage the teeth on the ratchet wheel 306 and prevent clockwise movement of that ratchet wheel. However, the spring 366 can yield to permit rotation of the pawl 358 in a clockwise direction, thereby freeing the ratchet wheel 306 for rotation. The pawl 358 will normally permit clockwise rotation of the ratchet wheel 306, the teeth of that ratchet wheel slipping past the teeth on the pawl 358; but it will normally prevent counter-clockwise rotation of that ratchet wheel.

A pin 360 connects the left hand end of the pawl 358 with a connecting rod 363. That rod extends to the armature 362 of a solenoid 364 and interconnects the pawl 358 and the armature 362. This solenoid is known as the credit reset solenoid; and when it is energized it will pull the armature 362 upwardly and rock the teeth of the pawl 358 out of engagement with the teeth of the ratchet wheel 306. A pin 365 secures the upper end of the connecting rod 363 to the armature 362. The pins 360 and 365 permit relative rotation between the pawl 358, the connecting rod 363, and the armature 362.

A gear segment 368 is mounted on the pivot 302, and it can rotate relative to that pivot and relative to the sleeve 304. That gear segment is best shown in FIGS. 9, 10, 12 and 13. The upper portion of the gear segment 368 has the form of an elongated arm, and that arm projects radially beyond the periphery of the ratchet wheel 310. A spring 370 encircles the hub of the gear segment 368 and bears against one side of the upwardly extending arm of that gear segment. The other end of that spring bears against a pin 372 which is secured to the center wall of the frame 30. The spring 370 biases the gear segment 368 for rotation in a clockwise direction to the position shown in FIG. 9.

The upwardly extending arm of the gear segment 368 carries a pivot 374, and a pawl 376 and a second pawl 378 are mounted on that pivot. The pawl 376 is plane, but the pawl 378 has an offset adjacent the free end thereof. This offset places the free ends of the pawls 376 and 378 in register with each other and in register with the teeth on the ratchet wheel 310. The spacing between the free ends of the pawls 376 and 378 is such that when the free end of the pawl 376 is seated against the root of a tooth of the ratchet wheel 310, the free end of the pawl 378 is in register with the inclined face, rather than the root, of a succeeding tooth of that gear.

The pawl 376 has a pin 380 adjacent the free end thereof, and the pawl 378 has a pin 382 adjacent the free end thereof. These pins extend rearwardly from those pawls and extend toward the center wall of the frame 30, but they terminate short of that center wall. The pin 380 has a helical extension spring 390 connected to it, and that spring extends downwardly to a pin 388 on the front face of the upwardly extending arm of the gear segment 368. The pin 382 has a helical extension spring 386 connected to it, and that spring extends downwardly to a pin 386 which extends rearwardly from the upwardly extending arm of the gear segment 368. The springs 386 and 390 bias the free ends of the pawls 378 and 376 for rotation downwardly toward the teeth of the ratchet wheel 310.

An L-shaped lever 392 is mounted for rotation about the pivot 374 on the upwardly extending arm of the gear segment 368. This lever has the horizontal portion thereof extending forwardly from the gear segment 368 so it is in register with the upper ends of the pawls 376 and 378. Those upper ends of those pawls are formed to define acute angles; having vertical faces that receive the L-shaped lever 392 and having inclined tops that slope downwardly and away from the upper ends of those vertical faces. A spring 396 is connected to the lower end of the L-shaped lever 392, and that spring is also connected to a pin 394 which is secured to the upwardly extending arm of the gear segment 368. The spring 396 is a helical extension spring and it biases the lever 392 for rotation to the position shown in FIG. 10. In that position, the L-shaped lever 392 is out of engagement with the upper ends of the pawls 376 and 378, and it thus permits those pawls to rotate about the pivot 374.

A pin 398 is provided on the rear face of the ratchet wheel 310, and that pin is in register with the lower end of the L-shaped lever 392. That pin will be in the position shown by FIG. 9 whenever the coin-handling device of the present invention is in its normal condition; and in that position that pin will engage the lower end of the lever 392 and force it to the position shown in FIGS. 9 and 12. At such time, the lever 392 holds the free ends of the pawls 376 and 378 above and out of engagement with the teeth of the ratchet wheel 310. However, when the ratchet wheel 310 rotates away from the position shown in FIG. 9, the pin 398 on that ratchet wheel will move out of engagement with the lower end of the L-shaped lever 392 and will permit the spring 396 to move that lever away from the upper ends of the pawls 376 and 378.

A pin 400 is formed on the rear face of the pawl 378, and that pin extends toward but terminates short of the center wall of the frame 30. An arcuate guideway 402 is secured to the center wall of the frame 30 by screws 404; and that guideway is concentric with the pivot 302. Whenever the gear segment 368 rotates about the pivot 302, the pin 400 will move under and be overlain by the arcuate guideway 402. That pin will be spaced a short distance inwardly of the inner periphery of that guideway, but it will be so close to the guideway 402 that the guideway will positively prevent separation of the pawl 378 from the teeth of the ratchet wheel 310 as long as that pin is within the angular limits of that guideway.

The numeral 406 denotes an electro-magnet which has an armature 408, and one end of the armature 408 is formed as a hook, as shown particularly in FIGS. 9 and 10. That hook engages and can hold the upper end of the pawl 376. When the ratchet wheel 310 is in the position shown by FIG. 9, the pin 398 will cause the lever 392 to rotate against the upper ends of the pawls 376 and 378 and hold them against clockwise rotation. However, even when the ratchet wheel 310 rotates to move the pin 398 away from the lever 392, and thus permits the spring 396 to move that lever away from the pawls 376 and 378, the pawl 376 will not be able to rotate in a clockwise direction; that pawl being held by the hook on armature 408. Similarly the pawl 378 can not move at that moment because it is held by the end of the armature 416 of an electro-magnet 414.

The other end of the armtaure 408 is bent upwardly adjacent a switch 412, and it can act upon the button-like actuator of that switch to cause it to shift the contacts of that switch. The switch 412 is a double pole single throw switch; and one set of poles or contacts is denoted by the numeral 412A on the diagram in FIG. 27, while the other set of poles or contacts is denoted by the numeral 412B on that diagram. A spring 410 normally holds the armature 408 in the position shown in FIG. 9; and in that position, the armature will hold the free end of the pawl 376 away from the teeth of the ratchet wheel 310 and will hold the contacts 412A and 412B open. However, that spring can yield, whenever the electro-magnet 406 is energized, to permit the armature 408 to rotate in a counterclockwise direction and free the pawl 376 and close the contacts 412A and 412B. The electro-magnet 406 and the switch 412 constitute a relay, and that relay is one of two sub-vend relays of the coin-handling device of the present invention.

The electro-magnet 414 is mounted adjacent the electro-magnet 406; both of those electro-magnets being secured to the center wall of the frame 30. The electro-magnet 414 has an armature 416, and one end of that armature can selectively engage and hold the upper end of the pawl 378. Whenever the armature 416 engages and holds the upper end of the pawl 378, that pawl is held away from the teeth of the ratchet wheel 310. The other end of the armature 416 is bent upwardly into position adjacent the double pole single throw switch 420. One set of poles of that switch is denoted by the numeral 420A on the circuit diagram of FIG. 27, and the other set of poles is denoted by the numeral 420B. The upwardly bent end of the armature 416 is adjacent the button-like actuator of the switch 420, and it can engage that actuator to close the normally-open poles 420A and 420B. A spring 418 normally holds the armature 416 in the position shown in FIG. 9, but that spring can yield to permit rotation of the armature 416 in a clockwise direction whenever the electro-magnet 414 is energized. The electromagnet 414 and the switch 420 constitute a relay, and that relay is the other of two sub-vend relays of the coin-handling device of the present invention.

A double rack 422 is mounted below the gear segment 368, and the vertically-directed rack thereon is driven by that gear segment. The double rack 422 is guided and supported by a pin 424 which has a groove 425 therein to receive the double rack 422; and it is also guided and supported by a block 426. The block 426 and the pin 424 are secured to the center wall of the frame 30. That block and that pin hold the double rack 422 in register with the gear segment 368 while permitting that double rack to reciprocate under the action of that gear segment.

A spur gear 428 is mounted on a vertically directed shaft 430, and that spur gear engages the horizontally-directed rack of the double rack 422. An opening 432 is provided in the center wall of the frame 30, adjacent the gear 428, to avoid any interference between the spur gear 428 and that center wall. The spur gear 428 meshes with the horizontally-directed rack of the double rack 422 and will be driven by it as the double rack reciprocates.

The double rack 422 carries a pin 434, and that pin extends into a slot 440 in an L-shaped lever 436. That slot is at one end of the L-shaped lever, and a pin 438 is provided at the other end of that lever. That pin is connected to an elongated, generally vertically-directed lever 446; and a C-washer 439 prevents accidental separation of the lever 436 from the lever 446. The L-shaped lever 436 is rotatably mounted on a pivot 442 that extends rearwardly to and is supported by the center wall of the frame 30. A C-washer 443 encircles the pivot 442 and prevents accidental separation of the lever 436 from the pivot 442. A spring 444 encircles the pivot 442 and extends to and is held within an opening in the lever 446. That spring is a helical extension spring, and it normally biases the lever 446 for rotation about the pin 438 in a clockwise direction. However, that spring can yield to permit rotation of the lever 446 in a counter clockwise direction about the pin 438.

The lever 446 has an offset 447 intermediate the ends thereof, and that offset displaces the lower end of the lever 446 further forwardly from the center wall of the frame 30. That lower end of the lever 446 has an elongated slot 448 therein, and it also has a shorter slot 450 therein. The slots 448 and 450 are contiguous and constitute one large slot with a long arm and a short arm.

A lever 452 is rotatably mounted on a pivot 454, and that pivot extends rearwardly to and is mounted on the center wall of the frame 30. A C-washer 453 encircles the pivot 454 and prevents accidental separation of the lever 452 from that pivot. A cam follower 456 is mounted on one end of the lever 452, and that cam follower is in register with the outer periphery of the cam disc 130. A pin 458 is mounted at the other end of the lever 452, and that pin extends through the slot 448 or the slot 450 and carries a washer 457 on its forward end. A C-washer 459 rings the pin 458 and prevents accidental separation of the washer 457, the lever 446, and the lever 452.

A pivot pin 460 is secured to the center wall of the frame 30, and it extends forwardly from that center wall. That pivot pin supports one end of a helical extension spring 462, and the other end of that spring extends to and fits within an opening in the lever 452. This spring biases the lever 452 for rotation in the clockwise direction about the pivot 454. However, that spring can yield to permit rotation of the lever 452 about that pivot in the counter-clockwise direction. Hence, the spring 462 will bias the cam follower 456 on lever 452 into continuous engagement with the outer periphery of the cam disc 130.

A generally vertically directed lever 464 has the lower end thereof secured to the pivot pin 460, and a C-washer 465 encircles that pivot pin to maintain the lever 464 in assembled relation with that pivot pin. The lever 464 has a pin 466 mounted on its upper end, and that pin is in register with the lower part of the lever 446. Hence, rotation of the lever 464 in the clockwise direction about the pivot 460 can cause the pin 466 to urge the lever 446 to move in the counter clockwise direction about the pin 438. The lever 464 carries a pivot 468 adjacent its lower end, and that pivot rotatably supports a short lever 469. The lever 469 has an opening in the upper end thereof which receives one end of the helical extension spring 470, and the other end of that spring extends to an opening on the end of a projecting arm of the lever 464. The spring 470 biases the lever 469 for rotation about the pivot 468 in a counter clockwise direction, but it can yield to permit rotation of the lever 469 in a clockwise direction about that pivot. The lever 469 has an inclined arm 472 thereon, and that arm is biased to the position indicated by solid lines in FIG. 9; but it can be moved to the position indicated by dotted lines in that figure.

The numeral 476 denotes a pivot that is fixedly secured to the center wall of the frame 30 and which extends forwardly from that center wall. The pivot 476 has a sleeve 478 rotatably mounted thereon, and that sleeve supports a Geneva gear 480. That gear is rigidly connected to the sleeve, and hence it will rotate with the sleeve. The gear 480 has a stop 482 thereon, and that stop selectively engages a pin 484 which is secured to the center wall of the frame 30 and which extends forwardly from that wall. The stop pin 484 limits rotation of the Geneva gear 480 in a counter clockwise direction, but it permits free rotation of that gear in a clockwise direction for almost one complete revolution.

A stud 486 is mounted on the center wall of the frame 30, and that stud extends forwardly from that center wall. A screw 490 seats in the forward end of the stud 486, and that screw secures an L-shaped lever 488 to that stud while permitting rotation of that lever relative to that stud. The lever 488 has a pin 492 at one end thereof; and that pin is larger than the width of the slots formed in the Geneva gear 480. However, the diameter of the pin 490 is not greatly in excess of the width of those slots; and hence a substantial portion of the surface of that pin can extend into the outer end of any slot that is presented to that pin. A spring 491 has one end thereof extending through an opening in the other end of the lever 488, and it has its other end secured to a stationary pin 489. The spring 491 tends to rotate the lever 488 in a counter clockwise direction and thus to force the pin 492 toward the periphery of the gear 480. When a slot of that gear is presented to the pin 492, the spring 491 will urge the pin 492 into the end of that slot and will tend to center the gear. This action is helpful because it enables the Geneva gear 480 to maintain its various moved positions with considerable precision.

An armature 494 is mounted on the forward end of the sleeve 478, and it is fixedly secured to that sleeve. Hence, rotation of the Geneva gear 480 will cause rotation of the armature 494. A screw 496 is seated in the forward end of the pivot 476, and that screw will overlie part of the sleeve 478 and of the armature 494 thereby preventing accidental separation of the sleeve 478 from the pivot 476. A continuous contact ring 498 is mounted on the front face of the cup-like support 328, and that ring is concentric with the pivot 476. A series of arcuate segments 499, 500, 501, 505 and 507 are disposed radially outwardly of the contact ring 498. Each of those segments is secured to the support 328; and they coact together to define an interrupted contact ring which is concentric with the uninterrupted contact ring 498. The armature 494 carries a contactor 502 which consists of a pin that is spring-biased toward the uninterrupted contact 498 and of a sleeve that guides the pin and which secures the pin and the spring to the armature 494. The armature 494 also carries a similar contactor 509; and the contactor 509 is in register with the spaced contact segments 499, 500, 501, 505 and 507. The rear face of the pin of the contactor 509 is broad enough to enable it to move between the contact segments without binding or jamming. A flexible connector or pigtail 511 extends between and electrically connects the contactors 502 and 509.

The numeral 503 denotes a plate which is mounted on studs 513 that are secured to the center wall of the frame 30 and which extend forwardly from that center wall. Screws 515 extend through the plate 503 and seat in the studs 513; and those screws hold the plate 503 rigidly in position on the studs 513. The plate 503 supports a solenoid 504 which is the motor timing solenoid of the coin-handling device of the present invention. That solenoid has an armature 506; and a switch 508 is mounted on the plate 503 adjacent the upper position of the armature 506. The armature 506 of the solenoid 504 can engage the actuator 517 of the switch 508 when that armature is in its upper position; but that armature can move out of engagement with that actuator when that armature is in its lower position. When the armature 506 engages the actuator 517, it will move that actuator and cause the contacts of the switch 508 to open. However, when the armature 506 is in its lower position, it will be out of engagement with the actuator 517, and the contacts of the switch 508 will close.

The armature 506 of the solenoid 504 carries a pin 519 at its upper end, and that pin connects the armature 506 with an arm of a vertically directed rack 510. That rack is normally held in raised position by a helical extension spring 512 that extends between an opening in the arm of that rack and a pin 514 which is secured to the plate 503. However, the spring 512 can yield to permit downward movement of the rack 510. That downward movement will occur when the solenoid 504 is energized and the armature 506 moves downwardly in response to that energization. The rack 510 has elongated slots 516 adjacent its upper and lower ends, and pins 518 extend through those slots and seat in the plate 503. Those pins coact with the slots 516 to guide the rack 510 for vertical reciprocatory movement.

The numeral 520 denotes a pivot that is secured to the plate 503, and that extends forwardly from that plate. A pawl 522 is rotatably mounted on that pivot; and that pawl has a tooth 521 below the level of the pivot 520 and a second tooth 523 above the level of the pivot 520. These teeth of the pawl 522 selectively engage the teeth of the rack 510; and since they are disposed on opposite sides of the pivot 520, they provide an escapement action. A pin 524, that is secured to the plate or wall 503, has a helical extension spring 526 secured to it. The upper end of that spring engages one end of an L-shaped lever 530; and that lever is rotatably secured to the pawl 522 by a pin 528. The spring 526 biases the lever 530 for rotation in a clockwise direction about the pin 528, but such rotation is limited by an ear 532 on the pawl 522. Hence, rotation of the L-shaped lever 530 in a clockwise direction is limited to the position shown by FIG. 1. The L-shaped lever can rotate in a counter clockwise direction; the spring 526 yielding to permit such rotation, but at the conclusion of such rotation the spring 526 will return the lever 530 to the position shown by FIG. 1.

The upper end of the lever 530 has an ear 529 which extends rearwardly through an opening 534 in the center wall of the frame 30. That ear can move freely within the opening 534, and as it does so it will cause the pawl 522 to provide an escapement action. The action of the spring 526 normally maintains the ear 529 at the right hand side of the opening 534, but that ear can be moved to the left hand side of that opening by the lug 536 which is mounted on and carried by the sprocket chain 148. As the sprocket chain moves, in response to the operation of the motor 162, the lug 536 on that chain will recurrently strike the ear 529, thereby moving the pawl 522 in a counter clockwise direction. Such movement causes the lower tooth 521 of that pawl to move out of engagement with the rack 510 but causes the upper tooth 523 of that pawl to move into engagement with one of the teeth of that rack; and thereupon the spring 512 will move the rack 510 up one tooth. As soon as the lug 536 has moved out of engagement with the ear 529, the spring 526 will rotate the pawl 522 to the position shown in FIG. 1; and at such time the upper tooth 523 will have moved out of engagement with the rack 510 and the lower tooth 521 will have moved into engagement with one of the teeth of that rack. Recurrent engagements of the lugs 536 with the ear 529 will cause the rack 510 to move up to the position shown in FIG. 1. The path of movement of the rack 510 is limited; and after two escapment actions, that rack will have reached its full upper position.

The numeral 538 denotes a plate which is mounted on pin and sleeve combination studs 540. Those studs are secured to the center wall of the frame 30 and extend forwardly from the center wall. Screws 542 extend into the outer ends of those studs and rigidly secure the plate 533 to those studs. A second plate 544 is mounted on the studs 540; that plate is disposed rearwardly of the plate 538.

A rotatable shaft 546 is supported by the plates 538 and 544, and that shaft extends perpendicularly of the center wall of the frame 30. A ratchet wheel 548 is mounted on the shaft 546, and that ratchet wheel will turn with that shaft. One of the teeth of the ratchet wheel 548 is cut away, as indicated particularly in FIG. 5. A bar 550 is disposed at one side of the shaft 546 and of the ratchet wheel 548; and that bar is connected to the connecting rod 146 by a pivot pin 552. A C-washer 553 encircles the pivot pin 552 and prevents accidental separation of the bar 550 and the connecting rod 146. The bar 550 has elongated slots 554 therein, and those slots are adjacent the opposite ends of that bar. Pins 556 extend through the slots 554 in the bar 550 and seat in the ends of studs 557 that are supported on the plate 544. Those studs extend forwardly from that plate and hold the bar 550 in position to be secured to the connecting rod 146. C-washers 555 encircles the pins 556 and prevent accidental separation of the bar 550 from the studs 557 and from the pins 556. A pawl 560 is mounted on the bar 550 by a pivot 558, and that pawl will rotate about the pivot 558 under the action of a helical extension spring 562. One end of that extension spring is held by an ear on the pawl 560, and the other end of that spring is held by an ear on the bar 550. The spring biases the pawl 560 for rotation in a counter clockwise direction about the pivot 558, but it can yield to permit rotation of that pawl, in the clockwise direction, away from the teeth of the ratchet wheel 548.

A pivot 564 is mounted on the plate 544, and that pivot secures a lever 566 to the plate 544, while permitting relative rotation theerbetween. A pin 568 is mounted on the free end of the lever 566, and that pin can bear against the teeth of the ratchet wheel 548. A helical extension spring 570 has one end secured to a pin 571, that is mounted on the plate 544, and it has its other end secured to a pin 573 that is mounted on the lever 566. The spring 570 biases the pin 568 against the teeth of the ratchet 548, but it can yield to movement of that pin away from those teeth. The pin 568 acts to resist spinning of the ratchet wheel 548 and to confine its movement to just the amount of movement induced by the action of the pawl 560 as the bar 550 and the conncting rod 146 reciprocate.

The ratchet wheel 548, the bar 550 and the lever 566 are disposed forwardly of the plate 544. A ratchet wheel 572 is disposed rearwardly of that plate. An L-shaped bar 574 is disposed adjacent the rear face of the plate 544, and that bar is spaced from the plate 544 by studs 579. The bar 574 has elongated slots 576 therein, and those slots are disposed adjacent the opposite ends of that bar. Pins 578 extend through the slots 576 and seat in the studs 579. C-washers 575 encircle the pins 578 and prevent accidental separation of the bar 574 from the studs 579 and from the pins 578. A spring 580, of the helical extension type, has one end secured to a pin 581 on the plate 544 and has its other end secured to a pin 583 on the bar 574. The spring 580 biases the bar 574 for upward movement, but it can yield to permit downward movement of that bar. A pawl 582 is rotatably secured to the bar 574 by a pivot 587, and that pawl can selectively engage the teeth of the ratchet wheel 572. A spring 584 has one end secured to an ear on the pawl 582 and has its other end secured to a pin 585 on the bar 574. This spring is of the helical extension type and it biases the pawl 582 for rotation in a clockwise direction about the pivot 587. However, that spring can yield and permit the end of the pawl 582 to move in a counter clockwise direction and thus move away from the teeth of the ratchet 572.

A solenoid 586, which is the escrow timer solenoid of the coin-handling device of the present invention, is mounted on the plate 544; and the armature of that solenoid is denoted by the numeral 588. A pin 590 connects the armature 588 with the upper end of the L-shaped bar 574, and thus the armature 588 and the bar 574 will move together as a unit. The spring 580 will hold the bar in the position shown in FIG. 6 whenever the solenoid 586 is de-energized, but the armature 588 will force the bar 574 downwardly whenever the solenoid 586 is energized.

An armature 592 is mounted on the forward end of the shaft 546, and that armature carries contactors 594 and 596 which are similar to the contactors 502 and 509 of the armature 494. The contactors 594 and 596 are connected together by a flexible lead or pigtail 589. The armature 592 also carries contactors 593, 595 and 597; and those contactors are secured together by a flexible conductor or pigtail 591. The contactors 594 and 596 selectively engage and electrically connect fixed contacts 598 and 607. Those contacts are mounted on the plate 538 and they are disposed between the ends of a split annulus 606. The annulus 606 is not electrically alive, and its primary function is to hold the inner ends of the contactors 594 and 596 in the plane of the two contacts 598 and 607. The contactor 593 bears against a continuous contact ring 600. For simplicity of illustration, that contact ring is shown twice in the schematic diagram of FIG. 27; but there is actually just the one ring 600. The contactor 597 successively engages the arcuate contact segments 603, 601, 599 and 602. The segments 599 and 603 are not electrically alive, and their primary function is to maintain the contactor 597 in the plane of the surfaces of the contact segments 601 and 602. The contactor 595 successively engages the arcuate segments 605 and 604. The segment 605 is not electrically alive, and it is used primarily to maintain the contactor 595 in the plane of the surface of the contact segment 604.

An elongated generally vertically-directed rod 608 has pins 610 and 612 at its upper and lower ends, and it has a projecting arm intermediate those ends. A spring 614 of the helical extension type is secured to a pin 615 on that arm, and the upper end of that spring is supported by a pin 616 which is secured to the center wall of the frame 30. A generally similar rod 618 has pins 620 and 622 at its upper and lower ends, and it has a projecting arm intermediate those ends. The arm on the rod 608 extends to the left while the arm on the rod 618 extends to the right.

The pins 610 and 620 extend rearwardly from the rods 608 and 618, and they extend through suitable openings, not shown, in the center wall of the frame 30. The pins 612 and 622 extend rearwardly from the rods 608 and 618, and they extend through openings 613 and 623 in the center wall of the frame 30. The openings for the pins 610, 612, 620 and 622 have the form of elongated generally vertically-directed slots. A helical extension spring 624 is secured to a pin 625 on the arm of the rod 618, and that spring is also connected to a pin 1626 which is mounted on, and extends forwardly from, the center wall of the frame 30. The rod 618 also carries a pin 626 which is in register with the inclined arm 472 on the lever 469. Downward movement of the rod 618 will cause the pin 626 to engage the inclined arm 472 and force the lever 469 to move to the right; thereby biasing the lever 464 for a corresponding movement to the right. If the pin 458 is in register with the lower ends of the slots 448 and 450 of lever, the lever 464 will immediately respond to that bias and move to the right; thereby moving the lower end of the lever 446 to the right. However, if the pin 458 is in the upper end of the slot 448, the levers 464 and 446 will have to wait until the pin 458 moves down into register with the slot 450; and thereupon those levers will move to the right.

A solenoid 628, which is the cash box solenoid of the coin-handling device of the present invention, is mounted on the center wall of the frame 30 adjacent the connecting rod 608. The armature of that solenoid is denoted by the numeral 630, and that armature is connected to the projecting arm of the rod 608 by the pin 632. The solenoid 628 can act through its armature and the pin 632 to move the rod 608 downwardly; but when that solenoid is de-energized, the spring 614 will hold the connecting rod 608 in the position shown in FIG. 1.

A solenoid 634, which is the coin return solenoid of the coin-handling device of the present invention, is mounted on the center wall of the frame 30 adjacent the connecting rod 618. The armature 636 of the solenoid 634 is connected to the projecting arm of the rod 618 by a pin 638. The solenoid 634 can be energized to move the connecting rod 618 downwardly; but when that solenoid is de-energized, the spring 624 will hold that rod in the position shown in FIG. 1.

The pin 610 of the rod 608 extends into and is held by an opening at the upper end of a slide 640. That slide has elongated slots 642 adjacent its opposite ends, and pins 644 extend through those slots and seat in the forward wall of escrow chamber 688. The pins 644 coact with the slots 642 to confine and guide the slide 640 for reciprocatory movement. A pin 646 is carried by the lower end of the slide 640, and that pin is connected to the movable door 692 that defines one half of the bottom of the escrow chamber 688.

A slide 648, which is similar to the slide 640, has an opening at the top thereof to receive the pin 620 carried by the connecting rod 618. The slide 648 has two vertically-directed elongated slots 650, and pins 652 extend through those slots and seat in the forward wall of the escrow chamber 688. The slots 650 coact with the pins 652 to confine and guide the slide 648 for reciprocatory movement. A pin 654 is carried by the bottom of the slide 648, and that pin is connected to the movable door 690 that defines the other half of the bottom of the escrow chamber 688. The connection between the pins 646 and 654 and the movable doors 692 and 690 is such that the pins 646 and 654 can easily cause those doors to rotate about pivot 682.

The numeral 656 denotes a slide which is disposed below the level of the slides 640 and 648, and an opening in the upper end of that slide receives the pin 612 which is carried by the connecting rod 608. The slide 656 has two elongated vertically directed slots 658, and pins 660 extend through those slots and seat in the forward wall of an escrow chamber 697. The pins 660 coact with the slots 658 to confine and guide the slide 656 for reciprocatory movement. The slide 656 carries a pin 662 at the bottom thereof, and that pin is connected to the movable door 696 that defines one half of the bottom of the escrow chamber 697. A slide 664, which is similar to the slide 656, has an opening that receives the pin 622 carried by the connecting rod 618. The slide 664 has elongated vertically-directed slots 666, and pins 668 extend through those slots and seat in the forward wall of the escrow chamber 697. The slide 664 carries a pin 670 at the bottom thereof, and that pin is connected to the movable door 698 that defines the other half of the bottom of the escrow chamber 697. The connection between the pins 662 and 670 of the slides 656 and 664 is such that the pins 662 and 670 can readily cause the movable doors 696 and 698 to rotate about the pivot 671.

The numeral 672 denotes an escrow chamber that is mounted on the wall 676 which is spaced rearwardly from the center wall of the frame 30; and that escrow chamber is mounted on the rear side of that wall. That escrow chamber has downwardly directed bottom edges 674 that are secured to and that extend rearwardly from the wall 676.

The pivot 682 spans the escrow chamber 672 as well as the escrow chamber 688, and that pivot carries the inner ends of movable doors 684 and 686. Those doors normally incline upwardly from the pivot 682 to define a V-shaped bottom for the escrow chamber; but those doors can be rotated downwardly to positions adjacent the downwardly directed bottom edges 674 of the chamber 672. Downward movement of the slides 640 and 648 will cause downward movement of the doors 686 and 684.

When the doors 684 and 686 are in the normal position shown by FIG. 2, those doors will act to receive and hold coins, in random and unoriented arrangements, from the coin pocket 120 of the coin wheel 118. However, when the door 684 is moved downwardly, those coins will slide along the doors 686 and 684 into the chute 56 so they can be returned to the customer. When the door 686 is rotated downwardly, the coins will flow in the opposite direction along the doors 684 and 686 and drop downwardly into a hopper 704 of generally trapezoidal cross section.

The escrow chamber 688 is mounted on the front face of the wall 676, and it is disposed between that wall and the center wall of the frame 30. The escrow chamber 688 is in register with the coin pocket 122 in the coin wheel 118, and it will receive coins from that coin pocket; and those coins will assume random and unoriented positions. The doors 690 and 692 normally define a V-shaped bottom for the escrow chamber 688, but those doors can be rotated downwardly to positions adjacent the inclined bottom edges 693 of that chamber. When the door 690 is rotated downwardly, coins will flow along the doors 692 and 690 and pass into the coin chute 56 so they can be returned to the customer. When the door 692 is moved downwardly, the coins will flow in the opposite direction along the doors 690 and 692 and fall into a hopper 706 which is of generally trapezoidal construction.

A coin chute 694 is mounted adjacent the coin pockets 124 and 126 of the coin wheel 118, and it receives coins from those pockets. The chute 694 is supported on a bracket 695 that in turn is supported by the wall 676; and that bracket extends forwardly from the wall 676 but terminates short of the center wall of the frame 30. As indicated particularly in FIG. 8, the chute 694 has a mouth that is wide enough to receive coins from both of the coin pockets 124 and 126.

The chute 694 will conduct coins downwardly to the escrow chamber 697; that escrow chamber extending forwardly from the wall 676. The movable doors 696 and 698 of that escrow chamber normally define a V-shape for the bottom of that chamber, but those doors can be rotated downwardly into position adjacent the inclined lower edges 700 of that escrow chamber. When the door 698 is moved down adjacent one of the inclined edges 700, coins will slide along the doors 696 and 698 and fall into the chute 56 through the opening that is defined by the vertical wall 68 and the inclined wall 66. When the movable door 696 is moved down adjacent the other of the inclined edges 700, coins will slide along the doors 698 and 696 to the accepted coin chute 701, and will then be directed to the coin box, not shown.

The slide 640 provides simultaneous movement of the doors 686 and 692 of the escrow chambers 672 and 688, while the slide 648 provides simultaneous movement of the doors 684 and 690 of those escrow chambers. The slides 656 and 664 will provide selective movement of the doors 696 and 698 of the escrow chamber 697. The connecting rod 608 interrelates the slide 640 with the slide 656, while the connecting rod 618 interrelates the slide 648 with the slide 664. Hence the connecting rod 608 can cause simultaneous opening of the doors 686, 692 and 696, and the connecting rod 618 can cause simultaneous opening of the doors 684, 690 and 698.

When one or the other of the doors of an escrow chamber is moved downwardly, that door will coact with the other door to define a downwardly inclined plane along which coins can easily slide. The confronting edges of the doors of each escrow chamber are bent to form a continuous hinge, and thus those doors positively prevent any leakage of coins through the bottom of that escrow chamber, and they provide an uninterrupted and continuous plane for those coins.

An arcuate plate 702 is mounted on the forward face of the wall 676, and that plate is in register with the coin pockets 124 and 126 of the coin wheel 118. That plate is spaced far enough from the periphery of the coin wheel 118 to permit that coin wheel to carry coins past that plate, but it is spaced close enough to the periphery of that coin wheel so coins in the coin pockets 124 and 126 cannot fall out of those pockets until those coins have been carried into register with the coin chute 694. There is no corresponding arcuate plate in register with the coin pockets 120 and 122, and thus coins from those pockets will fall out after those coins have passed by the bottom edge of the arcuate plate 108. The plate 108 is spaced far enough from the periphery of the coin wheel 118 to permit coins in all of the coin pockets 120, 122, 124 and 126 to rotate around to the position occupied by the rollers 168 and 180; but it is spaced close enough to the coin wheel 118 so the coins cannot fall out until after they have engaged and passed by those rollers.

Coins will fall from the coin pocket 120 into the escrow chamber 672, and they will be held there in random and unoriented arrangements. Those coins will respond to opening movement of the door 686 of that chamber to slide down into the coin-aligning hopper 704. Coins from the coin pocket 122 will fall into the escrow chamber 688, and they will be held in random and unoriented arrangements. Those coins will respond to opening of the door 692 to slide into the coin-aligning hopper 706. In the event the level of the coins in either of the hoppers 704 and 706 is such that the particular hopper is holding an ample supply of coins, the coins from the corresponding coin pocket will spill over into the overflow passage 878. That passage is disposed to the right of the hoppers 704 and 706, as those hoppers are viewed in FIG. 8; and the upper right hand walls of those hoppers are cut-away, as at 879, to permit the flow of excess coins to the passage 878. That passage is disposed above but is contiguous with the accepted coin chute 701; and any coins which flow from the hoppers 704 and 706 into the overflow passage 878 will be conducted through the accepted coin chute 701 to the cash box, not shown, of the secondary device.

The hoppers 704 and 706 are disposed on opposite sides of the wall 676, and they are suitably secured to that wall by screws, bolts, welds, rivets, or the like. The bottoms of the hoppers 704 and 706 are spaced outwardly from the wall 676, as emphasized in FIG. 20; and the spacing between those bottoms and the wall 676 is great enough to accommodate vertically directed plates 708. The upper edges of the plates 708 are scalloped, as indicated particularly in FIGS. 2, 18 and 19, to provide a plurality of projections on those upper edges. The confronting faces of those plates are milled away to define inclined runways 710; and the plates 708 are mounted so the runways 710 are immediately adjacent the wall 676. The runways 710 incline downwardly to the left, as those runways are viewed in FIGS. 18 and 19; and they incline downwardly to the right as they are viewed in FIG. 2.

An agitator plate 712 is mounted adjacent each of the hoppers 704 and 706, and those agitator plates have upwardly extending fingers 711 which extend upwardly into the hoppers 704 and 706 through openings 713 in the bottoms of the hoppers. The upwardly extending fingers are of two different lengths, and the short and long fingers alternate. However, all of the fingers are long enough to extend up into the openings 713 when the agitator plates 712 are in their lowermost positions.

Fixed pivots 714 extend forwardly and rearwardly from the wall 676, and those pivots rotatably receive rocking levers 716. The levers 716 have elongated slots 718 at their outer ends and have elongated slots 720 at their inner ends. The slots 718 receive pins 719 which extend through those slots and seat in the agitator plates 712. C-washers 721 encircle the pins 719 and prevent accidental separation of the agitator plates 712 from the levers 716. Rotation of the levers 716 about the pivots 714 will cause vertical reciprocation of the agitator plates 712. The slots 720 at the inner ends of the levers 716 receive a pivot pin 722 which extends through those slots and seats in the plates 708. That pivot pin also extends through an elongated vertical slot, not shown, in the wall 676. C-washers 723 encircle the pivot pin 722 and prevent accidental separation of that pin from the levers 716. Sleeve 709 encases the portion of pivot pin 722 which extends rearwardly from the plate 708 that abuts the rear face of wall 676; and sleeve 715 encases the portion of pivot pin 722 which extends forwardly from the plate 708 that abuts the front face of wall 676. Elongated vertically-directed slots 724 are formed in the wall 676, and those slots receive pins 726 which extend between and connect the plates 708.

A yoke 728, having outwardly-extending side arms, has an opening at the upper end thereof to receive the pivot pin 722. The yoke 728 is disposed to the right of the levers 716, as those levers are viewed in FIG. 20; but the pin 722 connects that yoke with those levers. The yoke 728 has an elongated slot 730 therein, and that slot receives an eccentric pivot pin 740. That pin will normally be held in the lower end of the slot 730 by rounded pressure members 734, in the form of pins, which lie in passages 732 in the side arms of the yoke 728; and which are biased toward the eccentric pin 740 by helical compression spring 736. Screws 738 are threaded into the ends of the passages 732, and those screws will maintain the pressure members 734 and the springs 736 within the passages 732. The springs 736 will apply sizable forces to the pressure members 734 and will normally enable those members to hold the eccentric pin 740 at the lower end of the slot 730; but those springs can yield, whenever necessary, to permit the eccentric pin 740 to move upwardly past those pressure members. Hence, the slot 730 in the yoke 728 coacts with the pressure members 734 and the springs 736 to provide a yieldable safety connection which will prevent breakage of the coin-handling device of the present invention in the event the plates 708 or the plates 712 become jammed or bound. In the event of a jam, the eccentric pin 740 will move upwardly past the pressure members 734; thus freeing the pin 740 for continued rotation. During each revolution the eccentric pin 740 will move between the pressure pins 734, and will consequently urge the yoke 728 to move. If the jam clears, as it usually will after several revolutions, the pressure members 734 will again hold the eccentric pin 740 in the bottom of the slot 740; and the yoke 728 will move with the pin 740.

The eccentric pin 740 is mounted on a crank arm 742, and that crank arm is fixedly mounted on a rotatable shaft 743. This shaft is held within a bushing 744 that is fixedly mounted on the wall 676, and that bushing permits ready rotation of that shaft relative to that wall. The shaft 743 has one half of a castellated coupling 746 secured to it by a pin 747; and the other half of that castellated coupling is secured to the motor shaft 158 by a pin 749. The castellated coupling 746 makes it possible to assure positive driving of the shaft 743 by the motor shaft 158, while permitting ready assembly and disassembly of the shafts 743 and 158.

The numeral 748 denotes a channel-shaped element which is secured to the forward face of the wall 676. That element has a vertically directed arm and a downwardly inclined arm, and the open sides of both arms of that element abut the wall 676. Hence, that wall coacts with that element to define a passage for coins that has a vertical arm and a downwardly inclined arm. A generally similar, channel-shaped element 750 is secured to the rear face of the wall 676; and the element 750 also has a vertically-directed arm and a downwardly inclined arm. The open side of the channel-shaped element 750 abuts the rear face of the wall 676, and it coacts with that wall to define a passage for coins that has a vertical arm and a downwardly inclined arm. The coin passages defined by the channel-shaped elements 748 and 750 are not only similar, but they are in register with each other. The vertical arm of the coin passage formed by the channel-shaped element 750 is denoted by the numeral 752, and the downwardly inclined arm of that passage is denoted by the numeral 754. The vertically-directed arm of the passage defined by the channel-shaped element 748 is denoted by the numeral 756, while the downwardly inclined arm of that passage is denoted by the numeral 758.

The upper end of the arm 752 in the channel-shaped element 750 is in register with, and communicates with, a vertical opening in the right hand end of hopper 704, as that hopper is viewed in FIG. 2. That opening is long enough to be registerable with all moved positions of the runway 710 on the plate 708 that extends through the hopper 704. Hence, coins can roll from the runway 710 into the arm 752 in all moved positions of that runway. The upper end of the arm 756 in the channel-shaped element 748 is in register with, and communicates with, a vertical opening in the left hand end of the hopper 706, as that hopper is viewed in FIG. 18. That opening is long enough to be registerable with all moved positions of the runway 710 of the plate 708 which extends through the hopper 706. Hence, coins can roll from the runway 710 into the arm 756 in all moved positions of that runway.

Coins which are deposited in the hoppers 704 and 706 will be agitated by the fingers 711 on the plates 712 and by the projections formed on the upper edges of the plates 708 by the scallops. The combined action of the fingers and projections will cause coins to work their way toward the wall 676 in face-to-face relation and to fall onto the runways 710. Thereafter, those coins will run down the runways and enter the vertical arms 752 and 756 of the passages in the channel-shaped elements 750 and 748.

Arcuate slots 760 are formed in the channel-shaped elements 748 and 750, and also in the wall 676. Those arcuate slots are in register with each other and they communicate with the vertical arms 752 and 756 of the channel-shaped elements 750 and 748. A pivot 762 extends forwardly and rearwardly from the channel-shaped elements 748 and 750, and that pivot supports rotatable feeler levers 764. C-washers 763 encircle the pivot 762 and prevent accidental separation of the levers 764 from the channel-shaped elements 748 and 750. The levers 764 carry pins 766 at the lower ends thereof, and those pins extend into the arcuate slots 760. When the pins 766 are at the extreme right hand ends of the slots 760, as those slots are viewed in FIG. 2, those pins permit coins to move downwardly through the vertical arms 752 and 756 without hindrance. However, when those pins are moved to the left, they can block downward movement of coins in those passages. In the position shown in FIGS. 2 and 18, the pins 766 are bearing against the edges of coins in the arms 752 and 756. Helical extension springs 768 have their upper ends extending through openings in side arms of the levers 764, and have their lower ends secured to pins 770 mounted on the wall 676. These springs bias the levers 764 for rotation that would move the pins 766 toward the left hand ends of the slots 760, as those slots are viewed in FIG. 2. Hence, the levers 764 are biased to stop movement of coins downwardly through the arms 752 and 756 of the coin passages.

A lever 772, which is shown in FIGS. 2, 3 and 18, is pivotally mounted on a pivot pin 774; and that pivot pin is mounted on the channel-shaped element 748. The pivot pin 774 is long enough to space the lever 772 far enough from the channel-shaped element 748 to clear the right hand lever 764, as those levers are viewed in FIG. 3. A C-washer 773 encircles the outer end of the pivot 774 and prevents accidental separation of the lever 772 from the channel-shaped element 748. A pin 776 connects the lever 772 with the lower end of the connecting rod 234; and hence reciprocating movement of the rod 234 will cause rotation of the lever 772. The pin 776 is intermediate the pivot 774 and the free end of the lever 772; and therefore any movement of the pin 776, due to reciprocation of the connecting rod 234, will be multiplied at the free end of lever 772. A pin 778 is carried by the free end of the lever 772, and that pin can engage the upper ends of the levers 764 and rotate those levers to the position shown by FIGS. 2 and 18. Thus, the lever 772 can move the levers 764 to positions which free coins in the arms 752 and 756 for downward movement through those arms.

A single pole double throw switch 780, which is the change empty switch, is mounted on the channel-shaped element 750 by a screw 781. That switch is adjacent the upper end of the levers 764; and the actuator 782 of that switch extends transversely of the levers 764 and can be struck and moved by the upper ends of those levers. Whenever coins in the arms 752 and 756 are above the level of the pins 766 of the levers 764, those coins will keep the levers 764 in the positions shown in FIGS. 2 and 18. However, when the coins in one or the other or both of those arms fall below the level of the pins 766, one or the other or both of the levers 764 will rotate to move the pins 766 to the other ends of the arcuate slots 760. At such times the upper ends of one or the other or both of the levers 764 will engage the switch actuator 782 and close the contacts of switch 780.

The numeral 784 denotes a plate which is mounted on and extends through the wall 676; that plate having portions thereof disposed on opposite sides of the wall 676. A plate 786 also is mounted on and extends through the wall 676; and portions of that plate are disposed on opposite sides of that wall. The plates 784 and 786 are spaced apart to support elongated pivots 788 and 790. A C-washer 789 encircles one end of the pivot 788 and prevents accidental separation of that pivot from the plates 784 and 786; and a C-washer 791 encircles one end of the pivot 790 and prevents accidental separation of that pivot from the plates 784 and 786. The numerals 792, 794, 796, 798, 800, 802, 804, 806, 808 and 810 denote elongated fingers of resilient material; and each of those fingers has a stop, in the form of a conical pin, at the upper end thereof, has a reentrant projection at the center thereof, and has perforated ears at the bottom thereof. The perforated ears at the bottoms of the fingers telescope over the elongated pivots 788 and 790 and confine those fingers for rotation about those pivots. The fingers 792, 794, 796, 798 and 800 are mounted on the elongated pivot 790, while the fingers 802, 804, 806, 808 and 810 are mounted on the elongated pivot 788.

The stops at the upper ends of the two sets of fingers are directed toward each other, and they are in register with openings in the channel-shaped elements 748 and 750. For example, the stop on finger 792 is in register with an opening 793, the stop on finger 794 is in register with an opening 795, the stop on finger 796 is in register with an opening 797, the stop on finger 798 is in register with an opening 799, the stop on finger 800 is in register with an opening 801, the stop on finger 802 is in register with an opening 803, the stop on finger 804 is in register with an opening 805, the stop on finger 806 is in register with an opening 807, the stop on finger 808 is in register with an opening 809, and the stop on finger 810 is in register with an opening 811. The stops on the various fingers can extend through the openings with which they are in register and can extend to the wall 676, as emphasized particularly in FIG. 21. At such times, those stops block the movement of coins through the arms 754 and 758 of the channel-shaped elements 750 and 748.

A number of springs 812 encircle each of the pivots 788 and 790; and those springs have their inner ends bearing against the wall 676 while having their outer ends bearing against the fingers 792, 794, 796, 798, 800, 802, 804, 806, 808 and 810. Hence there are, in the preferred embodiment shown in the drawings, ten springs 812. Those springs bias the various fingers away from the wall 676 and away from the openings in the channel-shaped elements 748 and 750.

An elongated shaft 814 is journaled in the supporting plates 784 and 786; and that shaft supports a number of cams. Those cams are denoted by the numerals 816, 818, 820, 822 and 824; and those cams are in register with the fingers 802, 804, 806, 808 and 810, respectively. The cams 816, 818, 820 and 822 are identical in form and configuration; each of those cams having two diametrically opposed lobes that each provide a rapid rise and a rapid fall. The cam 824 is quite different from the cams 816, 818, 820 and 822; having a notch that provides a rapid rise and a rapid fall that are separated by a long dwell. The cams 816, 818, 820 and 822 will move the fingers 802, 804, 806 and 808 toward the channel-shaped element 750 twice during each revolution of the shaft 814. Moreover, if the shaft 814 is stopped while one of the cams 816, 818, 820 or 822 has one of its lobes bearing against the reentrant portion of the finger with which it is in register, that cam will hold the stop of that finger in the particular opening with which that stop is in register. However, the angular dimensions of the lobes of the cams 816, 818, 820 and 822 are small, and therefore those cams will hold the stops, of the fingers, within the openings for only very limited periods of time. The cam 824, on the other hand, has a long dwell; and that cam will hold the stop, on the finger 810, within the opening 811 throughout the greatest part of each revolution of the shaft 814.

The cams 816, 818, 820, 822 and 824 are spaced axially and circumferentially of the shaft 814. The lobes of cam 818 trail the lobes of cam 816 by thirty-six degrees. The lobes of cam 820 trail the lobes of cam 818 by thirty-six degrees; and the lobes of cam 822 trail the lobes of cam 820 by thirty-six degrees. The notch of cam 824 trails one of the lobes of cam 822 by thirty-six degrees and trails the other lobe of that cam by two hundred and sixteen degrees. The shaft 814 rotates in a clockwise direction, as that shaft is viewed in FIGS. 21–26; and the rotation of that shaft will successively cause the lobes of cams 816, 818, 820 and 822 to engage the reentrant portions of the fingers 802, 804, 806 and 808, and will also cause the notch and dwell of cam 824 to move relative to the reentrant portion of finger 810.

A crown gear 826 is mounted on the right hand end of the shaft 814, as that shaft is viewed in FIG. 2, and that gear is disposed to the right of the supporting plate 786. A spur gear 828 is mounted on the shaft 814 to the left of the supporting plate 786, as that plate is viewed in FIG. 2. A crown gear 830 is mounted on a shaft 832 which is journaled in the plate 786 and in a bracket 833 that is secured to the rear face of the center wall of the frame 30. The crown gear 830 meshes with the crown gear 826, and it can drive that gear. A crown gear 834 is mounted on the other end of the shaft 832, and that gear meshes with a crown gear 836 on the lower end of the rotatable shaft 430. Hence, rotation of the shaft 430, as by reciprocation of the double rack 422 and consequent rotation of the spur gear 428, will cause rotation of the shafts 832 and 814. The lower end of the elongated shaft 430 is supported by a bearing block 838 which is secured to the center wall of the frame 30 by screws 839.

A fixed pivot 840 is secured to the supporting plate 786, and that pivot rotatably supports an idler gear 842. This gear meshes with the spur gear 828 on the shaft 814 and with a spur gear 846 which is mounted on a shaft 844. The shaft 844 is journaled in the supports 784 and 786; and it is parallel to the shaft 814.

In the preferred embodiment disclosed in the drawings, the spur gear 846 is two and one-half times as large as the gear 828. Hence, the shaft 844 will make only two revolutions while the shaft 814 is making five revolutions.

The shaft 844 carries five cams, and those cams are denoted by the numerals 848, 850, 852, 854 and 856. The cam 848 is in register with the finger 792, the cam 850 is in register with the finger 794, the cam 852 is in register with the finger 796, the cam 854 is in register with the finger 798, and the cam 856 is in register with the finger 800. The cams 850, 852 and 854 are identical; each having a single lobe that provides a rapid rise and a rapid fall that are separated by an appreciable dwell. The cam 856 is closely similar to the cams 850, 852 and 854, having a single lobe that provides a rapid rise and a rapid fall that are separated by a dwell; but the dwell of cam 856 is shorter than is the dwell of any of the cams 850, 852 or 854. In the preferred embodiment shown in the drawings, the dwell of cam 856 will be four-fifths the angular length of the dwell of the cam 854.

The cam 848 has a notch that provides a rapid rise and a rapid fall that are separated by a long dwell; that dwell covering almost one full revolution of the shaft 844. That cam is similar to but is larger than the cam 824. When the notch is in register with the reentrant portion of the finger 792, that finger can respond to the spring 812 to move its stop out of the opening 793. However, at all other times, the cam 848 will cause the finger 792 to hold its stop within the arm 758 of the passage formed by the channel-shaped element 748.

The cams 848, 850, 852, 854 and 856 are spaced apart both axially and circumferentially. The leading edge of the lobe of cam 854 trails the leading edge of the lobe of cam 856 by fifty-seven degrees and thirty-six minutes, the lobe of cam 852 trails the lobe of cam 854 by seventy-two degrees, and the lobe of cam 850 trails the lobe of cam 852 by seventy-two degrees. The notch of cam 848 trails the leading edge of the lobe of cam 850 by seventy-two degrees.

A pivot 858 is mounted on a bracket 859 which is secured to the wall 676; and that pivot extends forwardly from that wall. An L-shaped lever 860 is mounted on the pivot 858; and a C-washer 857 encircles that pivot and prevents accidental separation of the lever 860 from that pivot. A spring 862 encircles the pivot 858 and acts upon the lever 860. One end of the lever 860 extends transversely across the outlet ends of the arms 754 and 758; and the spring 862 biases that end of the lever into position to block those outlet ends, as is shown in FIGS. 2 and 18. However, the spring 862 can yield to permit rotation of the L-shaped lever 860 to an elevated position wherein the end of that lever can unblock the outlet ends of the arms 754 and 758, and when the lever is in that position, and when the stops of fingers 800 and 802 are out of the openings 801 and 803, coins can roll out of the outlet ends of the arms 758 and 754. Those coins will pass through the cut-away portion 70 of the returned coin chute 56 and will find their way to the exterior of the secondary device where they can be grasped by the customer.

A solenoid 864 is mounted on the bracket 859, and that solenoid has an armature 866 which is secured to the lever 860 by a pin 868. This solenoid is the coin payout solenoid; and when it is energized it rotates the lever 860 in a counter clockwise direction, as that lever is viewed in FIG. 18. Such rotation of the lever 860 will raise its transversely-directed end upwardly to unblock the outlet ends of the arms 758 and 754. When the solenoid 864 is de-energized, the spring 862 will hold the lever 860 in the position indicated by FIGS. 2 and 18.

A pivot plate 870 is secured to the channel-shaped member 748, and that pivot plate holds a wire 872 while permitting rotation of that wire relative to that plate. This wire has, as indicated particularly in FIGS. 18 and 21, a horizontally directed portion which carries a knob 874, a vertically directed portion which extends down to a point adjacent the lower end of the pivot plate 870, a second horizontal portion which extends through the pivot plate 870, a second vertical portion that extends downwardly below the pivot plate 870, a third horizontally directed portion that extends toward the wall 676, a fourth horizontal portion that extends parallel to the wall 676, and a final horizontally directed portion which extends transversely of the wall 676 and extends through an opening, not shown, in that wall. The first horizontal portion of the wire 872 extends through an opening in the wall 676. The final portion of that wire has the free end thereof in register with the finger 802 and has the bent end thereof in register with the finger 800. When the knob 874 is pulled, the wire 872 will rock about the pivot plate and cause the bent end of its final portion to bear against the finger 800 and bend it away from the channel-shaped element 748 until the stop on that finger moves out of the opening 801. When the knob 874 is pushed, the free end of the final portion of the wire 872 will bend the upper end of the finger 802 away from the channel-shaped element 750 until the stop on that finger moves out of the opening 803.

The numeral 880 denotes fingers that can move into openings in the frame of the slug rejector 38 and can prevent the acceptance of coins in three of the passageways of that slug rejector. Those fingers will be suitably mounted on an armature 881 of an electro-magnet 884. A spring 882 is connected to the center wall of the frame 30 and to the upper end of the armature 881, and that spring biases the blocking fingers 880 to the position shown in FIG. 3. In that position, those fingers would prevent the acceptance of three of the four coins that are normally accepted by the slug rejector 38. However, energization of the electro-magnet 884 can cause those fingers to move out of the passageways in the slug rejector 38 and permit those three coins to pass through those passageways to the outlets of the slug rejector. In the preferred embodiment shown in the drawings, the fingers 880 selectively block the coins that otherwise would pass to the passages 82, 84 and 86 of the block 80.

The coin-handling device provided by the present invention can be associated with different types of secondary devices. One such secondary device will have a vend relay which is denoted by the numeral 886 on the circuit diagram of FIG. 27. That relay has a number of switch contacts thereon, and the pairs of switch contacts are denoted by the numerals and letters 888B, 888C, 888D and 888E. The pairs of contacts 888B, 888D and 888E are normally open but will close whenever the relay 886 is energized. The set of contacts 888C is normally closed but will open whenever the relay 886 is energized.

The numerals 890, 892 and 894 denote additional vend switches, comparable to the vend switch 336. Those switches will have projecting terminals which can seat in the openings 334 of the support 328; and those terminals will receive the leads shown in FIG. 27. While four such switches are shown in the drawings, a greater or lesser number of such switches can be used.

The numeral 896 denotes a relay that has a set of contacts 897A, a set of contacts 897B, a set of contacts 897C, and a set of contacts 897D. The sets of contacts 897A, 897B and 897C are normally open but will close whenever the relay 896 is energized; while the set of contacts 897D is normally closed but will open when the relay 896 is energized.

The numeral 898 denotes a three-section selector switch which will have a knob at the exterior of the secondary device. The customer can grasp that knob and rotate the switch 898 to select any particular product or service; and any such rotation will change the settings of all three sections of that switch. Those sections are denoted by the numerals 899A, 899B and 899C. Section 899A selectively connects the movable contacts of the empty switches 916 with the contacts 897D of relay 896; section 899D selectively connects one of the switches 894, 890, 336 or 892 with one of the segments 499, 507, 505, 501 and 500 on the support 328; and section 899C selectively connects one of the vending devices 914 with the set of contacts 897A. A relay 900 has an armature that will lock the selective switch 898 against further rotation when the arm 316 moves and permits switch 322 to close. That relay also has a set of normally open contacts 901.

The secondary device will have a switch that is operated at or near the end of the cycle of the secondary device; and that switch is referred to as a delivery switch. Such a switch is denoted by the numeral 902 in FIG. 27.

The secondary device can be equipped with a coin return switch 904 which can be pressed by the customer if he or she changes his or her mind about the purchase prior to the time the credit arm 316 reaches the sales price. That coin return switch will energize a relay 906, and that relay has a number of sets of contacts 908A, 908B and 908C. The sets of contacts 908B and 908C are normally open, but the set of contacts 908A is normally closed. Hence, energization of the coin return relay 906 will close the sets of contacts 908B and 908C but will simultaneously open the set of contacts 908A.

A secondary device can be equipped with a lamp that is adjacent a suitable notation which will let the customer know if he should insert just the number and kind of coins needed to aggregate the sales price. Such a lamp is denoted by the numeral 910, and it will be energized whenever one or the other or both of the levers 764 strike the actuator 782 of the switch 780 and hold the contacts of that switch closed during the normal position of the elements of the circuit shown in FIG. 27.

The vending devices 914 in the secondary device can be solenoids, electro-magnets, motors, or like elements that directly or indirectly control or cause the dispensing of goods or services. A number of these vending devices are indicated by FIG. 27; but the number of those devices is not critical, and a greater or lesser number can be used.

An empty switch 916 is provided for each product or service dealt in by the secondary device. The switch for any particular product or service will shift its contacts whenever the secondary device can no longer supply that product or service. The switches 916 will normally connect the electro-magnets 48 and 884 across the line, but can selectively connect the empty lamp 918 across the line. Section 899A of switch 898 will selectively preset a number of different circuits for the empty lamp 918; and those circuits will correspond exactly with the circuits set by the sections 899B and 899C.

The normal position of the electrical components of the coin-handling device of the present invention, and of one secondary device with which it can be used, is indicated by the circuit diagram of FIG. 27. The coin switch 92 is open, the switch 322 is held open, the sales-price switches 336, 890, 892 and 894 have their movable contacts in engagement with their upper stationary contacts, the coin return switch 904 is open, the motor switch 508 is open, the delivery switch 902 has its movable contact in engagement with its lower fixed contact, the change empty switch 780 is open, the contactors 502 and 509 connect the segment 499 with the contact ring 498, the three sections 899A, 899B and 899C of the selector switch 898 are in the positions shown, the contactors 593 and 597 are in the inactive positions shown, contactors 594 and 596 engage contacts 607 and 598, contactors 593 and 595 are in the inactive positions shown, the empty switches 916 are in the positions shown, the sets of contacts 412A and 412B are open, the sets of contacts 420A and 420B are open, the sets of contacts 888B, 888D and 888E are open while the set of contacts 888C is closed, the sets of contacts 897A, 897B and 897C are open while the set of contacts 897D is closed, the contacts 901 are open, and the set of contacts 908A is closed while the sets of contacts 908B and 908C are open.

To initiate a cycle of the coin-handling device of the present invention, and of the secondary device with which it is used, the customer can leave the handle of the selector switch 898 as he or she finds it or can rotate it to select other goods or services. For the purpose of giving a specific illustration, it will be assumed that the selector switch was either in the position shown or was shifted to that position; and in that position, the movable contacts of the three sections of that switch engage the second uppermost fixed contacts of those sections. Immediately, current will flow from conductor 920, through the delivery switch 902, through the contact 598, through the contactor 596 and the pigtail 589 and the contactor 594, through the contact 607, through the contacts 897D, through the movable contact and the second uppermost fixed contact of section 899A of selector switch 898, through the movable contact and the right hand fixed contact of the second-from-the-right empty switch 916, and then through the parallel-connected electro-magnets 48 and 884 to the conductor 922. That current will energize the two electro-magnets 48 and 884 and cause the upper end of the arm 46 to enter the opening 44 of slug rejector 38 to complete the penny runway of that slug rejector while also causing the fingers 880 to permit nickels, dimes and quarters to be accepted by that slug rejector. Thereupon, the customer can insert coinage in the coin entrance of the secondary device; and that coinage will be conducted by a chute, not shown, to the coin entrance of the slug rejector 38. Depending upon the price of the goods or services selected, and depending upon the denomination of the coin inserted, one coin may be sufficient to actuate the coin-handling device. However, more than one coin will usually be required. To avoid confusion, the word "coinage" will be used herein to refer equally to one coin or a plurality of coins.

A coin passing to the slug rejector 38 will be tested by that rejector, and if it is spurious it will be directed to the rejected coin chute 52 for transmission to the customer. However, if that coin is authentic and of the proper denomination, it will be delivered to one of the four outlets of the slug rejector. If that first coin is a United States quarter, it will be directed to the passage 82 in the block 80 and will pass downwardly in that passage until it engages and rests upon the pin 104 of lever 102. At that time, the quarter will be holding actuator 94 of switch 92 in contact-closing position. This establishes a circuit from conductor 920, which is connected to one side of an electric line, through the movable contact and lower fixed contact of switch 92, and through the motor timing solenoid 504 to the conductor 922, which is connected to the other side of that electric line. The resultant energization of the solenoid 504 will cause the armature 506 to move downwardly, thus freeing the actuator 517 and the contacts of the motor timing switch 508; whereupon those contacts will close and energize the motor 162. As the armature 506 moved downwardly, it caused the rack 510 to move downwardly until the upper ends of the elongated slots 516 bore against and were held by the pins 518. At such time, the spring 526 caused the tooth 521 of the pawl 522 to lodge in one of the teeth of the rack 510 and prevent upward movement of that rack. As long as the rack 510 remains in its lowered position, the switch 508 will remain closed and will keep the motor 162 energized. However, the motor 162 will rotate the shaft 158 with its sprocket pinion 160; and the resultant movement of the sprocket chain 148 will carry the lug 536 into engagement with the ear 529 on the upper end of the L-shaped lever 530 which is carried by and is considered as a part of pawl 522. That engagement will force the pawl 522 to rotate in a counter clockwise direction, whereupon the tooth 521 will be moved out of engagement with the teeth of the rack 510 while the tooth 523 will be moved into engagement with one of the upper teeth of that rack. This will permit a limited upward movement of the rack 510; and after the lug 536 has passed by the ears 529, 522, the spring 526 will move the pawl 522 to a position where the tooth 521 engages and holds the next lower tooth of the rack 510. The rack 510 will remain in that position until the lug 536 again strikes the ear 529, whereupon the rack 510 will rise to the point where it enables the armature 506 of the solenoid 504 to re-engage the switch actuator 517 and cause it to open the contacts of the switch 508. At such time, the motor 162 will stop. The particular advantage of requiring two engagements between the lug 536 and the ear 529 is that it assures at least one full cycle of the sprocket chain. In the absence of the two engagements, the lug 536 might be just a short distance from the ear 529 at the start of a cycle, and it would then strike that ear almost immediately and cause the motor to stop prematurely. The L-shaped lever 530, of which the ear 529 is a part, is mounted on the pivot 528 on pawl 522, and it is biased against the stop 532 on that pawl by the spring 526. The lever 530 and the pawl 522 normally move about the pivot 520 as a unit, but if the lug 536 is holding the ear 529 at the left side of opening 534 when the armature 506 moves downwardly, those elements will not be able to move as a unit; instead, the upper end of the pawl 522 will move back and forth as the teeth 521 and 523 are alternately driven by the downwardly moving rack 510, and the resultant back and forth movement of the pivot 528 on that pawl will cause the lever 530 to rotate back and forth about the point of engagement of the lug 536 with the ear 529. The spring 526 will yield to accommodate such movement of lever 530.

During the time that the motor 162 was running, the shaft 114 was driven by the sprocket chain 148 and the sprocket pinions 160 and 142; and that shaft caused the coin wheel 118 to rotate and move the high point of the cam 119 against the pin 112 of the L-shaped lever 102. Such engagement rocked the lever 102 to the position shown in FIG. 2, whereupon the quarter moved downwardly in the passage 82 until its lower edge rested upon the bottom of the peripheral groove 128 that is in register with the coin pocket 126. That peripheral groove and the other peripheral grooves 128 keep the coins from by-passing the coin pockets, as by guiding those coins into those pockets instead of letting those coins rest on those portions of the wheel that define those pockets.

The cam 119 is so spaced relative to the coin pockets 120, 122, 124 and 126 that it will not permit coins to move downwardly in the passages of the block 80 at a moment when the trailing edge of any of the coin pockets is immediately adjacent the block 80. Consequently, there is no possibility of a coin being jammed or bound between a coin pocket and a coin passage in the block 80. Instead, the coins will remain in the upper part of the block 80 until the lever 102 is rotated to let them move downwardly, and at that time they can move downwardly and be supported by the grooves 128 of the coin wheel 118. Almost immediately after the pin 102 is moved out of the coin passages of the block 80, the pocket 126 will start moving into register with the passage 82; and the quarter will move downwardly into the pocket. The remaining pockets are spaced circumferentially from the pocket 126 and from each other, and hence if other coins had been released by the pin 102 they would rest on the peripheral grooves 128 until their respective pockets came into register with the block 80.

During this same energization of the motor 162, the coin wheel 118 moved the quarter under the arcuate plate 108 and moved it into engagement with the roller 168 on lever 164. Thereupon the lever 164 rotated in a clockwise direction about the pivot in the end of which the screw 186 is seated. That rotation pulled the connecting rod 190 to the left, as that connecting rod is viewed in FIG. 2, and the vertical arm of the L-shaped slot 194 in that connecting rod acted upon the pin 199 in the end of the lever 196 to rotate the lever 196 about the pivot 198. Such rotation moved the pin 200 toward the right side of the opening 202, as that pin and opening are viewed in FIG. 14, and that movement rotated the lever 242 about the pin and sleeve combination 236; thereby raising the cam follower 245 up to a point where it was engaged by the camming surface 138. The cam disc 130 and the coin wheel 118 are positively locked in a predetermined angular relation so the cam follower 245 will be engaged by the camming surface 138 almost immediately after the pin 200 caused the lever 245 to move upwardly; and the camming surface 138 will hold the cam follower 245 even after the quarter has moved out of engagement with the lever 164. Consequently, the continued movement of the coin wheel 118 that carried the quarter beyond the roller 168 did not interrupt the interaction of the cam follower 245 and the camming surface 138. The quarter continued to move under the action of the coin pocket 126 of the coin wheel 118 and it was held against release from that pocket by the arcuate plate 702 until it reached a position in register with the coin chute 694. At that time the quarter fell out of the coin pocket 126 and passed downwardly through the coin chute 694 to the escrow chamber 697.

The interaction of the cam follower 245 and the camming surface 138 of the cam disc 130 continued until the cam disc 130 had made a rotation of approximately one hundred and eighty degrees. During that rotation, the camming surface 138 forced the cam follower 245 to raise the right hand end of the lever 242 upwardly, as that lever is viewed in FIG. 1; and that action forced the elongated bar 262 to move upwardly and bring the teeth of the rack 286 into engagement with the teeth of the ratchet wheel 308. The cam follower 245 forced the lever 242 to move the bar 262 and rack 286 so far that the wheel 308 rotated the sleeve 304 and the arm 316. Each tooth on the rack 286 corresponds to one unit of credit; and in the preferred embodiment, one unit of credit corresponds to one cent. The camming surface 138 is made so it causes the rack 286 to rotate the ratchet wheel 308 far enough to move the arm 316 a distance equal to twenty five cents. The pawl 358 permits the sleeve 304 and the ratchet wheels and the credit arm thereon to rotate in the counter clockwise direction but will hold that sleeve against returning, as by engaging the teeth of the ratchet wheel 308. Hence, the arm 316 remained in register with position twenty five on the support 328 even after the camming surface 138 moved out of engagement with the cam follower 245. However, the lever 242 and the elongated bar 262 responded to spring 252 to return to their initial positions after the cam follower 245 slipped off the trailing edge of the camming surface 138; and the rack 286 rotated about the pivot 284 to permit its teeth to slip past the teeth on the ratchet wheel 308.

As soon as the lever 316 started to rotate, the L-shaped plate 318 thereon moved out of engagement with the button-like actuator of the switch 322; whereupon the contacts of that switch closed. A circuit was then established from conductor 920 through the switch 322 and through the locking solenoid 900 to the conductor 922. That circuit energized the solenoid 900 and caused the plunger of that solenoid to coact with the armature of the selector switch 898 to positively lock that armature against further movement. Hence, the customer cannot change the position of the selector switch 898 after the credit arm 316 has moved. Further, the energization of relay 900 closed the set of contacts 901.

The pressure foot 324 of the credit arm 316 engaged the button-like actuator of the switch 894 as that credit arm reached position twelve and it released that actuator as the arm 316 reached position thirteen. Similarly, that pressure foot engaged the actuator of switch 890 as the arm 316 reached position twenty four and it released that actuator as the arm reached position twenty five. In doing so, the pressure foot 324 successively moved the movable contacts of switches 894 and 890 down into engagement with the lower fixed contacts of those switches and then freed those movable contacts for movement into engagement with the upper fixed contacts of those switches. However, no circuits were energized since section 899B of the selector switch 898 separates the movable contacts of those switches from conductor 920.

The motor 162 will continue to run and to drive the shaft 114 until the lug 536 on the sprocket chain 148 has struck the ear 529 twice and thereby enabled the rack 510 to work its way up to the point where it causes the actuator 517 to open the switch 598. Thereupon the rotating parts of the coin-handling device will come to rest. The speed at which the shaft 114 rotates is sufficiently great that the quarter is dropped into the pocket 126, the lever 164 is rotated to pull the lever 190, the lever 196 is rotated to move the pin 200, the lever 242 raises the cam follower 245 up into the path of the camming surface 138, the elongated bar 262 and the rack 286 rotate the ratchet wheel 308, the credit arm 316 moves to position twenty five, and the lever 242 and the bar 262 and the rack 286 return to their normal positions before the lug 536 has struck the ear 529 for the second time.

As the arm 316 rotated to position twenty five, the sprocket chain 344 caused the counter 350 to show the digits two and five. In that way, the customer was apprised of the fact that he was accredited with the full value of the inserted coin.

The motor 162 will remain de-energized until another coin is inserted. If another quarter is inserted, the quarter will pass through the slug rejector 38 and enter passage 82 of block 80; where it will strike the switch actuator 94 and the pin 104. The actuator returned to its normal position after the coin wheel 118 moved the pocket 126 into register with passage 82 and let the first quarter drop into the pocket; and that pin returned to its blocking position after the high point of the cam 119 moved out of engagement with the pin 112 of lever 102.

The second quarter will close the switch 92, and re-energize the solenoid 504; and thereafter the armature 506 and the rack 510 will move downwardly to permit the switch 508 to close. Once this is done, the motor 162 will start and the cam 119 on the coin wheel 118 will move the lever 102 to drop the quarter, and the coin wheel 118 will move the pocket 126 into register with the passage 82. Subsequently, the quarter will be carried into engagement with roller 168 on lever 164, lever 190 will be pulled to the left, the lever 196 will be rotated, the pin 200 will be moved against the inclined surface 244 on ever 242, the lever 242 will be rotated to raise the cam follower 245 into the path of camming surface 138, the elongated bar 262 and the rack 286 will move upwardly, the ratchet wheel 308 and the arm 316 will rotate and the sprocket chain 344 will actuate the counter 350.

As the arm 316 approaches position forty nine, the pressure foot 324 thereon will strike the button-like actuator of the switch 336 and will force the movable contact of that switch downwardly into engagement with the lower fixed contact of that switch. Thereupon current will flow from the conductor 920, through the delivery switch 902, through contact 598, through contactor 596, and pigtail 589, and contactor 594, through contact 607, through contacts 897D, through the continuous contact 498, through the contactor 502 and pigtail 511 and contactor 509, through the arcuate segment 499, through the movable contact and the second uppermost fixed contact of section 899B of selector switch 898, through the lead 342, through the movable contact and the lower fixed contact of the switch 336, through the lead 340, and then through the electro-magnet 414 to the conductor 922. The energization of the electro-magnet 414 will cause the sets of contacts 420A and 420B of the switch 420 to close. A holding circuit for the electro-magnet 414 will be established, and that circuit extends from conductor 920, through delivery circuit 902, through contact 598, through contactor 596 and pigtail 589 and contactor 594, through contact 607, through contacts 897D, through contacts 420B, and then through electro-magnet 414 to the conductor 922. This holding circuit is maintained as long as the delivery switch 902, the contacts 897D and the contactors 594 and 596 are not disturbed. The closing of the contacts 420A does not energize a circuit because the movable contact of switch 336 is out of engagement with the upper fixed contact of that switch. The energization of the electro-magnet 414 will also cause the armature 416 to release the pawl 378; whereupon the spring 386 will pull the free end of that pawl downwardly toward the ratchet wheel 310. The free end of the pawl 378 will not directly engage the root of a tooth on the ratchet wheel 310; instead it will rest upon the inclined face of one such tooth. As the credit arm 316 advances one step to position fifty, the ratchet wheel 310 will advance correspondingly and will place the root of the next succeeding tooth in engagement with the free end of the pawl 378. The setting of the ratchet wheel 310, of the pawl 378, of the bar 262, of the camming surface 138, of the rack 286, and of arm 316 is such that when the rack 286 was fully raised by the camming surface 138, the credit arm 316 moved its pressure foot 324 far enough to permit the button-like projection of switch 336 to return to its original position and the pawl 378 seated itself against the root of a tooth of the ratchet wheel 310.

When the actuator of switch 336 was released, the movable contact of that switch moved upwardly into engagement with the upper fixed contact of that switch and established a circuit that extends from conductor 920, through delivery switch 902, through contact 598, through contactor 596 and pigtail 589 and contactor 594, through contact 607, through contacts 897D, through continuous ring 498, through contactor 502 and pigtail 511 and contactor 509, through arcuate segment 499, through the movable contact and the second uppermost fixed contact of section 899B of selector switch 898, through lead 342, through the movable contact and fixed upper contact of switch 336, through the lead 338, through the contacts 420A, and through the relay 886 to the conductor 922. That circuit energizes the relay 886, and that relay will close its contacts 888B, 888D and 888E while opening its contacts 888C. The closing of the contacts 888E established a holding circuit for the relay 886; that circuit extending from the conductor 920, through the delivery switch 902, through contact 598, through contactor 596 and pigtail 589 and contactor 594, through contact 607, through contacts 897D, through contacts 888E, and through the relay 886 to the conductor 922. That circuit will keep the relay 886 energized as long as the delivery switch 902, the contacts 897D and the contactors 594 and 596 are not disturbed. The opening of the contacts 888C disconnected the coin return relay 906 from conductor 920 and thereby prevented the energization of that relay. This is important since it will keep the closing of switch 904 from energizing the relay 906; thereby keeping a customer from obtaining the return of his or her money as well as the dispensing of the desired goods and services. The closing of the contacts 888D established a circuit from conductor 920, through the contacts 888D and through the relay 896 to the conductor 922. The closing of the contacts 888B established a circuit that extends from conductor 920, through contacts 888B, and through the parallel-connected solenoids 224 and 586 to the conductor 922. The resulting energization of the solenoid 224, which is the credit disconnect solenoid, causes the armature of that solenoid to lift the pin 220 upwardly and thereby place the horizontal arms of the L-shaped slots 194 and 210 in register with the pins 199 and 214 on the levers 196 and 206. Hence, if the customer had inadvertently inserted still another coin, that coin could not apply additional units of credits to the credit-storing device of the coin-handling device; any movement of the levers 190 and 206 in response to the movement of that coin past the levers 164 and 176 being unable to cause movement of the pins 200 and 216, since the vertical arms of the slots 194 and 210 are out of register with the pins 199 and 214. Such a disconnecting of the credit-storing device is necessary because a customer could insert coinage that would otherwise overtax the capacity of the change payout system, thereby temporarily incapacitating the coin-handling device and the said secondary device.

The solenoid 586 is the escrow timer solenoid of the coin handling device, and it causes the armature 588 to move downwardly and pull the L-shaped bar 574 downwardly. Such action causes the pawl 582 to act on the ratchet wheel 572 and rotate the shaft 546 one step. Immediately, the circuits that were established through contacts 598 and 607 are broken. Specifically, the circuit to the elctro-magnets 48 and 884 is broken; and thereupon the arm 48 moves out of the opening 44 of slug rejection 38 while the fingers 880 move into the nickel, dime and quarter passage of that slug rejector. This enables that slug rejector to reject all subsequently inserted coins; those coins being directed to reject coin chute 52 for transmission to the customer. In addition, the holding circuits of electro-magnet 414 and relay 886 are broken; thereby causing contacts 420A and 420B to open, causing contacts 888B, 888D and 888E to open, and causing contacts 888C to close. The opening of contacts 888B will not affect the solenoids 224 and 586 since the escrow timer moved the contactor 595 onto the contact 604, thereby establishing a holding circuit for solenoids 224 and 586; that circuit extending from conductor 920, through contact ring 600, through contactor 593 and pigtail 591 and contactor 595, and then through the parallel-connected solenoids 224 and 586 to conductor 922. That circuit will remain energized until contactor 595 again moves onto "dead" segment 605. The opening of contacts 888D will not de-energize the relay 896 since that relay will meanwhile have established a holding circuit through the contacts 897B. The closing of contacts 888C will not permit energization of relay 906 since contactors 594 and 596 will have disconnected switch 904 from conductor 920. The circuits to the swtiches 336, 890, 892 and 894 will also be broken; and this is desirable since it kepes those switches from re-energizing the electro-magnets 406 or 414 and the relay 886 as the pressure foot 324 of the credit arm 316 actuates those switches during the return of that credit arm to its initial position.

When the contacts 888D were closed and the relay 896 was enregized, contacts 897A, 897B and 897C of that relay closed while contacts 897D of that relay opened. The closing of contacts 897B established a holding circuit for the relay 896 that extends from conductor 920, through delivery switch 902, through the contacts 878B, and through the relay 896 to the conductor 922; and that holding circuit will remain energized as long as the delivery switch 902 is not disturbed. The closing of contacts 897A energized the second uppermost vending device 914; current flowing from conductor 920, through contacts 897A, through the movable contact and the second uppermost fixed contact of section 899C of selector switch 898, and then through the second uppermost vending device 914 to the conductor 922. The closing of the contacts 897C maintains relay 900 enregized until the relay 896 is de-energized; even though the credit arm 316 returns, in the meanwhile, to its initial position and opens the switch 322. The opening of contacts 897D will keep de-energized the holding and vend switch circuits that were de-energized when contactors 594 and 596 were moved.

When the shafts 546 was advanced its initial step by the solenoid 586 and pawl 582, the ratchet wheel 548 was moved into a position where one of the teeth thereon was in register with the pawl 560 carried by the bar 550. That bar reciprocates continuously whenever the motor 162 is running; but normally that reciprocation has no effect upon the shaft 546 because ratchet wheel 548 normally presents to the pawl 560 the portion of its periphery that has a tooth missing. However, the one step that was applied to the ratchet wheel 548, by the energization of the solenoid 586 and the consequent action of the pawl 582 on the ratchet wheel 572, moved the toothless portion of the ratchet wheel 548 away and placed a tooth in register with the pawl 560. Consequently, the reciprocating action of the bar 550 will step the ratchet 548 and the shaft 546 around.

In their initial positions, the contactors 593 and 595 were not completing a circuit because the contactor 595 was resting on the "dead" segment 605. Similarly, the contactors 593 and 597 were not completing a circuit because the contactor 597 was resting on the "dead" segment 603. However, when the shaft 546 received its first step from solenoid 586, contactors 593 and 595 completed the aforementioned holding circuit for the solenoids 224 and 586.

When the shaft 546 recieves its next step, because of a reciprocation of the bar 550, contactor 597 will move onto segment 601 and establish a circuit from conductor 920, through continuous ring 600, through contactor 593 and pigtail 591 and contactor 597, through segment 601, through contacts 908A, and parallel-connected solenoids 628 and 864 to conductor 922. The solenoid 628 will pull its armature 630 downwardly and force the rod 608 to move downwardly. Thereupon, the doors 686, 692 and 696 of the escrow chambers will be moved downwardly; and the two quarters will slide to the accepted coin chute 701 for transmission to the coin box, not shown. The solenoid 864 will act through its armature 866 to rotate the lever 860 to unblocking position. However, since the customer deposited the exact amount of coinage to aggregate the sales price, no change is to be paid out; and the stops on fingers 800 and 802 will effectively block the arms 758 and 754 of the passages defined by the channel-shaped elements 748 and 750.

The continued rotation of the shaft 546, by the bar 550 and the pawl 560, will cause contactor 597 to leave segment 601 and move onto the "dead" segment 599; but prior thereto that contactor will have been in engagement with the segment 601 for a time that is more than sufficient to insure emptying of the escrow chambers. When the contactor 597 engages the "dead" segment 599, the circuits to the solenoids 628 and 864 will be broken. Thereupon the doors 686, 692 and 696 will close, and the lever 860 will return to blocking position.

The continued rotation of the shaft 546, by the bar 550 and the pawl 560, will cause contactor 597 to engage the segment 602. Thereupon a circuit will be established that extends from conductor 920, through continuous ring 600, through contactor 593 and pigtail 591 and contactor 597, through segment 602, and through the parallel-connected solenoids 364 and 634. The energization of solenoid 364 moves the pawl 358 out of engagement with the teeth of ratchet wheel 308. Such movement of the pawl 358 permits the spiral spring 354, which was tightened during the rotation of the credit arm 316, to return the arm 316 and the ratchet wheels 306, 308 and 310 to their initial positions. The spring 354 has an initial force stored in it, so it will assure full return of the credit arm and the ratchet wheels to their initial positions. The energization of the solenoid 864 enables the armature 636 to move the connecting rod 618 downwardly and force the movable doors 684, 690 and 698 of the escrow chambers to open. However, the quarters that were in the escrow chamber 697 had previously been directed to the cash box by the opening of the doors 686, 692 and 696 when the solenoid 628 was energized.

During the return of the ratchet wheel 308 to its initial position, the ratchet wheel 310 also returned to its initial position; and as it did so the pin 398 thereon struck the lower end of the lever 392. This caused the lever 392 to bear against the upper end of the pawl 378, and that pawl was again grasped and held by the armature 416 of the electro-magnet 414. That electro-magnet was de-energized when contactors 594 and 596 moved; and at that time the armature 416 moved into position to receive the upper end of the pawl 378.

The second uppermost vending device 914 of the secondary device was energized by the closing of contacts 897A, as described above; and it carried out its own cycle of operation. During or at the end of that cycle, the delivery switch 902 had its movable contact shifted momentarily to its upper fixed contact. At such time, the holding circuit of the relay 896 was broken, and the contacts 897A, 897B and 897C of that relay opened while contacts 897D closed. That action finally concluded the cycle of the coin-handling device and of the secondary device with which it was used. That cycle included the setting-up of credits, the holding of the coins in escrow chambers subject to the will of the customer, the impulsing of the vending device of the secondary device, the blocking of additional coins, the transfer of the coins to the cash box, the non-payment of change because the inserted coinage just equalled the sales price, and the restoration of the devices to their initial positions.

The sales price of fifty cents could also have been aggregated by depositing five dimes. Where this was done, the dimes would have been directed by the slug rejector 38 to the coin passage 84; and they would have been lowered down to the periphery of the coin wheel 118 by successive actuations of the lever 102 by the cam 119 on the coin wheel 118. Each dime would energize the switch 92, thereby starting the motor 162; and the motor timing mechanism would operate in the same way that it did when a quarter energized the switch 92.

The rotation of the coin wheel 118 would carry each dime around into engagement with the roller 168 and would rotate lever 164 in a clockwise direction. Such rotation would cause the lever 190 to move to the left, as that lever is viewed in FIG. 2; and such movement would cause rotation of the vertical lever 196. That rotation would cause the pin 200 to move to the right, as that pin is viewed in FIG. 1; thereby causing the lever 242 to rotate and move the cam follower 245 into the path of the camming surface 136. That camming surface trails the camming surface 138 by approximately one hundred and eighty degrees; just as the coin pocket 124 trails the coin pocket 126 by approximately one hundred and eighty degrees. This relationship is important since it enables one lever and one cam follower to be used with two camming surfaces, and yet has the lever selectively respond to the right coin to move into the path of the right camming surface. Specifically, when a dime moves the cam follower 245, through the medium of roller 168, lever 164, rod 190, pin 199, lever 196, pin 200 and lever 242, the camming surface 136 is immediately adjacent that cam follower while the camming surface 138 is spaced almost one hundred and eighty degrees away. Similarly, when a quarter moves the cam follower 245, the camming surface 138 is immediately adjacent that cam follower while the camming surface 136 is almost one hundred and eighty degrees away.

Once the dime has caused the lever 242 to raise the cam follower 245, that cam follower will be moved further upwardly by the camming surface 138; and this movement will cause the rack 286 to engage the ratchet wheel 308 and apply ten units of credit to the credit arm 316. Hence, the first dime will cause the credit arm 316 to move into register with position ten on support 328. The second dime would move the credit arm 316 into position twenty on the support 328. In moving to that position, the arm 316 caused the contacts of switch 894 to shift and then restore themselves. However, no circuits would be energized since that switch is dis-connected from the conductor 920 by section 899B of selector switch 898. The third dime would cause the credit arm 316 to advance to position thirty on the support 328; and in doing so that arm would cause the contacts of switch 890 to shift and then restore themselves. Here again, no circuit would be energized because section 899B of the selector switch 898 disconnects that switch from conductor 920. A fourth dime would advance the credit arm 316 to position forty; and a fifth dime would move that arm 316 to position fifty. As the credit arm 316 reached position forty nine, the movable contact of the switch 336 would be moved down into engagement with the lower fixed contact of that switch; thereby energizing electromagnet 414, and as that arm reached position fifty the movable contact of switch 336 would move back up into engagement with the upper fixed contact and energize relay 886. The successive energizations of electro-magnet 414 and relay 886 would initiate the same sequence of operations that were initiated when the credit arm 316 was advanced to position fifty by quarters. During the cycle of the coin-handling device, the dimes would fall into the coin chute 694 for delivery to the escrow chamber 697; and later would pass into accepted coin chute 701. At the conclusion of the cycle, the coin-handling device and the secondary device will be restored to their initial positions.

The sales price of fifty cents would also be attained by depositing nickels. The nickels would be directed by the slug rejector 38 to coin passage 86 in the block 80. The first nickel would strike the switch actuator 94 and cause the coin switch 92 to close, thereby energizing the motor timing solenoid 504. This would cause the motor 162 to start rotating. The nickel would be lowered down to the periphery of the coin wheel 118 when the high point on the cam 119 struck the cam follower 112 on the lever 102; and that nickel would rest on that periphery until the coin pocket 122 moved into register with the passage 86. The nickel would then drop into the pocket 122 and be carried into engagement with the roller 180 on lever 176; thereby causing the lever 176 to rotate in a clockwise direction about the stud which has the screw 186 in the outer end thereof. Such rotation would cause the lever 206 to move to the left and apply a force to the pin 214; that pin being lodged within the vertical arm of the L-shaped slot 210. The pin 214 would cause the C-shaped lever 212 to rotate about the pivot 198; and such rotation would move the pin 216 to the right in the opening 218. Such movement of the pin 216 would cause it to act upon the inclined face 240 of the lever 238 and rotate that lever upwardly until that cam follower 241 was in register with the camming surface 134. Further rotation of the cam disc 130 would cause the camming surface 134 to move the cam follower 241 and the lever 238 upwardly, thereby forcing the elongated bar 278 to move upwardly. This will move the rack 294 into engagement with the ratchet wheel 306, thereby causing rotation of the credit arm 316. The rack 294 would establish five units of credit by this movement of the credit arm 316; causing that arm to move to position five on the support 328. Thereafter, the spring 250 would move the lever 238 and the elongated bar 278 downwardly; the rack 294 rotating about the pivot 292 in returning to its initial position. The spring 300 will yield to permit this rotation of the rack 294; and the result of that rotation is that the teeth of rack 294 slip past the teeth of the ratchet wheel 306.

Succeeding nickels will step the credit arm to positions ten, fifteen, twenty, twenty five, thirty, thirty five, forty, forty five and fifty. As the third nickel caused the credit arm 316 to move through positions twelve and thirteen, the contacts of switch 894 were shifted and then restored. Similarly, when the fifth nickel caused the credit arm 316 to move through positions twenty four and twenty five, the contacts of switch 890 were shifted and then restored. Again, when the tenth nickel caused the credit arm 316 to move through positions forty nine and into position fifty, the contacts of switch 336 were shifted and then restored. The shifting and restoration of the contacts of switches 894 and 890 did not energize any circuits because section 899B of the selector switch 898 disconnected those switches from the conductor 920. However, the shifting and restoration of the contacts of switch 336 will successively energize electro-magnet 414 and relay 886; thereby initiating the same sequence of operations that were initiated when the credit arm was advanced to position fifty by quarters. During the cycle of the coin-handling device, the nickels would fall into escrow chamber 688; and later would pass into the coin-aligning hopper 706. In doing so, they replenish the supply of nickels available for the paying out of change. At the conclusion of the cycle, the coin-handling device and the secondary device will be restored to their initial positions.

The sales price of fifty cents could also be attained by depositing pennies. The slug rejector 38 would direct each succeeding penny to the coin passage 83 where each such penny would strike the switch actuator 94, thereby closing the coin switch 92. This leads to the starting of motor 162. Each penny would be lowered down to the periphery of the coin wheel 118 as the high point of the cam 119 engaged the cam follower 112 of lever 102 and rotated that lever. Each penny would, in turn, drop into the coin pocket 120 and be rotated around into engagement with the disc 183. Thereupon the lever 176 would rotate, and rotation would pull the lever 206 to the left, as that lever is viewed in FIG. 2. Such movement would enable the lever 206 to rotate the C-shaped lever 212 and move the pin 216 in the opening 218. Thereupon the lever 238 would raise the cam follower 241 up into the path of camming surface 132; and that camming surface would cause the lever 238 to move the elongated bar 278 and the rack 294 to rotate the arm 316 one step. The first penny would move the credit arm 316 to position one, and succeeding pennies would advance that arm to position fifty. No circuits would be energized as the credit arm 316 passed through positions twelve, thirteen, twenty four and twenty five because section 899B of selector switch 898 disconnected those switches from conductor 920. However, as the forty ninth penny caused the arm 316 to move to position forty nine, switch 336 energized electro-magnet 414; and as the fiftieth penny caused the arm 316 to move to position fifty, switch 336 energized the relay 886. The successive energizations of electro-magnet 414 and relay 886 would initiate the sequence of operations that were initiated when the credit arm 316 was advanced to position fifty by quarters.

During the cycle of the coin-handling device, the pennies would fall into escrow chamber 672; and later would pass to the coin-aligning hopper 704. In doing so, they replenish the supply of pennies available for the paying out of change. At the conclusion of the cycle, the coin-handling device and the secondary device would be restored to their initial position.

Hence, it is clear that the coin-handling device provided by the present invention can establish credits and can actuate a secondary device in response to the insertion of a number of penines, a number of nickels, a number of dimes, or a number of quarters. By suitable modification, the coin-handling device of the present invention could be made to respond to any four coins of desired denomination.

The sales price of the coin-handling device of the present invention can also be attained with combinations of different coins. Specifically, that sales price can be attained with combinations of pennies, nickels, dimes and quarters. For example, a quarter, a dime, two nickels and five pennies can be inserted to aggregate the sales price of fifty cents. The insertion of the quarter would move the credit arm 316 to position twenty five. That movement would cause the contacts of switches 894 and 890 to shift and then restore themselves; but that shifting and restoration would not energize any circuits since section 899C of selector switch 898 disconnected those switches from conductor 920. The insertion of the dime would advance the credit arm 316 to position thirty five, and the insertion of the two nickels would successively advance the credit arm to positions forty and forty five. The pennies would successively advance the credit arm 316 to positions forty six, forty seven, forty eight, forty nine and fifty; the electro-magnet 414 being energized when that arm reached position forty nine, and relay 886 being energized when that arm reached position fifty.

Coins need not be introduced into the coin-handling device of the present invention in any particular order or sequence; instead, they can be introduced in random and unoriented fashion. The coin pockets 120, 122, 124 and 126 are spaced circumferentially around the periphery of the coin wheel 118, and none of those pockets is in direct registry with any of the other pockets. Consequently, no matter how rapidly or in what sequence coins are inserted, each coin will be transported individually in a coin pocket and will act to store credits independently of the coins that precede or succeed it. This individual handling of the various coins is abetted by the action of lever 102 and pin 104; that lever and pin permitting coins to move to the coin wheel 118 at just one point in the cycle of that coin wheel.

In the event the customer places a number of coins in the coin slot of the secondary device but does not have enough coins to aggregate the sales price of the desired article, or if he or she changes his or her mind, he or she will not lose his or her money since all he or she need do is actuate the switch 904, which will be mounted at the exterior of the secondary device. Actuation of that switch will complete a circuit from conductor 920, through the delivery switch 902, through contact 598, through contactor 596 and pigtail 589 and contactor 594, through contact 607, through switch 904, through contacts 901, through contacts 888C, and through relay 906 to conductor 922. That circuit will energize relay 906 and thereby cause contacts 908A to open while causing contacts 908B and 908C to close. The closing of contacts 908B will cause current to flow from conductor 920, through contacts 908B and through solenoid 504 to conductor 922. That current will energize the solenoid 504, thereby closing switch 508 and starting the motor 162. The closing of contacts 908C will cause current to flow from conductor 920, through delivery switch 902, through contact 598, through contactor 596 and pigtail 589 and contactor 594, through contact 607, through switch 904, through contacts 901, through contacts 888C, through contacts 908C, and through parallel-connected solenoids 224 and 586 to conductor 922. That current will energize those solenoids; enabling solenoid 224 to prevent the storing of additional credits, and enabling solenoid 586 to advance the shaft 546 of the escrow timer one step. That advancement of shaft 546 completes a holding circuit from conductor 920, through continuous ring contact 600, through contactor 593 and pigtail 591 and contactor 595, through contact segment 604, and through the parallel-connected solenoids 224 and 586. That circuit will remain energized until the contactor 595 steps around to the "dead" segment 605 again. Another holding circuit is completed by the said advancement of shaft 546; that circuit extending from conductor 920, through continuous contact 600, through contactor 593 and pigtail 591 and contactor 595, through contact segment 604, through contacts 908C and then through relay 906 to conductor 922. This holding circuit will also remain energized until the contactor 595 steps around to the "dead" segment 605. Hence, the closing of switch 904 starts the motor 162 and starts the escrow timing device. The motor 162 will act through the eccentric pin 144 and the connecting links 146 and 550 to advance the escrow timer shaft 546 through a full cycle. However, the movement of contactor 597 onto segment 601 will not energize the parallel-connected solenoids 628 and 864 because the contacts 908A were opened by the relay 906, and they will be held open until the contactor 595 again moves onto "dead" segment 605. As a result the doors 686, 692 and 696 of the escrow chambers will not be energized, and the lever 860 will not be moved to unblocking position. The customer is thus protected since the coins in the escrow chambers are not directed toward the coin box or the coin-aligning hoppers; and the operator is protected since change will not be paid out.

The contactor 579 will continue to move in a counterclockwise direction and will pass by the "dead" segment 599 and engage segment 602. Thereupon, a circuit will be established that extends from conductor 920, through continuous contact ring 600, through contactor 593 and pigtail 591 and contactor 597, through segment 602, and through parallel-connected solenoids 364 and 634. The energization of these solenoids moves the pawl 358 out of engagement with the ratchet wheel 306, thereby freeing the credit arm 316 to enable it to return to its initial position under the action of spring 354; and it moves the doors 684, 690 and 698 downwardly to direct the coins in the escrow chamber to the returned coin chute 56. The shaft 546 of the escrow timer will continue to rotate until the toothless portion of ratchet wheel 548 is in register with the pawl 560. At that time the contactors of that timer will be in the positions shown by FIG. 27.

Casual and disinterested persons may idly actuate the switch 904 when the secondary device is at rest; and it would not be desirable to have such actuations of that switch cycle the motor 162 and the escrow timer. The present invention prevents any such cycling by disposing the contacts 901 between switch 904 and the relay 908. As a result, actuation of the swtich 904 cannot energize relay 906 until after a coin has been introduced into the coin-handling device; that coin causing the credit arm 316 to move and permit switch 322 to close, and the closing of that switch energizing solenoid 900 and causing contacts 901 to close. In this way, the present invention prevents needless cyclings of the motor 162 and the escrow timer, while assuring prompt return of deposited coins whenever the customer desires their return.

The coin-handling device of the present invention renders the switch 904 ineffectual after the sales price has been reached, and thus protects the operator of the secondary device against a situation where goods or services are dispensed and the customer secures the return of his money. This protection is afforded by the contacts 888C that open and thereby disconnect the relay 906 from the conductor 920 and the switch 904 as soon as the vend relay 886 is energized. That vend relay will remain energized until after the contactors 594 and 596 of the escrow timer have moved to break the circuit of relay 886; and thereafter the closing of the contacts 888C will not permit energization of relay 906 because the movement of contactors 594 and 596 also broke the circuit between conductor 920 and the switch 904. As a result, the switch 904 and the relay 906 are able to return coins to the customer only during the period between the deposit of a coin and the time the credit arm reaches the sales price and energizes the vend relay 886.

The coin-handling device provided by the present invention can also establish credits in the event coinage having a value in excess of the sales price is deposited; and it can thereafter pay out change in accordance with those credits. Specifically, if a nickel was deposited, it would advance the credit arm 316 to position five on the support 328; and if two quarters were then deposited they would successively advance the credit arm 316 to position thirty and then to position fifty five. When the credit arm 316 reached position forty nine, the pressure foot 324 thereon actuated the switch 336 and forced the movable contact thereof downwardly into engagement with the fixed contact connected to the lead 340. Thereupon, the electromagnet 414 became energized, and the energization of that electromagnet released the pawl 378 that is in register with the armature 416 of the electro-magnet. The pawl 378 moved downwardly under the action of the spring 386, and the free end of the pawl engaged a portion of a tooth on the ratchet wheel 310; that end of the pawl engaging that tooth between its root and its tip. As the credit arm 316 moved to position fifty, the movable contact of switch 336 moved upwardly into engagement with the upper contact, and the free end of pawl 378 came to rest against the root of the next succeeding tooth on the ratchet wheel 310. The upward movement of the movable contact of switch 336 established a circuit that energized the vend relay 886. As the credit arm 316 moved to position fifty one, the pawl 378 had to move with the ratchet wheel 310; and in doing so that pawl forced the gear segment 368 to rotate in a counter clockwise direction about the pivot 302. Such rotation moved the double rack 422 to the right, as that double rack is viewed in FIG. 14; and that movement rotated spur gear 428, vertical shaft 430, crown gear 836, crown gear 834, horizontal shaft 832, crown gear 830, crown gear 826, cam shaft 814 and the cams thereon, spur gear 828, idler gear 842, spur gear 846, and cam shaft 844 and the cams thereon.

As the credit arm 316 moved from position fifty to position fifty one, the shaft 430 rotated sufficiently to drive the cam shaft 814 an angular distance of thirty six degrees and to drive the cam shaft 844 an angular distance of fourteen degrees and twenty four minutes. That movement of shafts 814 and 844 shifted all of the cams 816, 818, 820, 822, 824, 848, 850, 852, 854 and 856 from the initial positions shown in FIGS. 21–25. Specifically, cam 816 moved to permit the stop of finger 802 to move out of opening 803, cam 818 moved to force the stop of finger 804 into opening 805, cams 820 and 822 continued to permit the stops of fingers 806 and 808 to remain out of the openings 807 and 809, cam 824 moved to force the stop of finger 810 into opening 811, cam 856 moved but still continued to hold the stop of finger 800 in the opening 801, cams 854 and 852 and 850 moved but continued to permit the stops of fingers 798 and 796 and 794 to remain out of the openings 799, 797 and 795, and cam 848 moved to force the stop of finger 792 into opening 793. Although the stop on finger 802 moved out of the opening 803, a penny did not roll out of the arm 754 because the master stop 860 blocked the lower end of both arms 754 and 758.

The movement of the credit arm 316 from position fifty one to position fifty two caused an additional rotation of cam shaft 814 and 844. At the end of that rotation, the stop on finger 802 was still out of opening 803, the stop on finger 804 had moved out of opening 805, the stop on finger 806 had moved into opening 807, the stop on finger 808 remained out of opening 809, the stop on finger 810 remained in opening 811, and the positions of the stops on fingers 792, 794, 796, 798 and 800 continued without change. The movement of the credit arm 316 from position fifty two to position fifty three caused further rotation of the shafts 814 and 844. At the conclusion of that rotation, the stops on fingers 802 and 804 remained out of the opening 803 and 805, the stop on finger 806 had moved out of opening 807, the stop on finger 808 had moved into opening 809, the stop on finger 810 remained in opening 811, and the positions of the stops on fingers 792, 794, 796, 798 and 800 remained unchanged. The movement of the credit arm 316 from position fifty three to position fifty four caused additional rotation of cam shafts 814 and 844. At the end of that rotation, the stops on fingers 802, 804 and 806 remained out of openings 803, 805 and 807, the stop on finger 808 had moved out of opening 809, the stop on finger 810 remained in opening 811, and the positions of the stops on fingers 792, 794, 796, 798 and 800 continued without change. The movement of the credit arm 316 from position fifty four to fifty five caused still a further rotation of cam shafts 814 and 844. At the conclusion of that rotation, the stop on finger 802 had moved into opening 803, the stops on fingers 804, 806 and 808 remained out of the openings 805, 807 and 809, the stop on finger 810 remained in opening 811, the stop on finger 800 had moved out of opening 801, the stop on finger 798 had moved into opening 799, and the positions of the stops on finger 792, 794 and 796 remained unchanged. It should be clear from this that while the credit arm 316 was rotating from position fifty one to position fifty five, in response to the second quarter, the cam shafts 814 and 844 were simultaneously setting the change payout system to reflect the credits stored in excess of the sales price. Thus, although the change payout system is different from the credit-storing device, the credit-storing device becomes positively connected to the change payout system when the sales price is reached. Thereafter, as additional credits are established by the credit-storing device, corresponding payout credits are established in the change payout system. Specifically, the credit arm moved to reflect a credit, in excess of the sales price, of five cents; and the change payout system pre-set itself to pay out a nickel. Each step of the credit arm 316, beyond the sales price, caused the shaft 814 to rotate thirty six degrees and caused the shaft 844 to rotate fourteen degrees and twenty four minutes. Hence, at the conclusion of the rotation of shafts 84 and 844, the former had rotated one hundred and eighty degrees while the latter had rotated seventy two degrees.

When the credit arm 316 reached position forty nine, the electromagnet 414 was energized; and when that arm reached position fifty, the relay 886 was energized. As in any case where the sales price is reached, the escrow timer shaft was initially stepped by the solenoid 586 and was subsequently stepped by the connecting links 146 and 550. As the shaft 546 rotated, it caused the contactor 597 to engage contact segment 601, thereby energizing slenoids 628 and 864. The solenoid 628 moved the doors 686, 692 and 696 downwardly to direct the nickel to the hopper 706 and to direct the quarters to the cash box. The solenoid 864 moved the master stop 860 and permitted a nickel to roll into the returned coin passage 56 to be transmitted to the customer. In this way, the coin-handling device of the present invention accepted coins in excess of the purchase price but returned the exact amount of change to the customer, while also actuating the secondary device to effect vending of the desired product or service.

If the customer had inserted a penny and two quarters, the credit arm 316 would have stopped at position fifty one. The cam 856 would still be holding the stop on finger 800 in the opening 801 and the cam 818 would be holding the stop on finger 804 in opening 805, but the stop on finger 802 would be out of the opening 803. As a result, a penny would have been paid out when the solenoid 864 was energized. If two pennies and two quarters had been inserted, the cam 856 would still be holding the stop on finger 800 in opening 801, and cam 820 would be holding the stop on finger 806 in opening 807, but the stops on fingers 802 and 804 would be out of the openings 803 and 805. As a result, two pennies would have been paid out when the solenoid 864 was energized. If three pennies and two quarters had been inserted, the cam 856 would still be holding the stop on finger 800 in opening 801, and cam 822 would be holding the stop on finger 808 in opening 809 but the stop on fingers 802, 804 and 806 are out of the openings 803, 805 and 807. Hence, three pennies would have rolled out of the arm 754 when the solenoid 864 was energized. If the customer had deposited four pennies and two quarters, the cam 856 would still be holding the stop on finger 800 in opening 801 and cam 824 would be holding the stop on finger 810 in opening 811 but the stops on fingers 802, 804, 806 and 808 would be out of the openings 803, 805, 807 and 809. Hence four pennies would have rolled out of the arm 754 when the solenoid 864 was energized.

If the amount of change to be paid out was six cents, the cam 856 would permit the stop on finger 802 to move out of opening 801, and cam 816 would permit the stop on finger 802 to move out of opening 803, but cams 854 would hold the stop on finger 798 in opening 799 and cam 818 would hold the stop on finger 804 in opening 805. If the amount of change to be paid out was seven cents, the cam 854 would hold the stop on finger 798 in opening 799 and cam 820 would hold the stop on finger 806 in opening 807, but the stops on fingers 800, 802 and 804 would be out of the openings 801, 803 and 805. If the amount of change was to be eight cents, the stops on fingers 798 and 808 would be in openings 799 and 809, but the stops on fingers 800, 802, 804 and 806 would be out of the openings 801, 803, 805 and 807. If the amount of change was to be nine cents, the stops on fingers 798 and 810 would be in openings 799 and 811, but the stops on fingers 800, 802, 804, 806 and 808 would be out of openings 801, 803, 805, 807 and 809.

In the event the amount of change was to be 10 cents, the cam 852 would hold the stop on fingers 796 in opening 797 and cam 816 would hold the stop on finger 802 in opening 803, but the stops on fingers 800 and 798 would be out of the openings 801 and 799. Accordingly, when the payout solenoid 864 was energized two nickels would roll out of the arm 758 into the chute 56.

In setting up ten cents in change, the change system responded to four credits to successively set the cams 816, 818, 820 and 822 to pay out one, two, three or four pennies. The system responded to the fifth credit to remove the pre-set penny credits from the cam shaft 814, as by forcing the stop on finger 802 into opening 803, and to transfer those credits to the cam shaft 844, as by moving cam 586 to let the stop on finger 800 move out of opening 801 while moving the stop on finger 798 into opening 799. The said payout system then responded successively to the sixth, seventh, eighth and ninth credits to leave the stop 800 out of opening 801 while again setting the coins 816, 818, 820 and 822 to pay out one, two, three or four pennies. That system responded to the tenth credit by again removing the penny credits from the cam shaft 814 and transferring those credits to the cam shaft 844.

The change payout system can also respond to credits that are between ten and twenty four cents. Those credits will be established in the same way; as by setting all credits, that are between integral multiples of five, on the cam shaft 814 and then transferring those credits to the cam shaft 844 when an integral multiple of five is to be established.

In each case where change is to be paid out, the amount of change is determined by the rotation of the gear segment 368. Furthermore, the full amount of change to be paid out is pre-set before any change is actually paid out. This is desirable since it enables the payment of change to be effected with the absolute minimum number of coins. Since the change holding capacity of any coin-handling device is necessarily held down by commercial space limitations, this feature is important.

As the pawl 378 moved down to lock the gear segment 368 to the ratchet wheel 310, the pin 400 on that pawl moved down to a point where it could pass beneath the arcuate guide 402. That arcuate guide prevents separation of the free end of the pawl 378 from the ratchet wheel 310 and thus make certain that the ratchet wheel 310 can not return to its initial position before the gear segment 368 returns to its initial position.

When the pawls 376 or 378 move downwardly toward the ratchet wheel 310 before the sales price is reached, they anticipate the reaching of that price. Hence, when that price is reached, those pawls are ready for immediate locking of the ratchet wheel 310 and the gear segment 368.

The setting up of the change payout credits can take a fraction of a second or more depending upon the speed of the motor 162 and the number of credits to be set up. To provide sufficient time for the setting up of the full number of change payout credits, the actuation of the change payout solenoid 864 is delayed for a time after the sales price is reached. This delay is effected by making the "dead" segment 603 long enough for the initial step of escrow timer shaft 546, due to the energization of solenoid 586, will not move contactor 597 off that segment. That contactor will not move off of that "dead" segment and onto the segment 601 until the motor 162 has made a revolution and caused the links 146 and 550 to advance the shaft 546 another step. The time required to secure the two steps of shaft 546 is sufficient to set the full change payout credit of twenty four cents.

A second delay is provided, by using the "dead" segment 599; and that delay permits the doors 686, 692 and 696 of the escrow chambers to close before the doors 684, 690, and 698 of those chambers are opened by solenoid 634. That second delay is ample to secure the desired result.

The contactor 597 will reach the segment 602 and energize the solenoids 364 and 634. The solenoid 364 will move the pawl 358 and free the ratchet wheel 310 for movement to its initial position under the action of spring 354. The ratchet wheel will tend to drive the gear segment 368 and the change payout system to its initial position; and in most instances, that ratchet wheel will be successful in restoring the change payout system to its initial position. However, the present invention does not depend upon mere spring action to restore the change payout system to its normal position; instead, it provides a mechanism that positively assures the full return of the rack 422 and the cam shafts 814 and 844 to their initial positions. That mechanism consists of the lever 452, the outer periphery of the cam disc 130, the cam follower 456, the pivot 454, the pivot pin 458, the lever 446, the pivot pins 438 and 442, the lever 436, the slot 440, and the pin 434. The lever 464 normally occupies a generally vertical position, as shown in FIG. 9, wherein the pin 466 thereof loosely bears against the left hand edge of the lever 446. The lever 446 is normally biased for movement in a clockwise direction about the pin 438 to have the right hand side of the slot 448 bearing against the pin 458 on the lever 452. Hence, rotation of the lever 452 about the pivot 454 during rotation of the arm cam disc 130 will normally cause the pin 458 to move up and down in the elongated slot 448. That slot is long enough that no vertical motion will be transmitted to the lever 446 as long as the pin 458 is in the slot 448. However, when the coin return solenoid 634 is energized, as it is whenever contactor 597 engages segment 602, the connecting rod 618 moves downwardly and urges the pin 626 thereon against the inclined arm 472 of the lever 469. This will force that lever to move from the position shown by solid lines in FIG. 9 to the position shown by dotted lines in FIG. 9; and such movement will extend the spring 470. The increased force of the extended spring 470 will be applied to the arm on the lever 464, and will tend to bias that lever in a clockwise direction. If the pin 458 is in register with the short slot 450 of the lever 446, that lever will move and place the left hand side of the slot 450 against the pin 458. If the pin 458 is not, at that instant, in register with the short slot 450, further rotation of the cam disc 130 will rock the lever 452 in a clockwise direction until the pin 458 is in register with the slot 450; and thereupon the lever 446 will respond to the force exerted by the spring 470 to place the left hand edge of the slot 450 against the pin 458. Still further rotation of the cam disc 130 will cause the pin 458 to move upwardly into engagement with the upper end of the short slot 450, and will force the lever 446 upwardly; thereby rocking the L-shaped lever 436 about the pivot 442. The slot 440 will then coact with the pin 434 to drive the double rack 422 all the way back to its original position. The full seating of the double rack 422 assures the customers that they will receive the right amount of change on each and every cycle of the secondary device. It also assures the operator of the secondary device that an excess of change will not be paid out.

The guide 402 will hold the pin 400 of the pawl 378 against separation from the teeth of the ratchet wheel 310 until after the gear segment 368 has returned to a position closely adjacent its initial position. This keeps the spring 354 from rotating the ratchet wheel 310 back to its initial position at a time when the change payout system has not returned to its initial position. This is important since the positive returning movement of the gear segment 368, afforded by cam disc 130, cam follower 456, lever 452, pin 458, lever 446, levers 464 and 469, lever 436, and double rack 422 could lead to breakage of parts if the ratchet wheel 310 had reached its initial position before the gear segment 368 reached its initial position. By holding the pin 400 under the guide 402, the present invention forces the pawl 378 to remain in engagement with the ratchet wheel 310 until the gear segment 368 reaches a point adjacent its initial position; and that engagement enables the returning movement of the ratchet wheel 319 to force a conjoint returning movement of the gear segment 368. The ratchet wheel 310 and gear segment 638 will thus move in unison until the gear segment carries the pin 400 on pawl 378 out from under guide 402; whereupon the ratchet wheel can move freely to its initial position.

A pin, similar to pin 400 on pawl 378, is not needed on pawl 376 even though the electro-magnet 406, rather than the electro-magnet 414, may be energized. Once either of the pawls 376 or 378 has been released and has seated itself against the root of a tooth of ratchet wheel 310, further movement of that ratchet wheel will carry gear segment 368 and both of the pawls away from the armatures 408 and 416 of the electro-magnets 406 and 414. Thereupon, the remaining pawl will respond to the pull of the spring attached to it to move down into engagement with the ratchet wheel 310. Hence, even if the pawl 367, rather than the pawl 368, is released, the pawl 378 will move downwardly as the gear segment 368 is moved; and the pin on that latter pawl will pass under the guide 402 and positively lock the gear segment 368 to the ratchet wheel 310. In this way, a full return of the change payout system can be assured without any danger to the parts of the coin-handling device of the present invention.

As the ratchet wheel 310 approaches its initial position, the pin 398 therein will strike the lower end of the lever 392 and rotate that lever about the pivot pin 374 until the upper end of that lever engages and moves the upper ends of the pawls 376 and 378. Such movement will place the upper ends of those pawls in engagement with the hook ends of the armatures 408 and 416 of the electro-magnets 406 and 414. Those armatures will be in the positions shown in FIG. 9 because those electro-magnets were deenergized when the contactors 594 and 596 of the escrow timer moved, and hence those armatures will be able to receive and hold the upper ends of the pawls 376 and 378. At such time, the free ends of those pawls will be held above and out of engagement with the teeth of the ratchet wheel 310.

During the rack-returning operation, the solenoid 364 was kept energized by the engagement of contactor 597 with segment 602. That energization is important since it kept the pawl 358 away from ratchet wheel 308, thereby permitting the sleeve 304 to rotate with the gear segment 384. In this way the credit-storing device was permitted to return to its initial position.

The provision of the two electro-magnets 406 and 414 and of the two pawls 376 and 378 is very important. These electro-magnets and pawls anticipate the movement of the credit arm 316 to a position corresponding to the sales price; and they avoid any delays, in establishing of the interlock between the credit-storing device and the change payout system, that might tend to prevent the establishment of proper change payout credits.

If electrical apparatus and mechanical apparatus could operate without the time limitations imposed by mechanical inertia and electrical impedance it would be possible, theoretically, to attain completely instantaneous inter-engagement of a pawl and ratchet wheel. Similarly, if machined parts could be made absolutely identical and if they could be brought into, and permanently held in, precisely registered assembly, it would be possible, theoretically, to attain movement of a pawl into engagement with the same identical portion of the teeth of the ratchet wheel on each actuation of that pawl. However the seemingly short delays occasioned by mechanical inertia and electrical impedance are material delays when the peripheral speed of the ratchet wheel 310 is high, as it must be; and those delays are inevitable and unavoidable. Similarly, variations must and do exist between machined parts; and variations exist in assemblies of machined parts. Consequently it is not practical to use just one pawl and one electro-magnet to interlock the ratchet wheel 310 with gear segment 368. However, the use of two pawls, as taught by the present invention, provides ample time for the pawls to engage and solidly seat against the teeth of the ratchet wheel.

One of the two electro-magnets is set to respond to actuations based on odd numbered sales prices while the other is set to respond to actuations based on even numbered sales prices. This relationship is established by the wiring of the coin-handling device; and it merely requires that the vend switches connected to the electro-magnet 406 be identified and kept separate from the vend switches connected to the electro-magnet 414. This can easily be effected by proper coloring of the leads from the electro-magnets 406 and 414.

In the preferred embodiment shown, the electro-magnet 406 responds to odd numbered sales prices while the electro-magnet 414 responds to even numbered sales prices. Hence vend switch 894, which can establish sales prices of thirteen cents and a dollar and thirteen cents, is connected to electro-magnet 406. Similarly, vent switch 890 which can establish sales prices of twenty five cents and three dollars and twenty five cents is connected to that same electro-magnet. On the other hand, vent switch 336 which can establish sales prices of fifty cents and two dollars and fifty cents is connected to electro-magnet 414. Similarly, vent switch 892, which can establish sales prices of sixty two cents and four dollars and sixty two cents, is connected to electro-magnet 414. If the vent switch 894 were to be used to establish an even-numbered sales price, the leads from electro-magnet 406 would be disconnected; and additional leads, not shown, from the electro-magnet 414 would be connected to that switch. While only a limited number of leads have been shown in the drawing, a large number of leads can be used. Those leads will be connected to terminal blocks or strips, not shown, to facilitate the ready changing of sales prices. Thus, the single leads from the segments 507, 505, 501 and 500 will have terminal strips or blocks intermediate their ends, so that a number of vend switches can be simultaneously connected to those segments.

In any change-making cycle of the coin-handling device provided by the present invention, one or more coins will roll out of the arms 754 or 758 of the coin passages defined by the channel-shaped elements 750 and 748. Those coins are replenished at the end of each cycle of the coin-handling device. An initial supply of pennies and nickels will be placed in the coin-aligning hoppers 704 and 706 before the secondary device is set up at a location; and that initial supply will be augmented during each complete cycle wherein the customer inserts pennies and nickels. Those nickels and pennies will be directed to the coin pockets 120 and 122 of the coin wheel 118, and they will then be dropped into the escrow chambers 672 and 688. When the escrow timer energizes the solenoid 628, the pennies and nickels will fall into the hoppers 704 and 706. The plates 708 and 712 of those hoppers will move up and down alternately, the plates 708 moving up when the plates 712 move down; and they will do so whenever the motor 162 is rotating. The alternate rise and fall of those plates will agitate the pennies and nickels and will cause them to move into face-to-face engagement with the wall 676. The presence of the projections on the upper edges of the plates 708 and the varied-length fingers 711 on the plates 712 are particualrly helpful in securing such movement of those coins.

When the nickels and pennies reach the wall 676 in face-to-face relation, they will drop down and rest upon the runways 710. The coins will then roll along the runways 710 and present themselves to the openings in the hoppers 704 and 706 that communicate with the arms 756 and 752 of the channel-shaped elements 748 and 750. If the arms 752 and 756 are filled with coins, the coins that rolled along the runways will continue to remain in position in those runways, rising and falling with those runways. However, if the arms 752 and 756 are not filled with coins, the coins in the runways will roll into those arms. In this way, the pennies and nickels of the initial supply, and the augmental pennies and nickels are aligned and introduced into the arms 752 and 756 of the passages defined by the channel-shaped elements 750 and 748.

Whenever the levels of the coins in the arms 752 and 756 are above the levels of the pins 766 on the levers 764, the coins in those arms will hold those pins at the outer ends of the slot 760. However, those pins could apply impeding forces to the coins that tended to move downwardly through the arms 752 and 756 and thereby impede that movement. Any such impeding forces are relieved at least once during a cycle of the coin-handling device; that relief coming when the contactor 595 of the escrow timer moves into engagement with the segment 604 to energize the credit-disconnect relay 224. As the armature 222 of that relay moves upwardly it will raise pin 220, lever 206, pin 233 and rod 234 upwardly; and the raising of that rod will rotate the lever 772 into engagement with the upper ends of levers 764. Thereupon those levers will move the pins 766 thereof to the extreme outer ends of the slot 760, thereby relieving the coins in arms 752 and 756 of any impeding forces. Hence those coins will be free to move downwardly into the arms 754 and 758, unless those arms are already filled with coins.

In the event one or more coins has been paid out during a cycle of the coin-handling device of the present invention, the replacement pennies and nickels will not immediately roll to the lower ends of the arms 754 and 758 because the cams 810 and 848 will hold the stops on fingers 810 and 792 in openings 811 and 793. However, after the double rack 422 has been driven back to its initial position, and thus restored the cam shaft 814 and 844 to the positions shown by FIGS. 21–25, those coins will be able to roll to the lower ends of the arms 754 and 758 because the stops on fingers 792, 794, 796, 798, 804, 806, 808 and 810 will be held out of the openings 793, 795, 797, 799, 805, 807, 809 and 811. Those coins will not be able to roll out of the lower ends of the arms 754 and 758 because the cams 816 and 856 will be holding the stops on fingers 802 and 800 in the openings 803 and 801. Furthermore the master stop 860 will be blocking the lower ends of those arms.

The credit disconnect relay 224 will remain energized until the contactor 595 moves off of the segment 604 and moves onto the "dead" segment 605. Before this happens, the cam shafts 814 and 844 will have returned to the positions shown in FIGS. 21–25; and hence the coins in the arms 752 and 758 can move downwardly, without interference by pins 766, to replace the coins that were paid out as change.

If the level of the nickels or pennies, or both, falls below the level of the pins 766 on the levers 764, either or both of the levers 764 will move and place those pins adjacent the inner end of the arcuate slot 760. Simultaneously, the upper ends of one of the other or both of the levers 764 will engage the actuator 782 of the switch 780. That engagement will close a circuit from the conductor 920 through the "use correct change" lamp 910 to the conductor 922. Thereupon the lamp 910 will become illuminated and will advise the customer that only coinage in the exact amount of the sales price should be inserted. However, after a few additional sales have been made on the basis of coinage exactly matching the sales price, there should be enough pennies and nickels in the arms 752 and 758 to hold the pins 766 at the outer end of the slot 760. Those pennies and nickels would, successively, have entered the escrow chambers, passed to the hoppers 704 and 706, been aligned by the plates 708, and rolled along the runways 710 to the upper ends of the arms 752 and 758.

As long as the credit disconnect solenoid is energized, the pins 766 are not free to "feel" for the presence of coins in the arms 752 and 756. Only after that solenoid has been de-energized can those pins serve that function. However, this is desirable since it prevents any intermittent energization of the lamp 910 that might occur if the pins 766 could move into the arms 752 and 758 as coins were moving down through those arms. Any such intermittent energization of the lamp 910 would be objectionable since it would not truly indicate the conditions within the coin-handling device. When the cycle of the coin-handling device is finished, however, the pins 766 will be free to "feel" for the presence of coins; and this is desirable since the customer can then know what coinage is needed to initiate and carry through the next cycle.

The escrow timer is made so contactors 594 and 596 provide prompt de-energization of the electro-magnets 48 and 884, is made so the "dead" segment 603 assures sufficient time for all change payout credits to be established before the master stop 860 is rotated to unblocking position, is made so the segment 601 holds the doors 686, 692 and 696 open and holds the master stop 860 in raised position until all of the coins in the escrow chambers slide out and until the proper change rolls out, is made so the segment 602 holds the rod 618 down and keeps the pawl 358 away from ratchet wheel 308 until the rack-resetting operation is finished, and holds the levers 764 in coin-freeing position until after the cam shafts 814 and 844 regain their initial positions. In this way, the esscrow timer makes certain that each phase of the operation of the coin-handling device that occurs after the sales price is reached, has sufficient time to be completed successfully. Yet, that total time need only be a matter of seconds.

The coin-handling device of the present invention has a second credit-storing device; and that device includes the armature 494, contactors 502 and 509, pigtail 511, contact ring 498, and the arcuate contact segments 499, 507, 505, 501 and 500. The contact segment 499 represents sales prices between zero and ninety nine cents, the contact segment 507 represents the range from one dollar to one dollar and ninety nine cents, the contact segment 505 represents the range from two dollars to two dollars and ninety nine cents, the contact segment 501 represents the range from three dollars to three dollars and ninety nine cents, and the contact segment 500 represents the range from four dollars to four dollars and ninety nine cents. If desired, the overall range could be extended by adding more segments. The armature 494 will be driven by the Geneva gear 480; and that gear will respond to movement of the pin 474 on the ratchet wheel 310. The armature 494 will have periods of movement and periods of rest; and it will require five revolutions of the credit arm 316 to turn that armature through one revolution.

When the coin-handling device is at rest, the credit arm 316 is at position zero and the contactor 509 is on contact 499. The contactor will remain in contact 499 until such time as the credit arm 316 passes position ninety nine and moves to the zero position; that position, at that time, corresponding to one dollar. When the credit arm 316 was at position ninety nine, the contactor 509 was in contact segment 499; but when that credit arm reached position zero, that contactor was on contact segment 507.

Although the spacing between positions ninety nine and zero is not great, the Geneva gear 480 effected the required advancement of contactor 509 while the credit arm made the advancement of that one unit.

The contactor 509 will remain in engagement with the contact segment 507 until the credit arm 316 nears the end of a second revolution. When that arm is at position ninety nine, which corresponds to one dollar and ninety nine cents, contactor 509 will be resting on contact segment 507; but when that arm is at position zero, which corresponds to two dollars, the contactor 509 will engage contact segment 505. The contactor 509 remains in engagement with the segment 505 until the credit arm 316 approaches the end of its third revolution. When that credit arm is at position ninety nine, which corresponds to two dollars and ninety nine cents, contactor 509 will still be on segment 505; but when that arm is at position zero, corresponding to three dollars, the contactor 509 will be in engagement with segment 501. That contactor will remain on segment 501 until the credit arm 316 nears the end of its fourth revolution. When that arm is in position ninety nine, which will correspond to three dollars and ninety nine cents, the contactor 509 will still be on segment 501; but when that arm is at position zero, which corresponds to four dollars, the contactor 509 will be in engagement with contact 500. The contactor 509 will remain in engagement with the contact segment 500 until the stop 482 on the gear 480 engages the stop pin 484. This description of the movement of contactor 509 was based on the depositing of coinage exceeding four dollars; but that contactor can respond to coinage of lesser value to come to rest on any one of the segments 499, 507, 505 or 501.

The Geneva gear 480 will provide positive, precisely-timed stepping of the armature 494 in the credit-storing and in the credit-removing directions. This positive drive of the armature 494 is important, and it is assured by the interrelationship of the pin 474 on the ratchet wheel 310 and the slots in the Geneva gear 480.

It will be noted that either segment 499 or segment 507 can be connected to switch 894 by section 899B of selector switch 898. When segment 499 is connected to the switch 894, the movable contact of section 899A of switch 898 will be connected to the uppermost fixed contact of that section, while the movable contact of section 899C of switch 898 will be connected to the uppermost fixed contact of that section. This means that the article to be dispensed by the uppermost vending device 914 has a sales price of thirteen cents. If there is an ample supply of those articles, the right hand switch 916 will stay in the position shown; but if that supply is not adequate, that switch would illuminate the "empty" lamp 918.

When segement 507 is connected to the switch 894, the movable contact of section 899A of switch 898 will be connected to the fifth uppermost fixed contact of that section, while the movable contact of section 899C of switch 898 will be connected to the fifth uppermost fixed contact of that section. This means that the article to be dispensed by the fifth uppermost vending device 914 has a sales price of one dollar and thirteen cents. If there is an ample supply of those articles, the "empty" light will be kept dark by the appropriate switch 916.

In similar fashion, section 899B of selector switch 898 can enable switch 890 to establish a sales price of twenty-five cents or three dollars and twenty five cents. That section can enable switch 336 to establish a sales price of fifty cents or two dollars and fifty cents. That section can also enable switch 892 to establish a sales price of sixty two cents or four dollars and sixty two cents.

The switches 336, 890, 892 and 894 could also be moved about on the support 328 to vary the sales prices while keeping them within the same dollar range. Thus the switch 336 could be moved to any even numbered position on support 328 to provide even purchase prices from two cents to ninety eight cents and from two dollars to two dollars and ninety eight cents. The switch 894 could be moved about on the support 328 to provide odd sales prices from one cent to ninety nine cents and from one dollar and one cent to one dollar and ninety nine cents. The four switches 336, 890, 892 and 894 are merely representative; and in practice a larger number of switches will be provided. This will enable the operator to select any one of a number of different sales prices in the various ranges. The leads extending to the projecting terminals of the vend switches are preferably provided with ferrules so they can be readily slipped onto or off of those terminals. Such an arrangement facilitates ready changing of the sales prices.

In actual practice the operators will not set any of the vend switches to establish a sales price of less than three cents. The net returns on such sales would not warrant the stocking of such products by the secondary device; and coinage of the exact value would have to be deposited to effect those sales since the pawls 376 and 378 can not be released by the lever 398 until the credit arm 316 has moved to position two.

When section 899B of the selector switch 898 is set in its sixth uppermost position, the credit arm 316 must make two and one half revolutions before the electro-magnet 414 and relay 886 are energized. During each of the first and second revolutions of that credit arm, the movable contact of switch 336 will be forced down against the lower fixed contact and then released for return to the fixed upper contact; but no current will flow through that switch because section 899B of selector switch 898 is not connecting that switch to segment 499 or 507 of the second credit-storing device. However, when the credit arm reaches position forty nine, during its third revolution, a circuit will be established that extends from conductor 920, through delivery switch 902, through contact 598, through contactor 596 and pigtail 589 and contactor 594, through contact 607, through contacts 897D, through contact ring 498, through contactor 502 and pigtail 511 and contactor 509, through contact segment 505, through the movable contact and the sixth uppermost fixed contact of section 899B of switch 898, through the movable contact and lower fixed contact of switch 336, and through electro-magnet 414 to the conductor 922. When the credit arm reaches position fifty, a generally similar circuit will energize the relay 886. Thereafter the standard sequence of vending operations and change making operations will be initiated and carried out.

Whenever the credit arm 316 makes more than one revolution, the pin 398 on the ratchet wheel 310 will engage and move the bottom of the lever 392. That engagement and movement of the bottom of the lever 392 will occur during both the clockwise and counter clockwise rotations of the ratchet wheel 310. However, such engagement and movement is acceptable because the lever 392 is pivoted to the gear segment 368 in such a way that it can move it in either direction about that pivot. Furthermore, the spring 396 is so mounted that it will not be caught and held by the pin 398. Hence, the pin 398 can apply the desired degree of movement to the lever 392 when the gear segment 368 and the ratchet wheel 310 are in their initial positions, but that pin can freely move past the lever 392 at all times.

In the operation of a secondary device, incorporating the coin-handling device of the present invention, the selector switch is moved to select the desired article; and simultaneously the circuit through the appropriate empty switch 916 is established, the circuit to the corresponding vend switch is pre-set, and the circuit for the corresponding vending device 914 is pre-set. Coinage is then inserted, and credits corresponding to that coinage are established and stored. Until the sales price is reached the coinage is held in escrow chambers at the will of the customer. Once the sales price is reached, the product or service is delivered, the coinage is directed to the cash box or to the coin-aligning hoppers, change is paid out if the stored credits exceeded the sales price, and the secondary device then completes its cycle and readies itself for another transaction.

While the customer can retrieve his money at any time prior to the instant the credit arm reaches the sales price position, as by pushing the switch 904, the customer can not thereafter retrieve that mony. Such an arrangement is necessary to protect the operator of the secondary device from delivering the goods or services and also returning the customer's money. The coin-handling device provides this needed protection for the operator of the secondary device by having the relay 886 open its contacts 888C the instant the credit arm 316 reaches the sales price position. Those contacts will thus disconnect the coin return relay 906 from the coin return switch 904; and the closing of switch 904 will be unable to energize relay 906. The relay 886 will also energize the escrow timer solenoid 586, as by closing the contacts 888B; and thereupon the contactors 594 and 596 will move and disconnect the switch 904 from conductor 920. That switch will not again be connected to conductor 920 until the escrow timer has completed its cycle; and by that time the deposited coins will have been directed to the cash box or the coin-aligning hoppers. Moreover, by the time the escrow timer has completed its cycle, the credit arm 316 will have placed its L-shaped plate 318 against the actuator of switch 322. Thereupon the solenoid 900 would be de-energized and the contacts 901 would have opened. Hence the customer can not obtain his money's worth and his money too.

The support 328 of FIGS. 1, 3, 4 and 14 will preferably be machined from a stiff dielectric material such as fibre or the like. Where this is done, the dimensions of that support can be held within close limits.

The fingers 792, 794, 798, 800, 802, 804, 806, 808 and 810 are very useful and desirable. Their length provides a desirable multiplication of the rises of the cams, and their flexibility obviates the need of precise machining of the cams. However, if desired, those fingers could be replaced by rods that have their axes co-axial with the axes of the openings 793, 795, 797, 799, 801, 803, 805, 807, 809 and 811. Those rods would be held by sleeves that permitted the rods to reciprocate, and they would have helical compression springs surrounding them to bias their ends out of those openings. Those rods would be moved by the cams 816, 818, 820, 822, 824, 848, 850, 852, 854 and 856; the cam shafts 814 and 844 being moved up into register with the arms 754 and 758. The use of the rods does make it possible to further reduce the overall height of the coin-handling device.

The coin-handling device of the present invention protects the operator of the secondary device against losses due to "jack-potting." If, through abuse or faulty maintenance, the actuator of one of the vend switches were to become stuck in its upper or lower positions, the secondary device would not continue to run and vend the products or services controlled by that switch. Instead, that device would merely be rendered temporarily unable to vend that particular product or service; because the movable contacts of the various vend switches must engage both their lower and upper contacts before they can initiate a vending cycle. However, the temporary incapacity of that one switch will not keep the secondary device from vending other products and services. Furthermore, it will not cause the customer to lose any money; that money being recoverable by a closing of the switch 904.

The use of two levers 238 and 242 and of two sets of camming surfaces is particularly desirable because it avoids the use of a large cam, it minimizes the starting and driving torque required, and it enables the quarter pocket and the quarter camming surface to be set away from the pockets and camming surfaces of the other coins. This latter feature is highly desirable since the quarter camming surface moves the rack 286 much further than the dime moves that rack; and therefore the rack 286 will need as much time as possible to effect its return after it has been moved by the quarter camming surface.

To prevent any interference between the penny and nickel racks 294 and the dime and quarter racks 286, both of those racks are normally disposed below and out of engagement with the ratchet wheels 306 and 308. As a result, each camming surface has a first portion of its rise that is dedicated to moving the rack up into engagement with the ratchet wheel, and has a second portion that is dedicated to rotating that ratchet wheel. The first portions of the camming surfaces will all have the same radial dimension, but the second portions of those camming surfaces will be different. The second portion of camming surface 134 will be five times, the second portion of camming surface 136 will be ten times, and the second portion of camming surface 138 will be twenty five times the radial dimensions of the second portion of the camming surface 132.

The empty switches 916 selectively connect the "empty" lamp 918 or the parallel-connected electro-magnets 48 and 884 to the conductor 920. This is very desirable since the minute one of those switches indicates the supply of a product or service is exhausted, the fingers 880 will move to block the further acceptance of nickels, dimes and quarters, and the arm 46 will move to prevent the further acceptance of pennies. It should also be noted that each product or service has its own empty switch 916; and that if the supply of some products or services is exhausted, the secondary device can still vend its remaining products and services.

The coin-responsive levers 164 and 176 transmit forces to the levers 242 and 238 by the pins 200 and 216. Those pins can engage and move the inclined surfaces 244 and 240 on those levers, but they can also move away from those surfaces. This arrangement is desirable because it provides a lost-motion connection between the levers 164 and 176 and the levers 242 and 238. As a result, the levers 164 and 176 are able to return to their positions immediately adjacent the coin wheel 118 even though the levers 242 and 238 are held by the camming surfaces on cam disc 130. The returning movement of the levers 164 and 176 is desirable since the rollers 168 and 180 on those levers will coact with the plate 108 to keep coins from slipping past without being accredited.

Since the cash box solenoid 628 and the change payout solenoid 864 are connected in parallel, and since the lower end of rod 608 is not too far from the master stop 860, it would be possible to mechanically connect that rod and stop and thereby eliminate the solenoid 864. However, the use of that solenoid makes assembly of the coin-handling device quite straight-forward and simple; and therefore that solenoid is shown in that drawing.

The coin-handling device of the present invention could, if desired, be made so it would accept coins of fewer denominations or could accept coins of more denominations. For example, it would be possible to make a smaller version of the coin-handling device of the present invention by eliminating the pocket 126 for the quarter and by eliminating the camming surface 138 which corresponds to the quarter pocket 126. Where this was done, the coin-handling device of the present invention would operate as described above in connection with the insertion of pennies, nickels and dimes. It would also be possible to expand the coin-handling device of the present invention by providing a pocket for fifty cent pieces and for one dollar pieces. Where this was done, an additional cam disc would be provided that had a camming surface corresponding to the fifty cent piece and had another camming surface corresponding to the one dollar piece. An additional lever similar to the levers 238 and 242 would be provided, an elongated bar similar to the elongated bars 262 and 273 would be provided, and a rack that was similar to but longer than racks 286 and 294 would be provided. In addition, a ratchet wheel similar to the ratchet wheels 306 and 308 would be provided. When modified in this latter manner, the coin-handling device of the present invention could aggregate substantial sales prices quickly with just a few coins.

It would also be possible to modify the coin-handling device of the present invention by adding a change payout system where quarters would be paid out. This would be desirable if that device was modified to accept half-dollars and silver dollars. In such a modification, the quarters would be directed to an escrow chamber comparable to the escrow chambers 672 and 688 and would be held separately from the dimes, half-dollars and dollars. The quarters would pass to a coin-aligning hopper that would align and orient them and direct them into a coin passage similar to those defined by the channel-shaped members 748 and 750. Cams and fingers would be mounted adjacent that passage, and those cams would be mounted on a shaft that was geared to the cam shafts 814 and 844. As the penny credits are transferred to the nickel shaft in the preferred embodiment of the present invention, the nickel credits would be transferred to the quarter shaft in the modified embodiment.

The stops on the fingers 792, 794, 796, 798, 800, 802, 804, 806, 808 and 810 will normally not engage the coins in the arms 754 and 758 even when those stops are in those arms. Instead, those stops will lodge in cusp-like openings between the contiguous coins; and the lowermost coin in each arm will bear against, and be held by, the master stop 860. Hence the stops can freely enter and leave the openings 793, 795, 797, 799, 801, 803, 805, 807, 809 and 811. Only after coins have been paid out will the remaining coins bear against the stops on the fingers. The unblocking movement of that master stop enables the coins to start toward the outlets of the arms, and the stops of the fingers hold back those coins that are not to be paid out.

The long dwell on the cam 848 keeps nickels from entering the lower part of the arm 758 after a nickel payout and before the shaft 844 has fully returned to its initial position. Similarly, the long dwell on the cam 824 substantially keeps pennies from entering the lower part of the arm 754 after a penny payout and before the shaft 814 has fully returned to its initial position. This virtually keeps replenishing coins from entering the lower parts of those arms and being struck by the stops on the fingers. While the flexible nature of those fingers would prevent a breakage of parts even if the stops in those fingers engaged those coins, it is desirable to minimize or obviate any such engagement.

The solenoid 224 remains energized through the change payout cycle, and it holds the switch 780 open during that cycle. This is very desirable since it will prevent flashing of the "use correct change" lamp 910 as replenishing coins move downwardly in the arms 752 and 756. Hence the only time the switch 780 can test for the coin level in the arms 752 and 756 is when the coins thereon are at rest.

Whereas several preferred embodiments of the present invention have been shown or described in the drawing and accompanying description, it should be apparent to those skilled in the art that various changes may be made in the form of the invention without affecting the scope thereof.

What we claim is:

1. A coin-operated device that can respond to the insertion of coins, of the same or different denominations, totaling a predetermined value to actuate a secondary device and that has a coin carrier with a pair of coin-receiving pockets therein, said coin-receiving pockets being spaced apart, a pair of camming surfaces, said camming surfaces being spaced apart but having portions thereon that are coextensive and that move in the same path, said camming surfaces being spaced away from said coin carrier, a cam follower that can be selectively moved into said path to intercept that said portion of one of said camming surfaces and that can thereafter respond to the said one camming surface to actuate a credit-storing mechanism to a predetermined extent and that can be selectively moved into said path to intercept the said portion of the other of said camming surfaces and that can thereafter respond to said other camming surface to actuate said credit-storing mechanism to a different extent, said cam follower being spaced wholly away from and not engaging said coin carrier, a linkage that responds to the presence of a coin in either of said coin-receiving pockets to move said cam follower into said path, and a positive mechanical connection between said coin carrier and said camming surfaces that maintains a predetermined space relationship between the said coin-receiving pockets and said camming surfaces, whereby the presence of a coin in one of said coin-receiving pockets will cause said linkage to move said cam follower into said path immediately in front of the said one camming surface while the presence of a coin in the other of said coin-receiving pockets will cause said linkage to move said cam follower into said path immediately in front of said other camming surface.

2. A coin-operated device that can respond to the insertion of coins, of the same or different denominations, totaling a predetermined value to actuate a secondary device and that has a coin carrier with a pair of coin-receiving pockets therein, said coin-receiving pockets being spaced apart, a pair of camming surfaces thereon, said camming surfaces being spaced apart but having portions thereon that are coextensive and that move in the same path, said camming surfaces being spaced away from said coin carrier, a cam follower that can be selectively moved into said path to intercept the said portion of one of said camming surfaces and that can thereafter respond to the said one camming surface to actuate a credit-storing mechanism to a predetermined extent and that can be selectively moved into said path to intercept the said portion of the other of said camming surfaces and that can thereafter respond to said other camming surface to actuate said credit-storing mechanism to a different extent, said cam follower being spaced wholly away from and not engaging said coin carrier, a linkage that responds to the presence of a coin in either of said coin-receiving pockets to move said cam follower into said path, and a positive mechanical connection between said coin carrier and said camming surfaces that maintains a predetermined space relationship between the said coin-receiving pockets and said camming surfaces, whereby the presence of a coin in one of said coin-receiving pockets will cause said linkage to move said cam follower into said path immediately in front of the said one camming surface while the presence of a coin in the other of said coin-receiving pockets will cause said linkage to move said cam follower into said path immediately in front of said other camming surface, said coin carrier being a cylindrical drum wherein said coin-receiving pockets are spaced apart both in axial and circumferential directions, said camming surfaces being on a cam disc, said positive mechanical connection including a shaft on which said coin carrier and said cam disc are mounted.

3. A coin-operated device that can respond to the insertion of coins, of the same or different denominations, totaling a predetermined value to actuate a secondary device and that has a coin carrier with a pair of coin-receiving pockets therein, said coin-receiving pockets being spaced apart, a pair of camming surfaces, said camming surfaces being spaced apart but having portions thereon that are coextensive and that move in the same path, said camming surfaces being spaced away from said coin carrier, a cam follower that can be selectively moved into said path to intercept the said portion of one of said camming surfaces and that can thereafter respond to the said one camming surface to actuate a credit-storing mechanism to a predetermined extent and that can be selectively moved into said path to intercept the said portion of the other of said camming surfaces and that can thereafter respond to said other camming surface to actuate said credit-storing mechanism to a different extent, said cam follower being spaced wholly away from and not engaging said coin carrier, a linkage that responds to the presence of a coin in either of said coin-receiving pockets to move said cam follower into said path, and a positive mechanical connection between said coin carrier and said camming surfaces that maintains a predetermined space relationship between the said coin-receiving pockets and said camming surfaces, whereby the presence of a coin in one of said coin-receiving pockets will cause said linkage to move said cam follower into said path immediately in front of the said one camming surface while the presence of a coin in the other of said coin-receiving pockets will cause said linkage to move said cam follower into said path immediately in front of said other camming surface, said credit-storing mechanism including a lever which has the said cam follower mounted thereon intermediate the ends thereof, said camming surfaces having different effective camming actions.

4. A coin-operated device that can respond to the insertion of coins, of the same or different denominations, totaling a predetermined value to actuate a secondary device and that has a coin carrier with a pair of coin-receiving pockets therein, said coin-receiving pockets being spaced apart, a pair of camming surfaces thereon, said camming surfaces being spaced apart but having portions thereon that are coextensive and that move in the same path, said camming surfaces being spaced away from said coin carrier, a cam follower that can be selectively moved into said path to intercept the said portion of one of said camming surfaces and that can thereafter respond to the said one camming surface to actuate a credit-storing mechanism to a predetermined extent and that can be selectively moved into said path to intercept the said portion of the other of said camming surfaces and that can thereafter respond to said other camming surface to actuate said credit-storing mechanism to a different extent, said cam follower being spaced wholly away from and not engaging said coin carrier, a linkage that responds to the presence of a coin in either of said coin-receiving pockets to move said cam follower into said path, and a positive mechanical connection between said coin carrier and said camming surface that maintains a predetermined space relationship between the said coin-receiving pockets and said camming surfaces, whereby the presence of a coin in one of said coin-receiving pockets will cause said linkage to move said cam follower into said path immediately in front of the said one camming surface while the presence of a coin in the other of said coin-receiving pockets will cause said linkage to move said cam follower into said path immediately in front of said other camming surface, said linkage including a coin-responsive element that is registerable with both of said coin-receiving pockets, including a lever that carries said cam follower, and including a lost motion connection between said coin-responsive element and said lever, whereby said coin-responsive element can return to its initial position although the said lever and said cam follower are held against return to their initial position by the said one or said other camming surface.

5. A coin-operated device that can respond to the insertion of coins, of the same or different denominations, totaling a predetermined value to actuate a secondary device and that has a coin carrier with a plurality of coin-receiving pockets therein, said pockets being spaced apart, a plurality of coin passages that have their outlets adjacent said coin carrier, a stop that is elongated and that extends along said coin carrier and that extends through said coin passages and that is selectively movable relative to said coin passages, to hold coins within said coin passages or to free said coins for movement from said coin passages to said coin carrier, a coin-actuated switch that responds to the insertion of a coin to start said coin carrier rotating, a coin-actuated movable element that is mounted adjacent one of said pockets and that is movable by a coin in said one pocket, a second coin-actuated movable element that is mounted adjacent another of said pockets and that is movable by a cam in said other pocket, said coin-actuated movable elements being movable independently of each other, and an actuator that moves with said coin carrier and that selectively moves said stop to coin-freeing position, said actuator being so positioned relative to said coin-receiving pockets that said actuator moves said stop to coin-freeing position only when the trailing edges of said coin-receiving pockets are spaced from said coin passages, said coin carrier being a cylindrical drum wherein said coin-receiving pockets are spaced apart both in axial and circumferential directions, said actuator being a cam at one end of said cylindrical drum, said coin-actuated switch responding to an inserted coin to start said coin carrier rotating, said stop holding said coin against movement into engagement with said coin carrier until said actuator moves said stop to coin-freeing position.

6. A coin-operated device that can respond to the insertion of coins, of the same or different denominations, totaling a predetermined value to actuate a secondary device and that has a coin carrier with a plurality of coin-receiving pockets therein, said pockets being spaced apart, a plurality of coin passages that have their outlets adjacent said coin carrier, a stop that is elongated and that extends along said coin carrier and that extends through said coin passages and that is selectively movable relative to said coin passages, to hold coins within said coin passages or to free said coins for movement from said coin passages to said coin carrier, a switch, an actuator for said switch that extends through said coin passages and that intercepts and is moved by coins in each of said coin passages, and an actuator that moves with said coin carrier and that selectively moves said stop to coin-freeing position, said actuator being so positioned relative to said coin-receiving pockets that said actuator moves said stop to coin-freeing position only when the trailing edges of said coin-receiving pockets are spaced from said coin passages, said stop moving toward and away from said switch actuator, said stop and said switch actuator coacting to intercept coins in said coin passageway whenever said stop is in coin-holding position, said switch actuator being so positioned relative to said stop that coins move said switch actuator to switch-actuating position before the said coins are held by said stop.

7. A coin-operated device that can respond to the insertion of coins, of the same or different denominations, totaling a predetermined value to actuate a secondary device and that has a coin carrier with a pair of coin-receiving pockets therein, said coin-receiving pockets being spaced apart, a pair of camming surfaces, said camming surfaces being spaced apart but having portions thereon that are coextensive and that move in the same path, said camming surfaces being spaced away from said coin carrier, a cam follower that can be selectively moved into said path to intercept the said portion of one of said camming surfaces and that can thereafter respond to the said one camming surface to actuate a credit-storing mechanism to a predetermined extent and that can be selectively moved into said path to intercept the said portion of the other of said camming surfaces and that can thereafter respond to said other camming surface to actuate said credit-storing mechanism to a different extent, said cam follower being spaced wholly away from and not engaging said coin carrier, a linkage that responds to the presence of a coin in either of said coin-receiving pockets to move said cam follower into said path, a positive mechanical connection between said coin carrier and said camming surfaces that maintains a predetermined space relationship between the said coin-receiving pockets and said camming surfaces, whereby the presence of a coin in one of said coin-receiving pockets will cause said linkage to move said cam follower into said path immediately in front of the said one camming surface while the presence of a coin in the other of said coin-receiving pockets will cause said linkage to move said cam follower into said path immediately in front of said other camming surface, a plurality of coin passages that have their outlets adjacent said coin carrier, a stop that is elongated and that extends along said coin carrier and that extends through said coin passages and that is selectively movable relative to said coin passages, to hold coins within said coin passages or to free said coins for movement from said coin passages to said coin carrier, a coin-actuated switch that responds to the insertion of a coin to start said coin carrier rotating, and an actuator that moves with said coin carrier and that selectively moves said stop to coin-freeing position, said actuator being so positioned relative to said coin-receiving pockets that said actuator moves said stop to coin-freeing position only when the trailing edges of said coin-receiving pockets are spaced from said coin passages, said stop moving toward and away from said switch actuator, said stop and said switch actuator coacting to intercept coins in said coin passageway whenever said stop is in coin-holding position, said switch actuator being so positioned relative to said stop that coins move said switch actuator to switch-actuating position before the said coins are held by said stop, said coin carrier being a cylindrical coin wheel, said coin-receiving pockets being spaced apart axially and circumferentially.

References Cited in the file of this patent

UNITED STATES PATENTS

| | | |
|---|---|---|
| 649,982 | Glass | May 22, 1900 |
| 1,266,099 | Brandt | May 14, 1918 |
| 1,859,315 | Seemel | May 24, 1932 |
| 2,012,542 | Morton | Aug. 27, 1935 |
| 2,028,788 | Lane | Jan. 28, 1936 |
| 2,078,429 | Tweedale | Apr. 27, 1937 |
| 2,170,270 | Thatcher | Aug. 22, 1939 |
| 2,204,747 | Blattner | June 18, 1940 |
| 2,236,198 | Osborne | Mar. 25, 1941 |
| 2,253,863 | Melick | Aug. 26, 1941 |
| 2,290,920 | Thatcher | July 28, 1942 |
| 2,522,755 | Goebel | Sept. 19, 1950 |
| 2,538,358 | Farrell | Jan. 16, 1951 |
| 2,547,563 | Buchholz | Apr. 3, 1951 |
| 2,644,470 | Labbe | July 7, 1953 |
| 2,655,243 | Hehn | Oct. 13, 1953 |
| 2,671,547 | Nelsen | Mar. 9, 1954 |
| 2,780,337 | Fremon | Feb. 5, 1957 |
| 2,914,159 | Burns | Nov. 24, 1959 |
| 2,929,479 | Pferd | Mar. 22, 1960 |